(12) United States Patent
Sia

(10) Patent No.: US 9,447,775 B2
(45) Date of Patent: Sep. 20, 2016

(54) POWER GENERATING WINDBAGS AND WATERBAGS

(71) Applicant: Yik Hei Sia, Johor Bahru (MY)

(72) Inventor: Yik Hei Sia, Johor Bahru (MY)

( * ) Notice: Subject to any disclaimer, the term of this patent is extended or adjusted under 35 U.S.C. 154(b) by 0 days.

(21) Appl. No.: 14/976,855

(22) Filed: Dec. 21, 2015

(65) Prior Publication Data

US 2016/0108894 A1    Apr. 21, 2016

Related U.S. Application Data

(63) Continuation of application No. 14/608,511, filed on Jan. 29, 2015, now Pat. No. 9,234,501, which is a continuation of application No. 13/870,413, filed on Apr. 25, 2013, now Pat. No. 8,963,362.

(30) Foreign Application Priority Data

Apr. 26, 2012    (SG) .............................. SG201203067

(51) Int. Cl.
| | |
|---|---|
| *F03B 13/00* | (2006.01) |
| *H02P 9/04* | (2006.01) |
| *F03D 9/00* | (2016.01) |
| *F03D 5/00* | (2006.01) |
| *F03B 17/06* | (2006.01) |

(52) U.S. Cl.
CPC .............. *F03D 9/008* (2013.01); *F03B 17/06* (2013.01); *F03D 5/00* (2013.01); *F03D 9/002* (2013.01); *Y02E 10/28* (2013.01); *Y02E 10/70* (2013.01); *Y02E 10/725* (2013.01)

(58) Field of Classification Search
USPC .......................... 290/44, 54, 55; 244/153 R
See application file for complete search history.

(56) References Cited

U.S. PATENT DOCUMENTS

| | | | | | |
|---|---|---|---|---|---|
| 3,887,817 | A | * | 6/1975 | Steelman | F03B 13/264 290/43 |
| 4,076,190 | A | * | 2/1978 | Lois | F03D 5/00 244/153 R |
| 4,084,102 | A | * | 4/1978 | Fry | F03D 11/04 244/153 R |
| 4,124,182 | A | * | 11/1978 | Loeb | F03D 5/00 244/153 R |
| 4,166,596 | A | * | 9/1979 | Mouton, Jr. | B64B 1/50 244/30 |
| 4,207,026 | A | * | 6/1980 | Kushto | F03D 1/0608 244/33 |
| 4,350,896 | A | * | 9/1982 | Benoit | F03D 9/00 244/33 |

(Continued)

*Primary Examiner* — Pedro J Cuevas
(74) *Attorney, Agent, or Firm* — K. David Crockett, Esq.; Niky Economy Syrengelas, Esq.; Crockett & Crockett, PC

(57) ABSTRACT

A method of using a bagged power generation system comprising windbags and water-bags for harnessing wind and water power to produce electricity to meet the escalating energy needs of mankind. Windbags integrated with aerodynamically shaped inflatable bodies filled with lighter-than-air gas: HAV, UAV, airplanes; enabling the apparatus to attain high altitude to capture and entrap high velocity wind. Water-bags integrated with hydrodynamic shaped bodies HUV, UUV, Submarine-boats; enabling the apparatus to dive, capture and entrap swift moving tidal-currents. Attached tether-lines pulling on the rotating reel-drums and generators to produce electricity. Active control surfaces, turbo-fans, propellers provide precision control of the apparatus. A system configured to maximize fluids capture, retention and optimized extraction of its kinetic energy. An extremely scalable and environmentally friendly method, system, apparatus, equipment and techniques configured to produce renewable green energy with high productivity and efficiency.

5 Claims, 30 Drawing Sheets

(56) References Cited

U.S. PATENT DOCUMENTS

| | | | | |
|---|---|---|---|---|
| 4,350,897 A * | 9/1982 | Benoit | F03D 9/00 | |
| | | | 244/33 | |
| 6,254,034 B1 * | 7/2001 | Carpenter | A63H 27/08 | |
| | | | 244/153 R | |
| 6,498,402 B2 * | 12/2002 | Saiz | F03D 5/02 | |
| | | | 290/54 | |
| 6,523,781 B2 * | 2/2003 | Ragner | A63H 27/002 | |
| | | | 244/153 R | |
| 6,555,931 B2 * | 4/2003 | Mizzi | F03B 17/00 | |
| | | | 244/153 R | |
| 7,188,808 B1 * | 3/2007 | Olson | F03D 5/00 | |
| | | | 244/153 R | |
| 7,275,719 B2 * | 10/2007 | Olson | F03D 5/04 | |
| | | | 244/153 R | |
| 7,504,741 B2 * | 3/2009 | Wrage | F03D 5/00 | |
| | | | 290/44 | |
| 7,656,053 B2 * | 2/2010 | Griffith | B63H 9/0685 | |
| | | | 244/153 R | |
| 8,018,079 B2 * | 9/2011 | Kelly | F03D 5/04 | |
| | | | 290/1 R | |
| 8,080,889 B2 * | 12/2011 | Ippolito | B63H 9/0685 | |
| | | | 290/44 | |
| 8,102,069 B2 * | 1/2012 | Steelman | F03B 17/066 | |
| | | | 290/44 | |
| 8,247,912 B2 * | 8/2012 | Da Costa Duarte Pardal | F03D 5/00 | |
| | | | 290/44 | |
| 8,350,403 B2 * | 1/2013 | Carroll | B64C 39/022 | |
| | | | 290/44 | |
| 8,393,850 B2 * | 3/2013 | Werle | F03D 1/04 | |
| | | | 415/7 | |
| 8,446,034 B1 * | 5/2013 | Stevens | F03D 5/00 | |
| | | | 290/44 | |
| 8,602,363 B2 * | 12/2013 | Larson | F03D 11/04 | |
| | | | 244/155 A | |
| 8,791,585 B2 * | 7/2014 | Calverley | H02K 57/003 | |
| | | | 242/334 | |
| 8,864,063 B2 * | 10/2014 | Heppe | B64B 1/00 | |
| | | | 244/30 | |
| 8,894,001 B2 * | 11/2014 | Calverley | F03D 5/00 | |
| | | | 244/17.23 | |
| 8,907,516 B2 * | 12/2014 | Carroll | B64C 39/022 | |
| | | | 290/44 | |
| 8,963,362 B2 * | 2/2015 | Sia | F03D 9/002 | |
| | | | 290/44 | |
| 8,975,771 B2 * | 3/2015 | Goldstein | F03D 5/00 | |
| | | | 290/55 | |
| 9,000,605 B2 * | 4/2015 | Glass | F03D 1/04 | |
| | | | 244/30 | |
| 9,046,072 B2 * | 6/2015 | Tattersfield | F03D 5/06 | |
| 9,059,605 B2 * | 6/2015 | Murray | H02J 15/003 | |
| 9,139,279 B2 * | 9/2015 | Heppe | B64B 1/54 | |
| 9,234,501 B2 * | 1/2016 | Sia | F03D 9/002 | |
| 2002/0040948 A1 * | 4/2002 | Ragner | A63H 27/002 | |
| | | | 244/153 R | |
| 2006/0251505 A1 * | 11/2006 | Ferguson | F03D 3/002 | |
| | | | 415/4.1 | |
| 2007/0126241 A1 * | 6/2007 | Olson | F03D 5/04 | |
| | | | 290/55 | |
| 2007/0176432 A1 * | 8/2007 | Rolt | B64C 39/022 | |
| | | | 290/55 | |
| 2010/0013236 A1 * | 1/2010 | Carroll | B64C 39/022 | |
| | | | 290/55 | |
| 2010/0068052 A1 * | 3/2010 | Werle | F03D 1/04 | |
| | | | 415/220 | |
| 2010/0213718 A1 * | 8/2010 | Kelly | F03D 5/04 | |
| | | | 290/55 | |
| 2010/0308174 A1 * | 12/2010 | Calverley | B64C 27/02 | |
| | | | 244/155 A | |
| 2011/0266809 A1 * | 11/2011 | Calverley | F03D 5/00 | |
| | | | 290/55 | |
| 2012/0049533 A1 * | 3/2012 | Kelly | F03D 5/04 | |
| | | | 290/55 | |
| 2012/0312918 A1 * | 12/2012 | Heppe | B64B 1/00 | |
| | | | 244/30 | |
| 2013/0037650 A1 * | 2/2013 | Heppe | B64C 37/02 | |
| | | | 244/2 | |
| 2013/0052014 A1 * | 2/2013 | Kelly | F03D 5/00 | |
| | | | 416/66 | |
| 2013/0140827 A1 * | 6/2013 | Carroll | B64C 39/022 | |
| | | | 290/55 | |
| 2013/0154275 A1 * | 6/2013 | Calverley | H02K 57/003 | |
| | | | 290/1 A | |
| 2013/0307274 A1 * | 11/2013 | Sia | F03D 9/002 | |
| | | | 290/55 | |
| 2015/0042100 A1 * | 2/2015 | Saavedra | F03D 5/06 | |
| | | | 290/55 | |
| 2015/0137523 A1 * | 5/2015 | Sia | F03D 9/002 | |
| | | | 290/55 | |
| 2015/0251755 A1 * | 9/2015 | Schaefer | B64C 39/022 | |
| | | | 290/55 | |
| 2015/0275861 A1 * | 10/2015 | Goldstein | F03D 9/002 | |
| | | | 290/44 | |
| 2015/0308410 A1 * | 10/2015 | Goldstein | F03D 9/028 | |
| | | | 290/55 | |
| 2015/0308411 A1 * | 10/2015 | Goldstein | F03D 5/06 | |
| | | | 290/44 | |
| 2016/0043807 A1 * | 2/2016 | Davidson | B64B 1/50 | |
| | | | 398/116 | |
| 2016/0115937 A1 * | 4/2016 | Pettersson | F03B 13/10 | |
| | | | 290/43 | |

\* cited by examiner

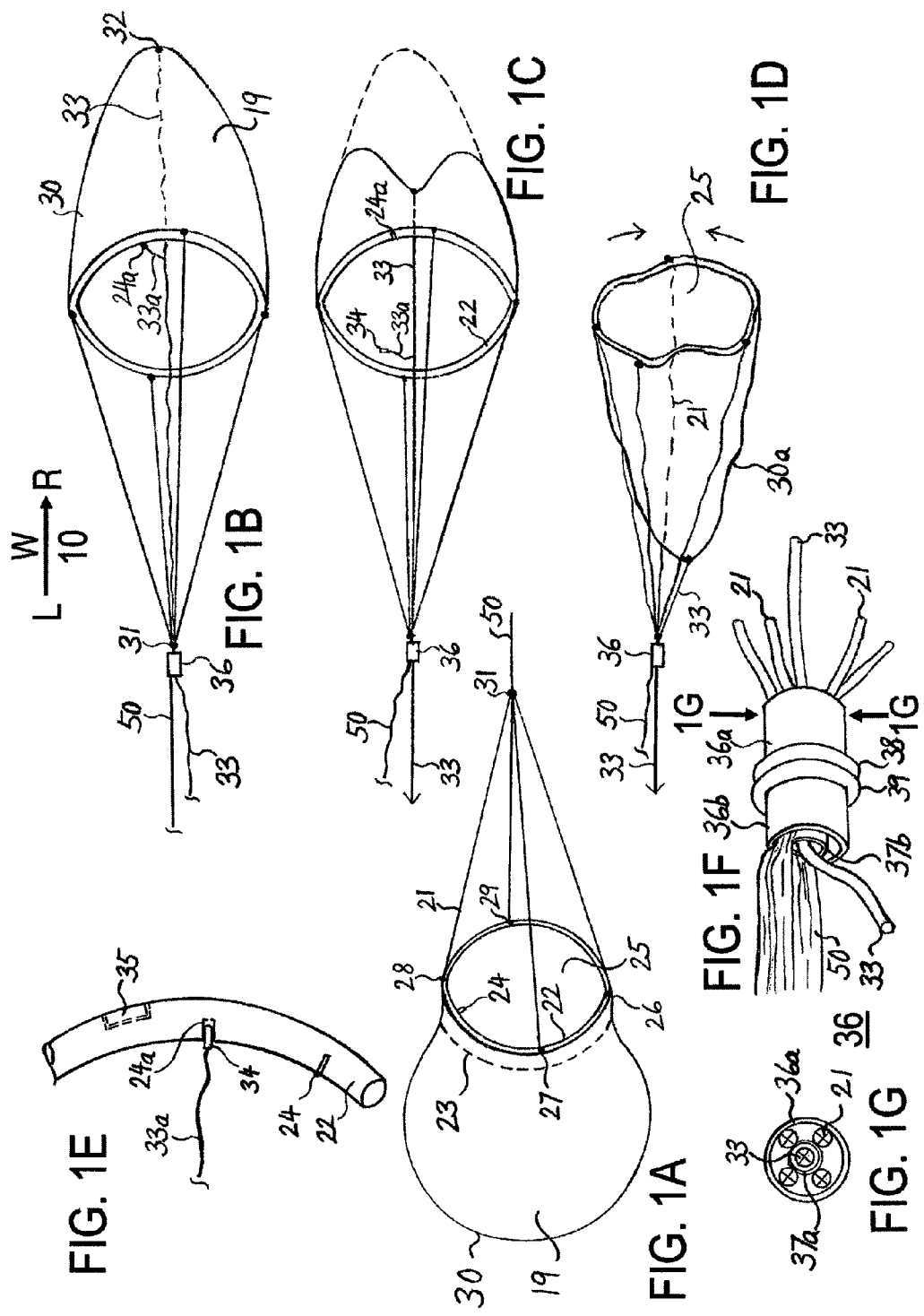

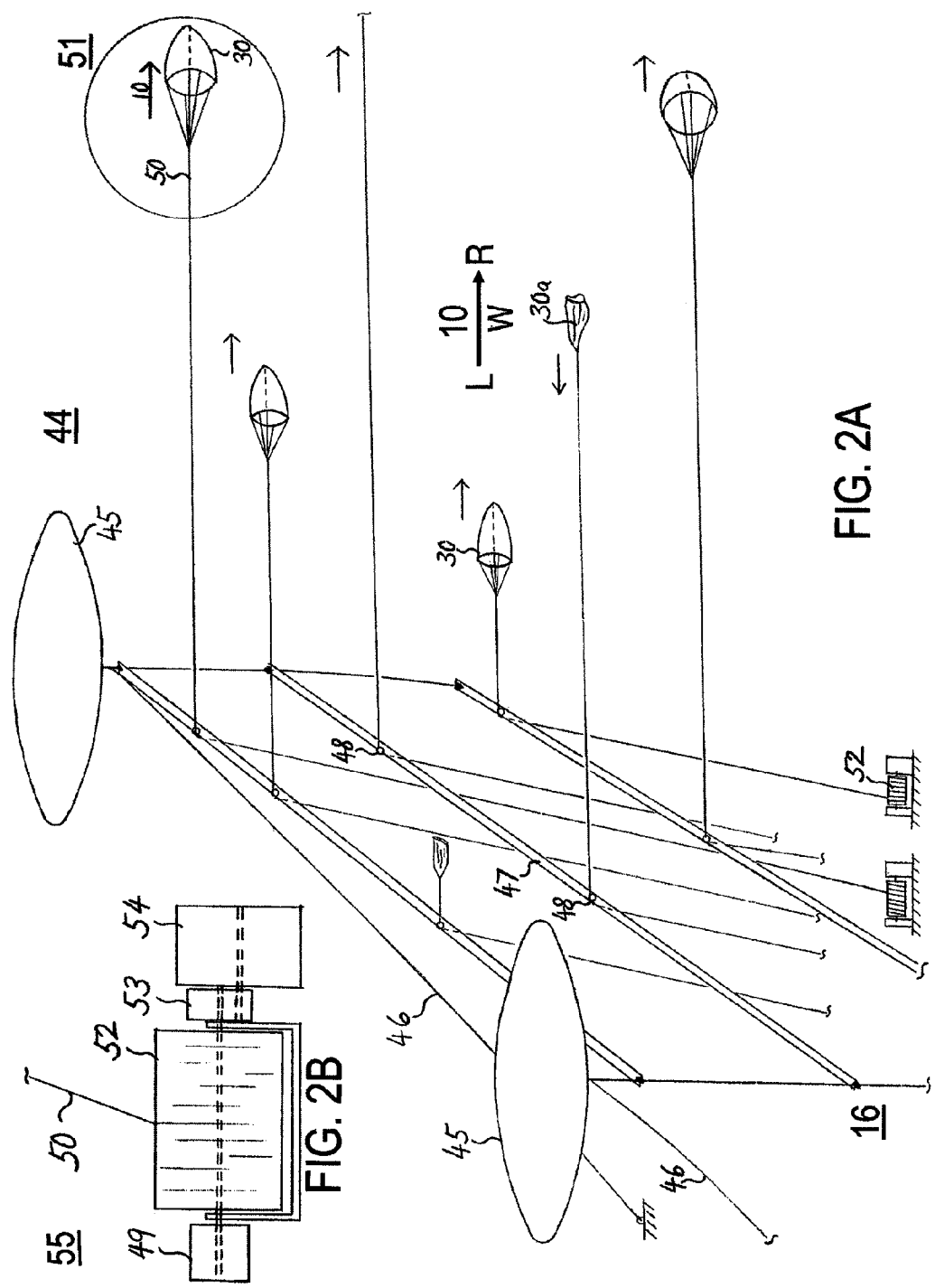

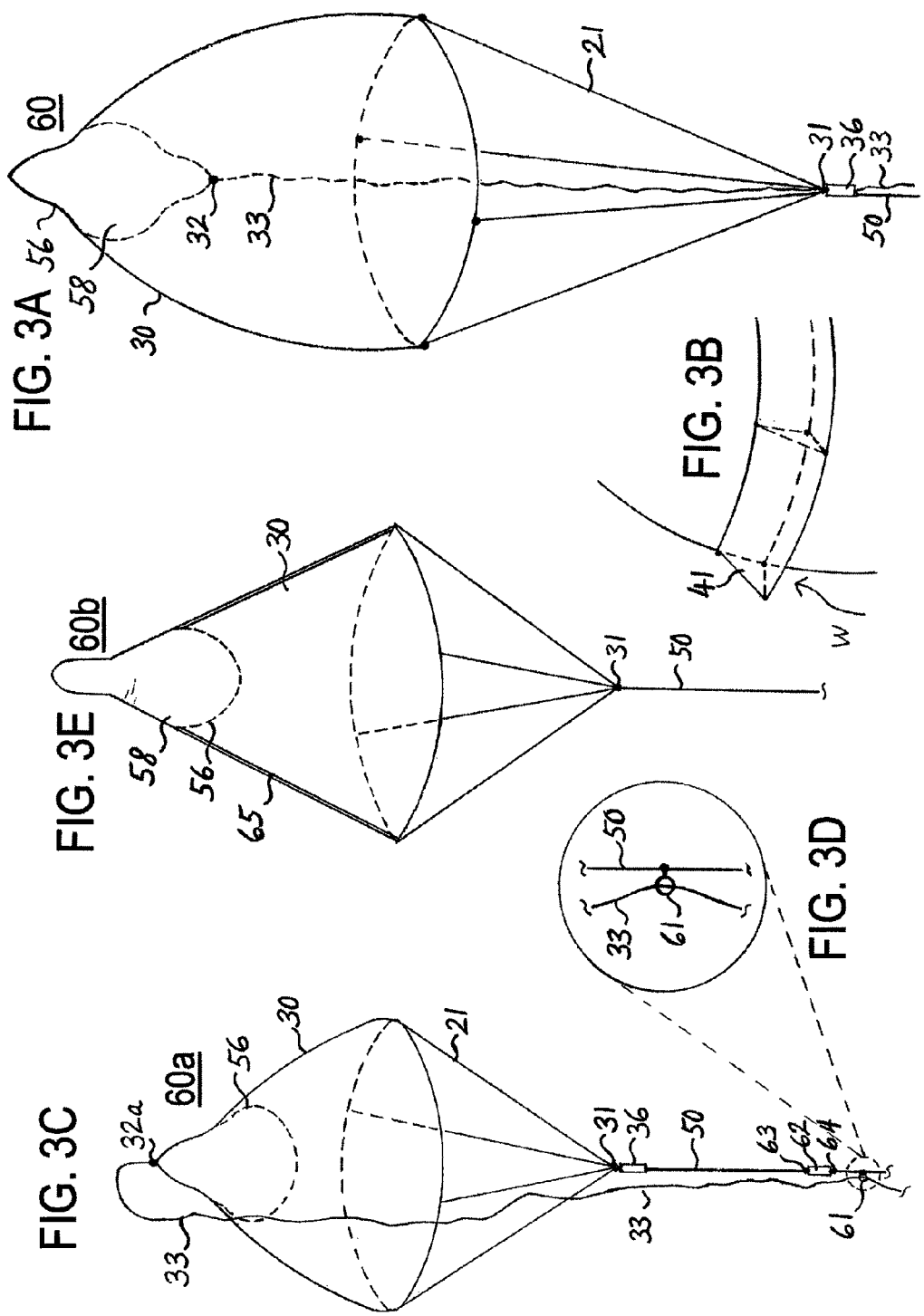

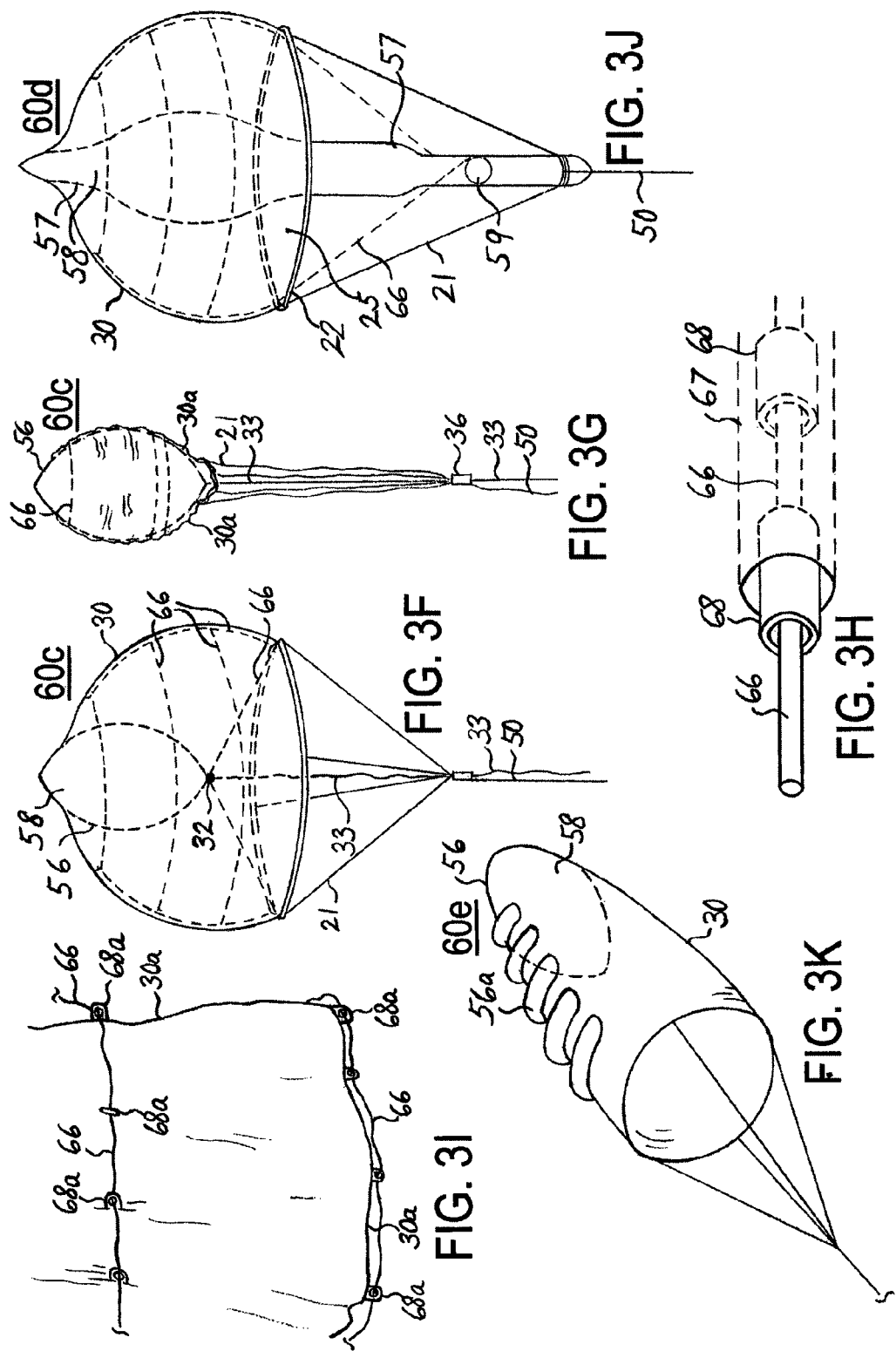

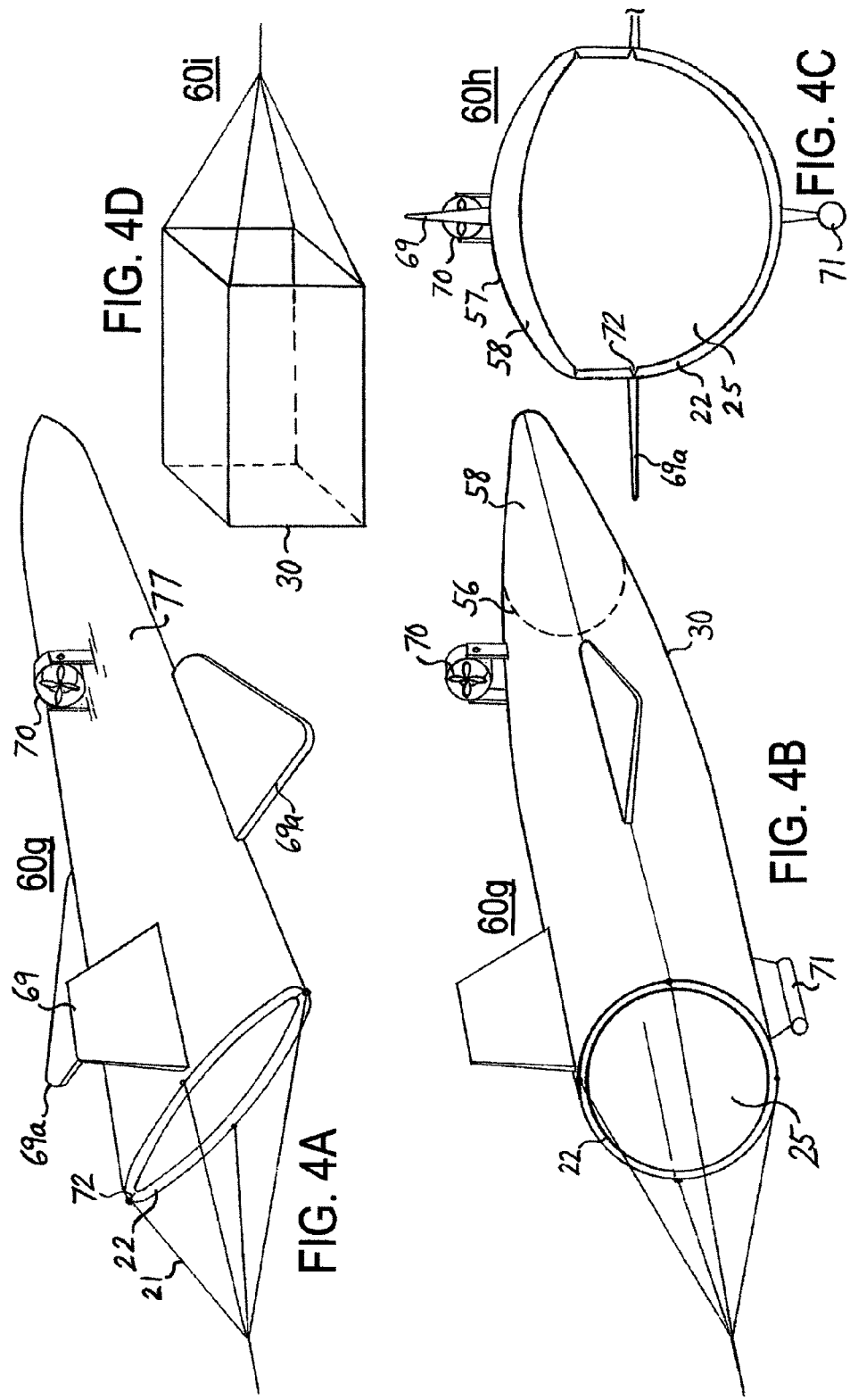

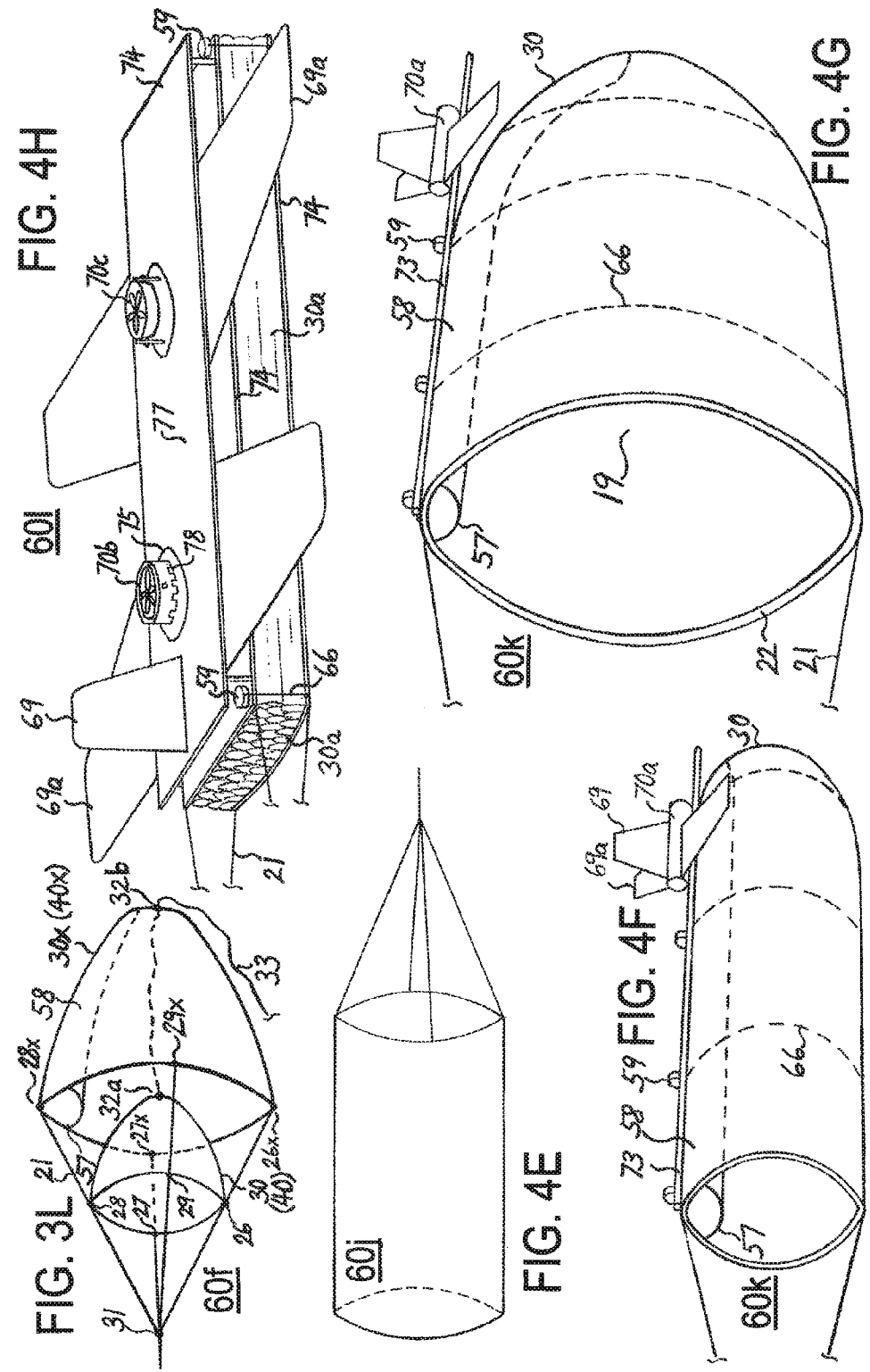

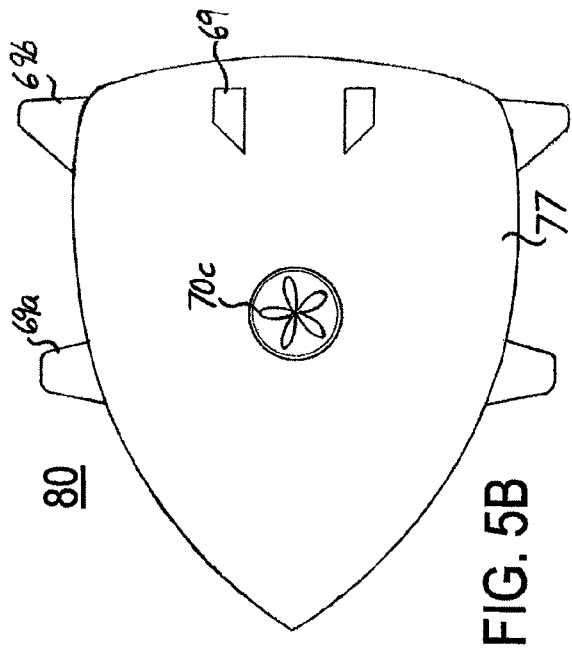
FIG. 5B
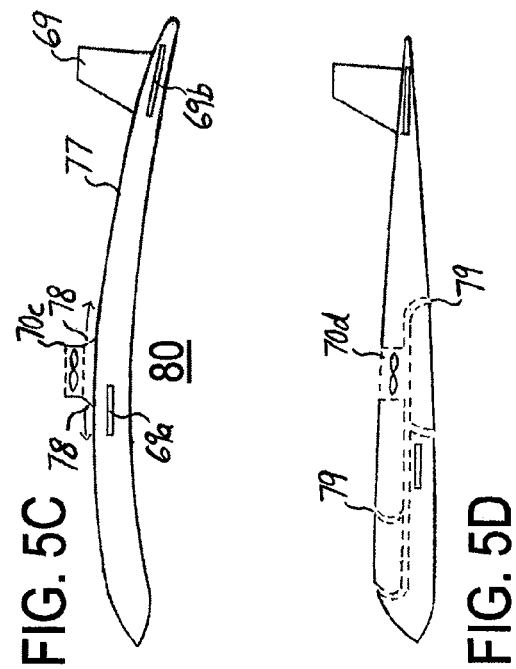
FIG. 5C
FIG. 5D
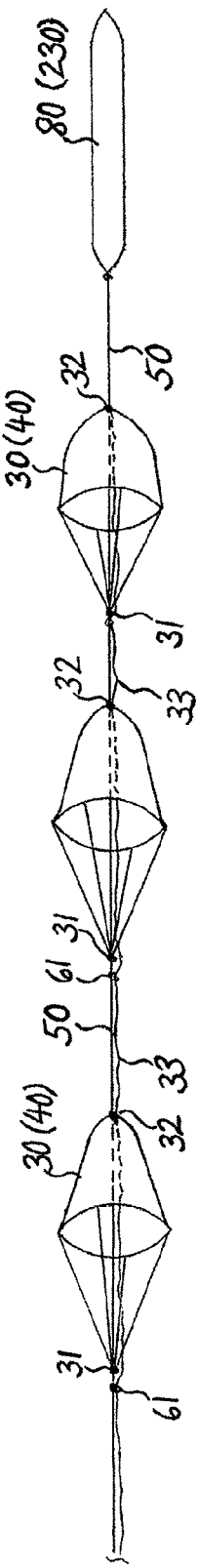
FIG. 5A

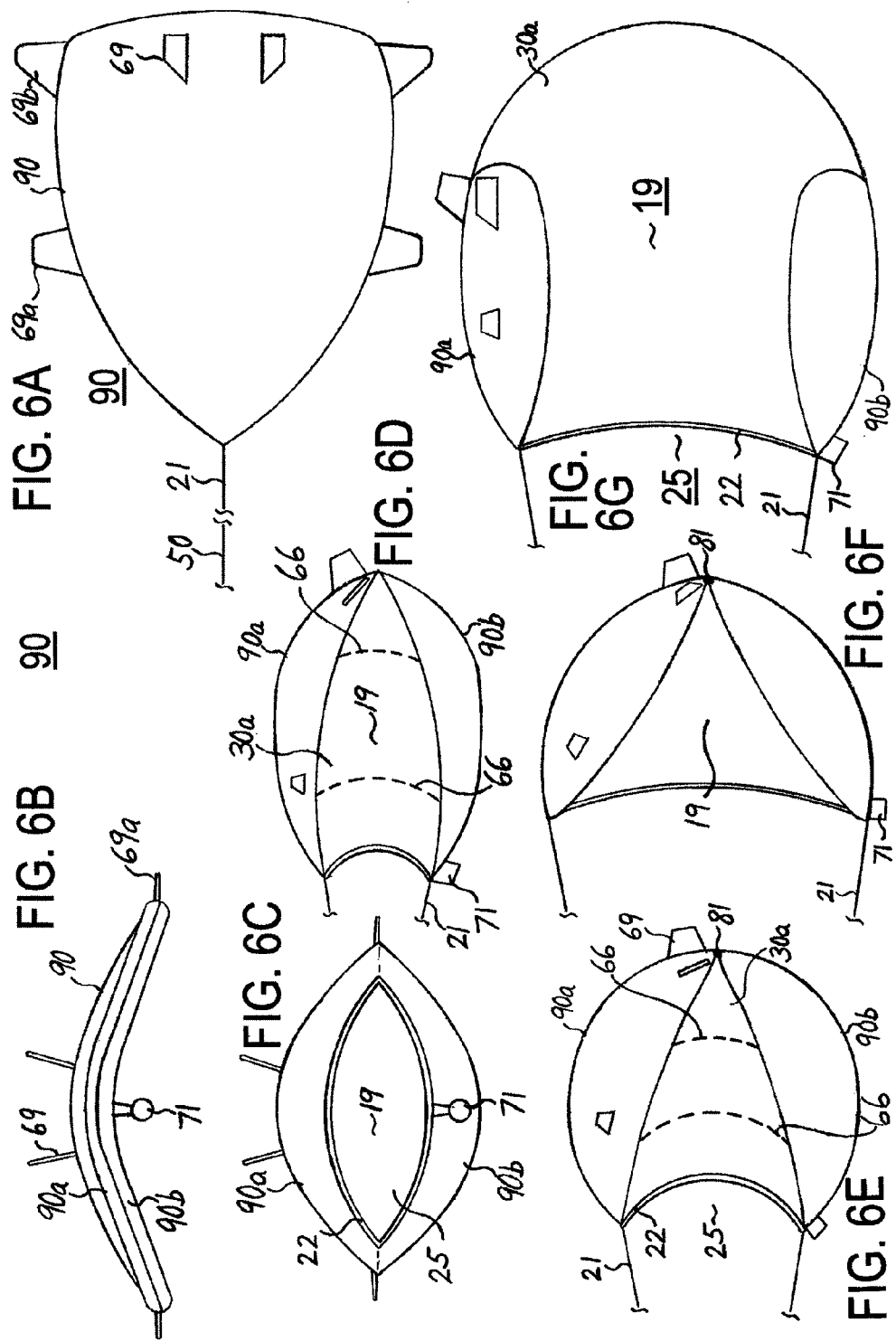

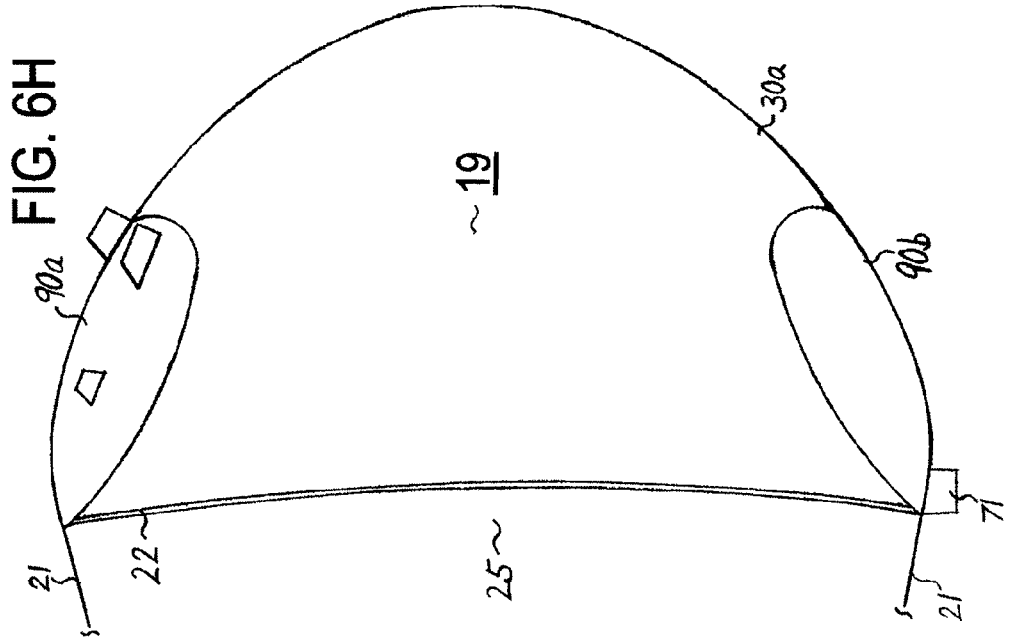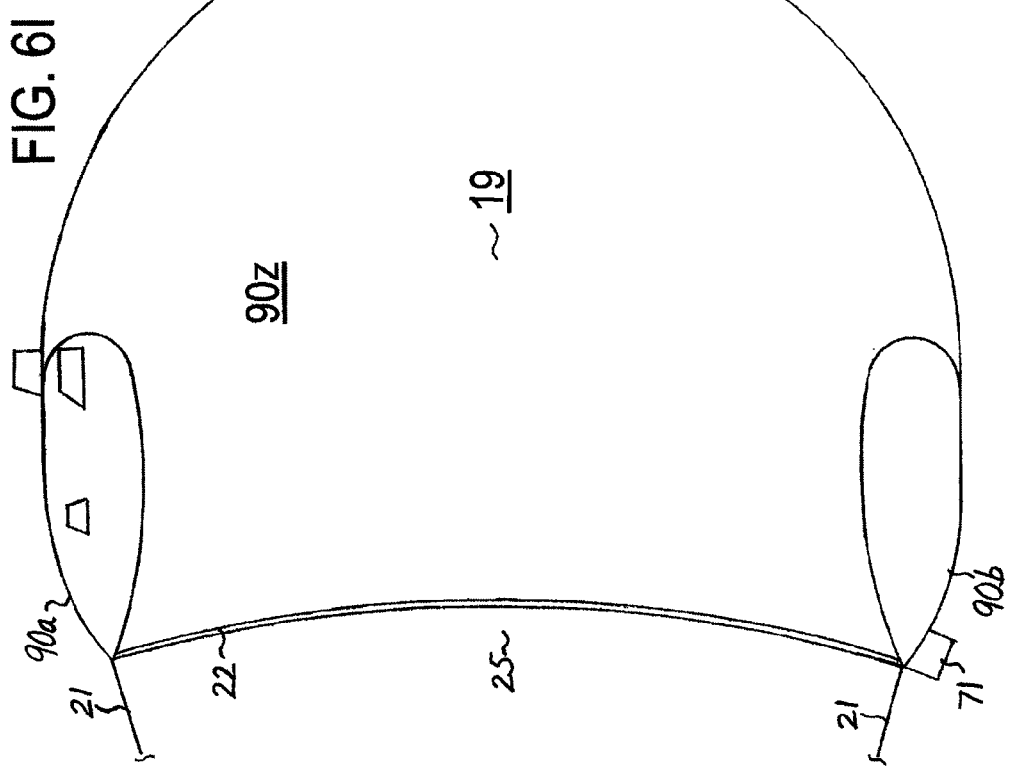

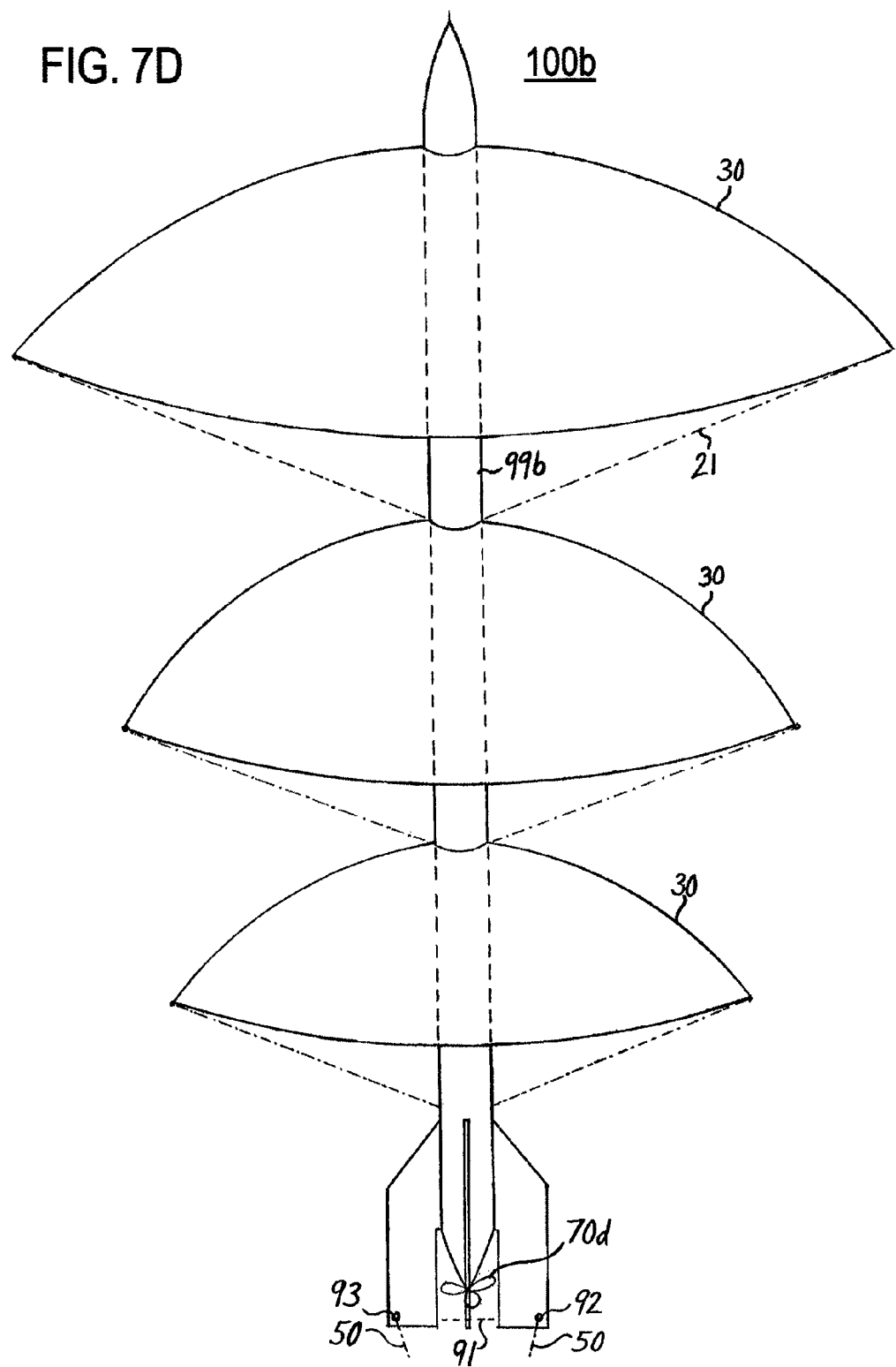

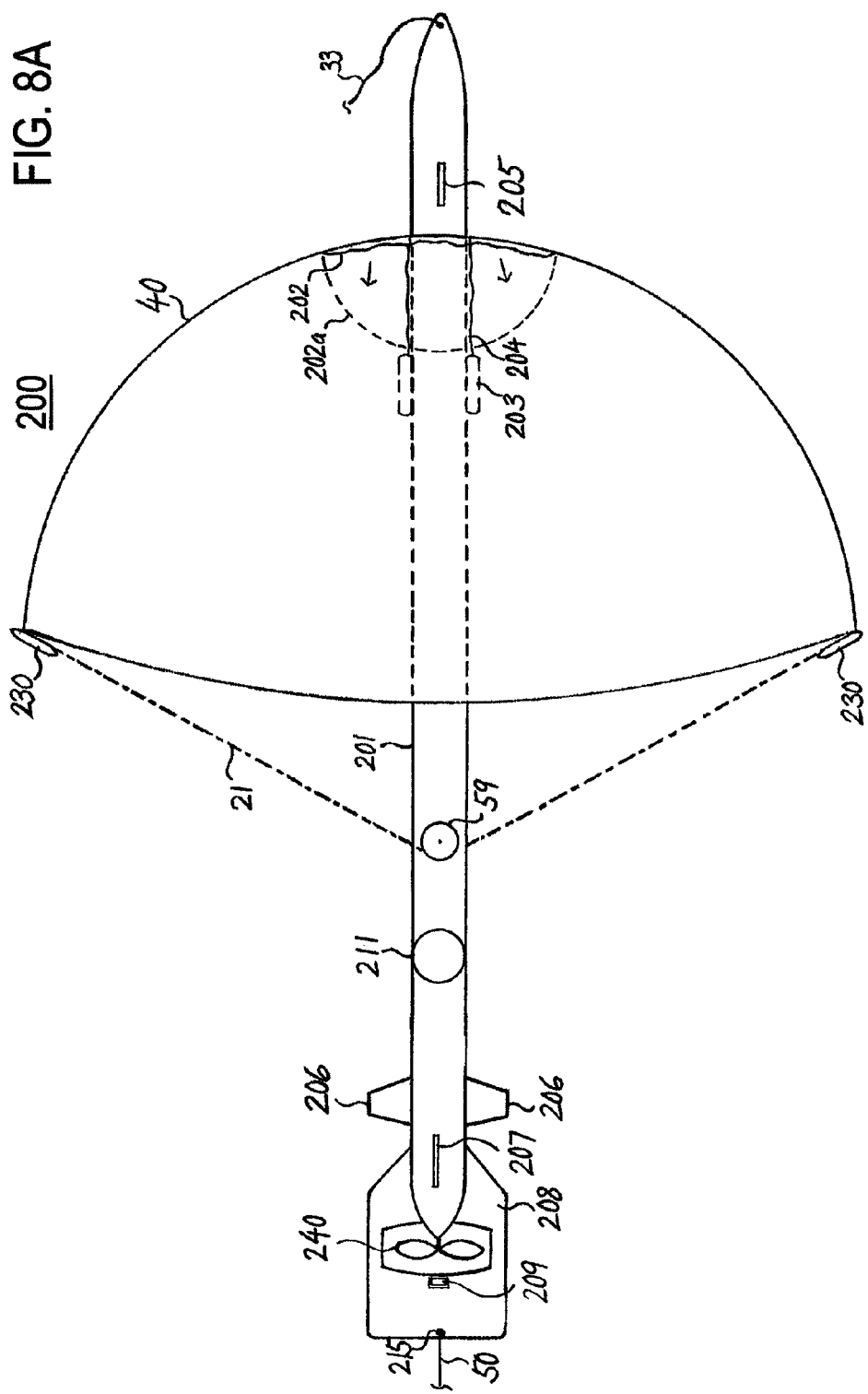

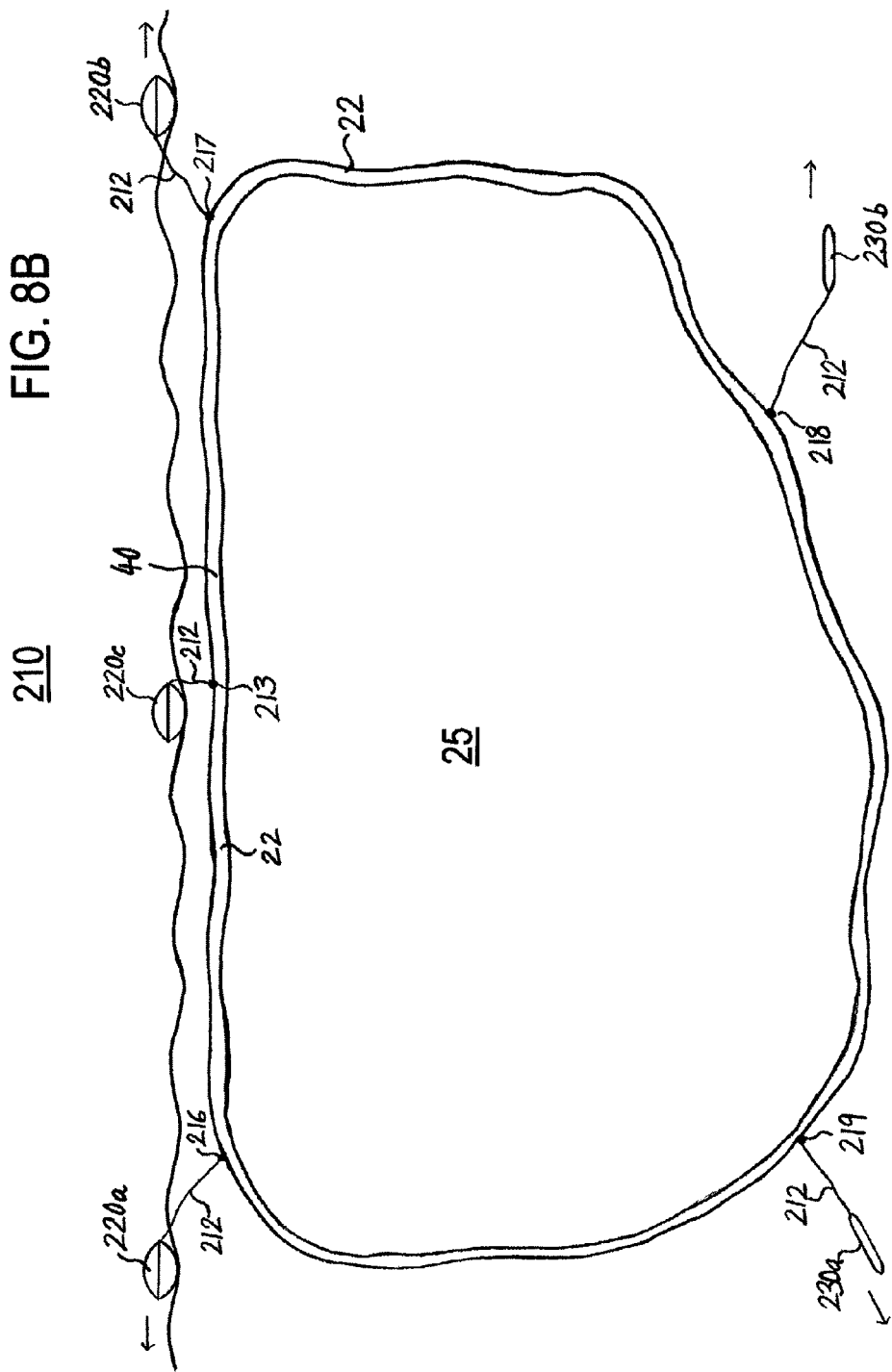

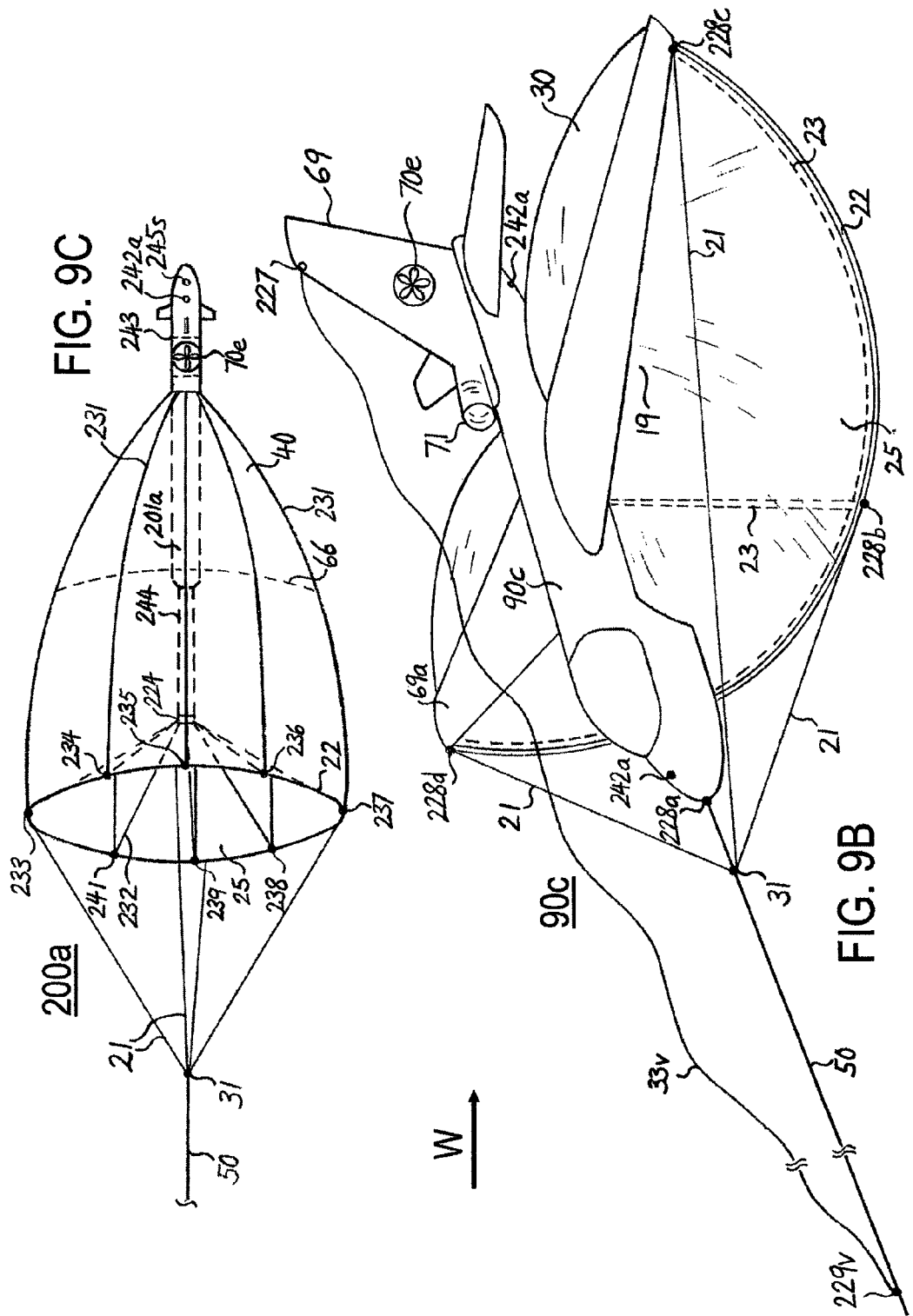

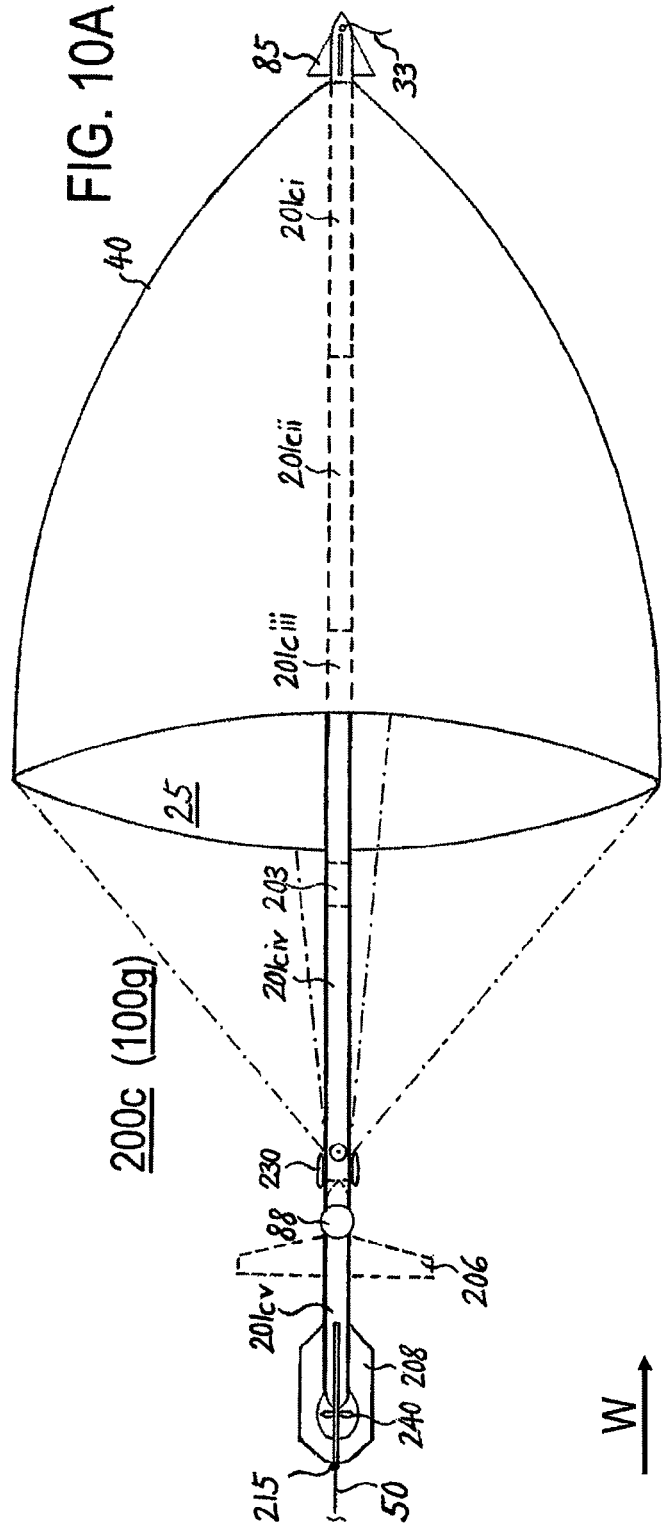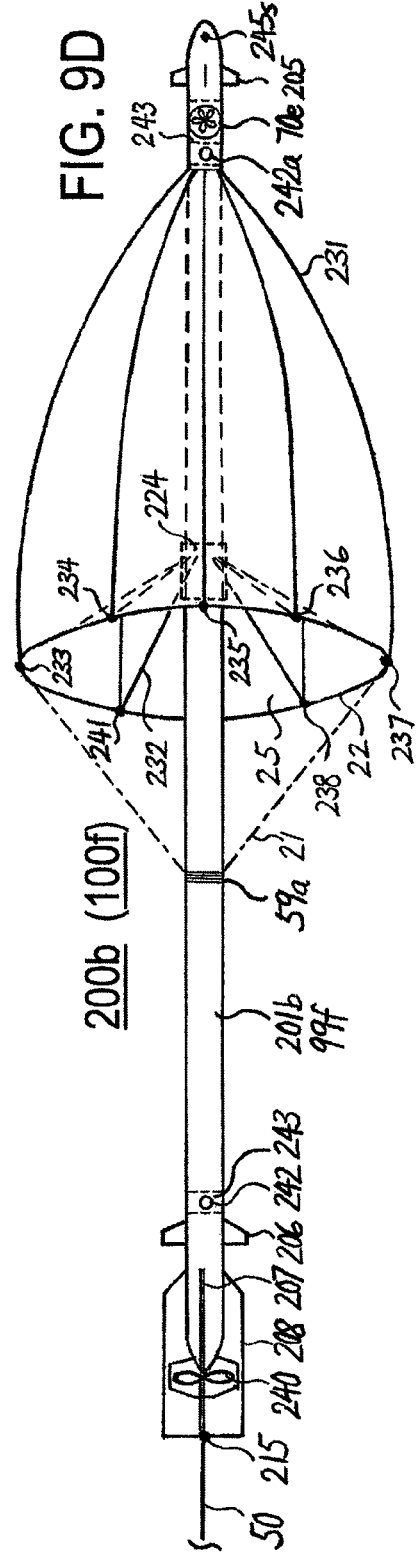

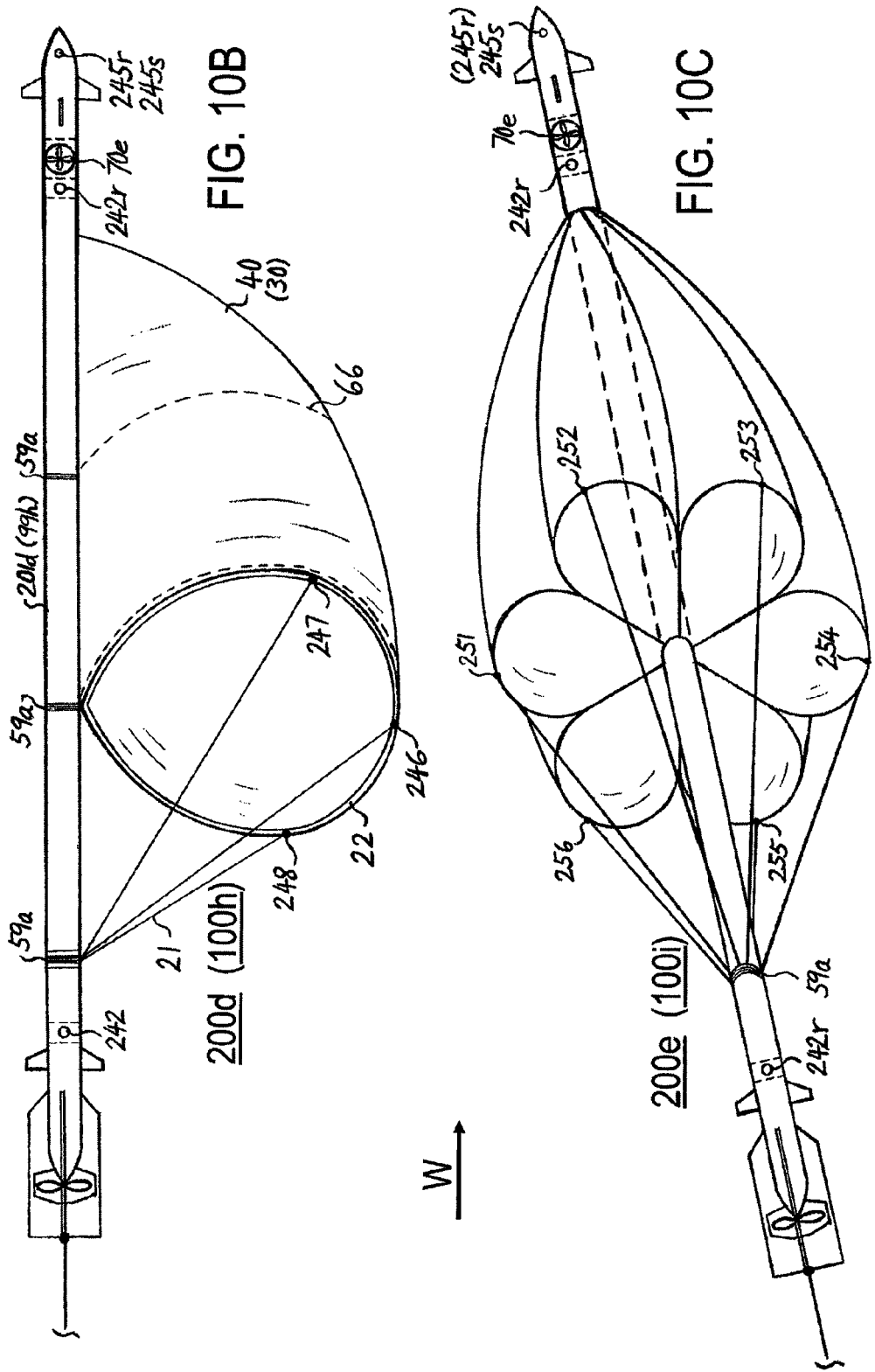

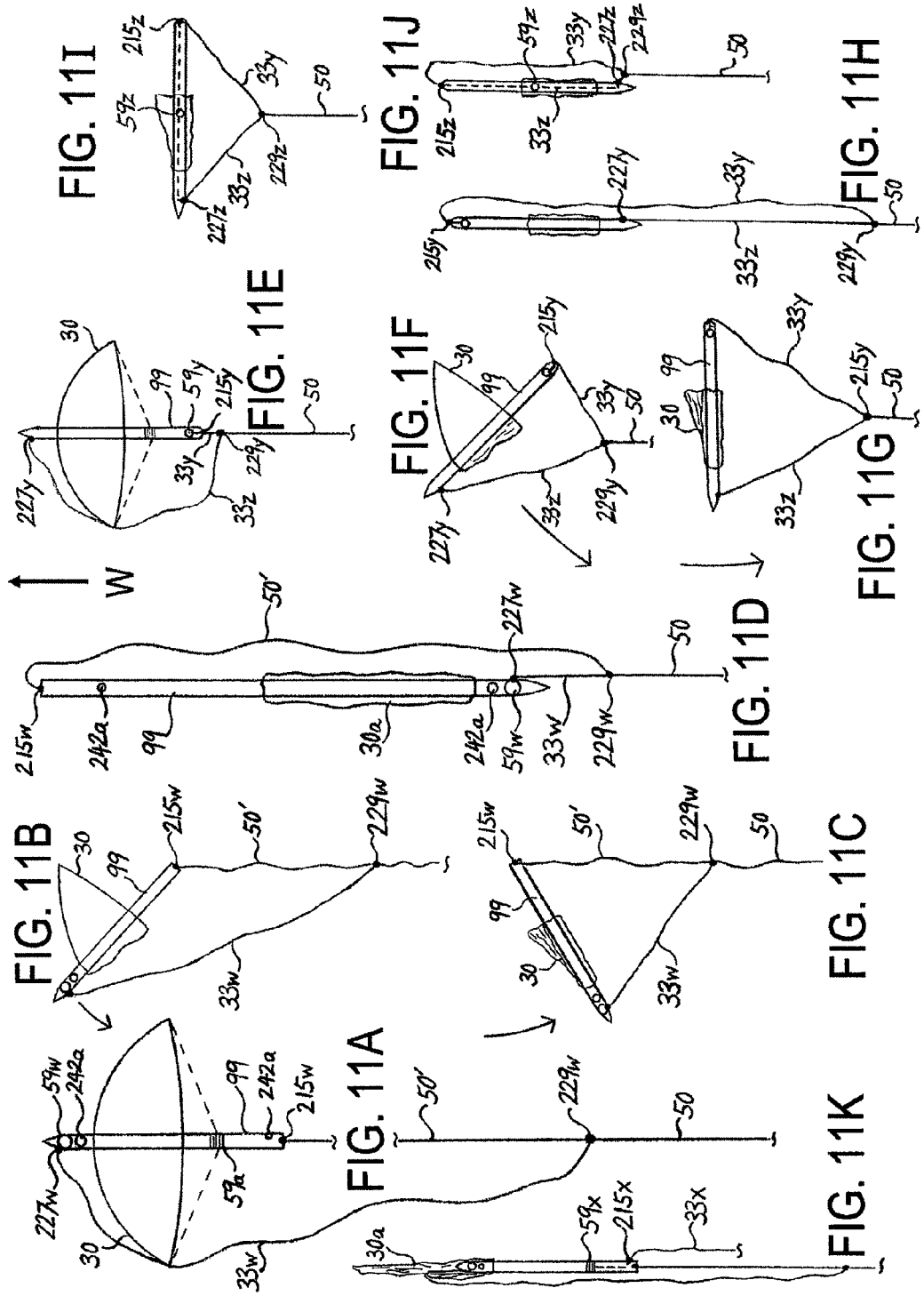

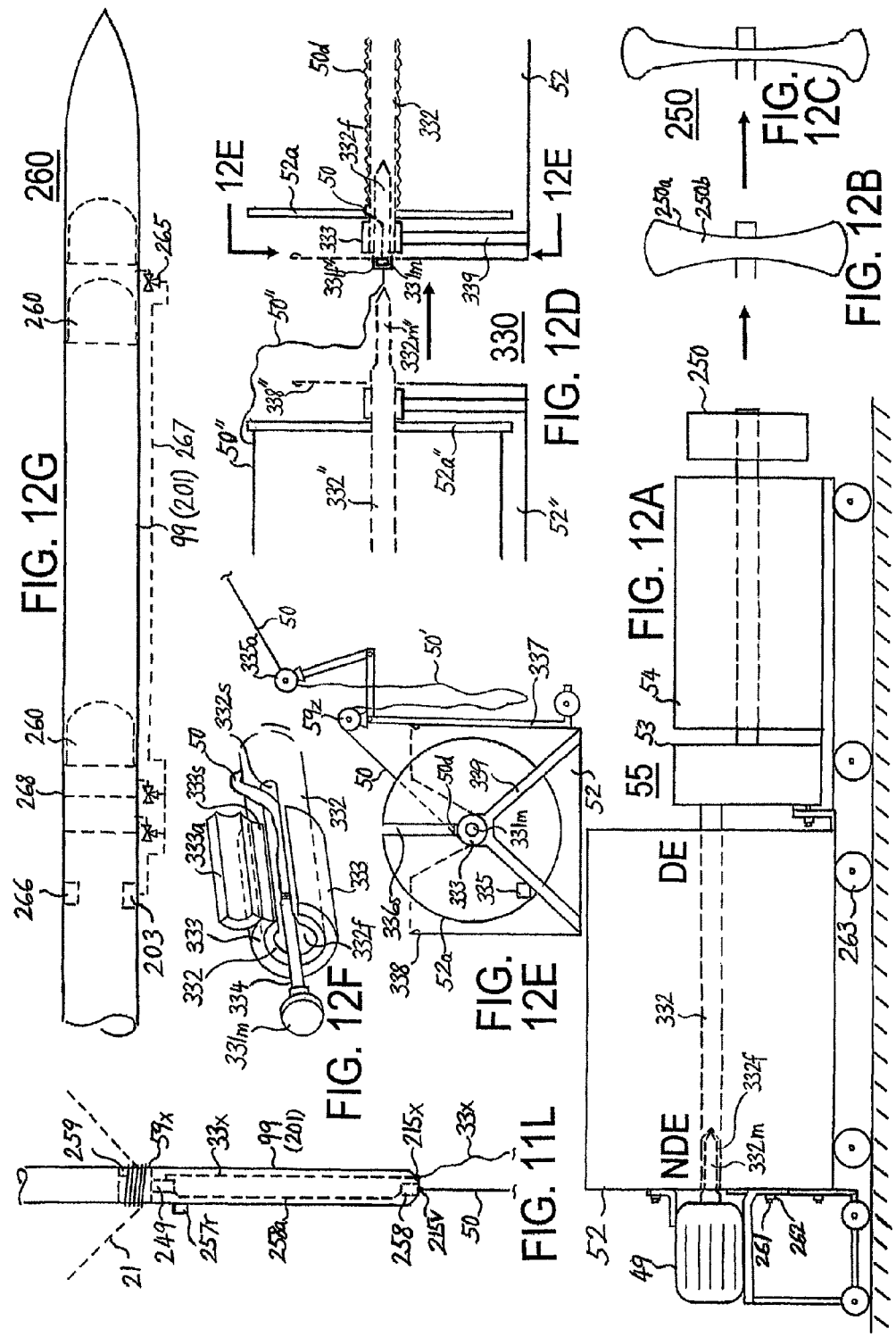

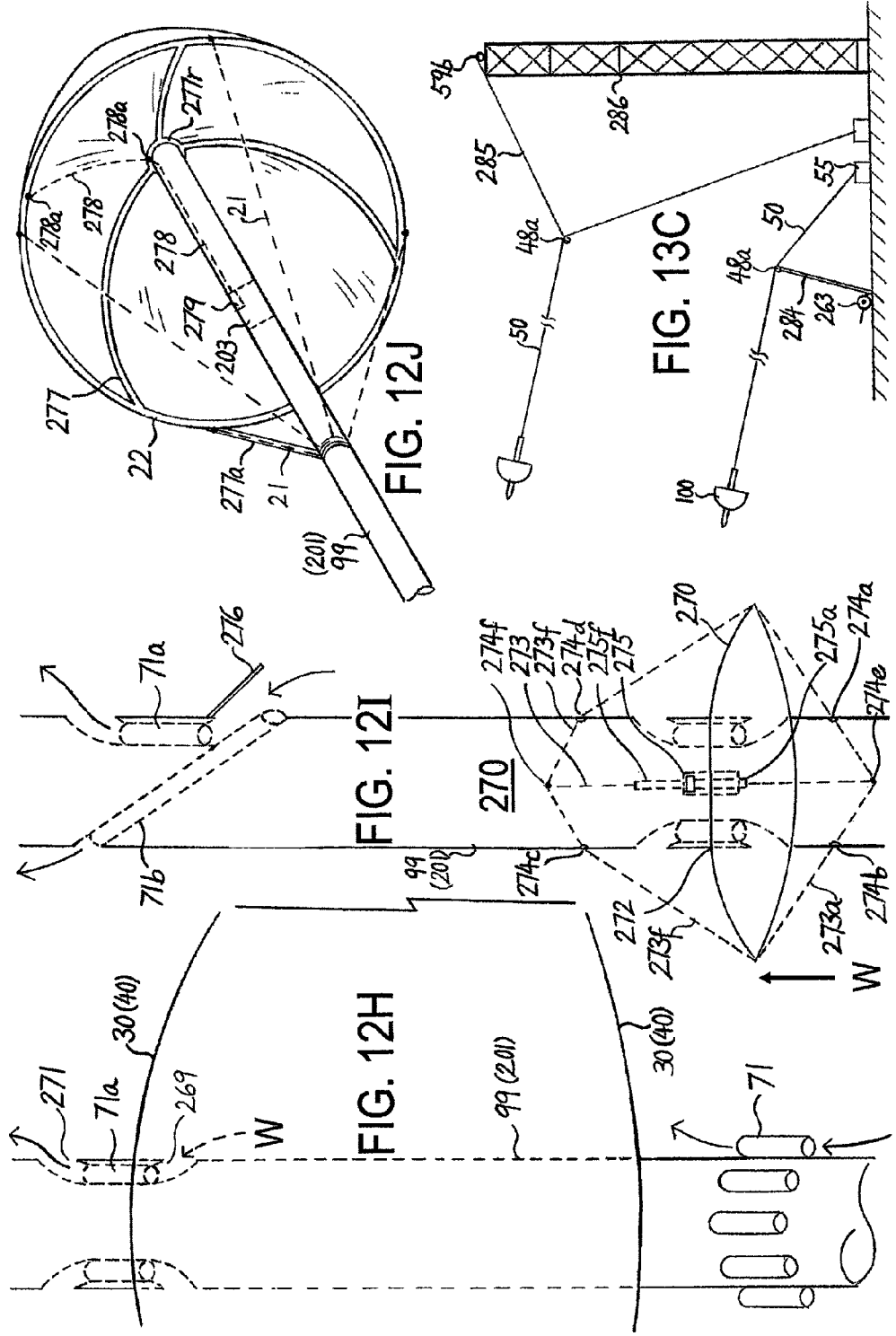

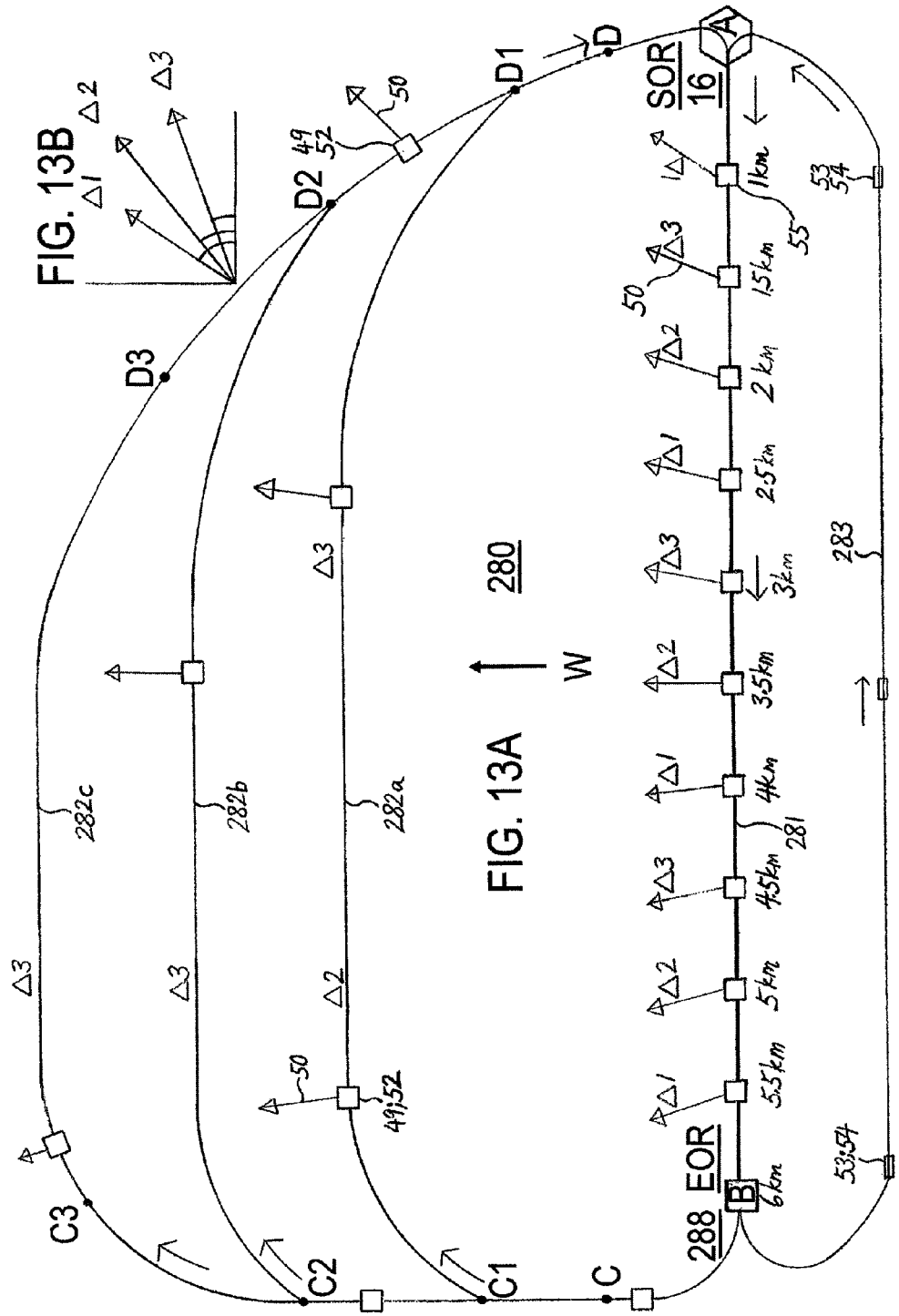

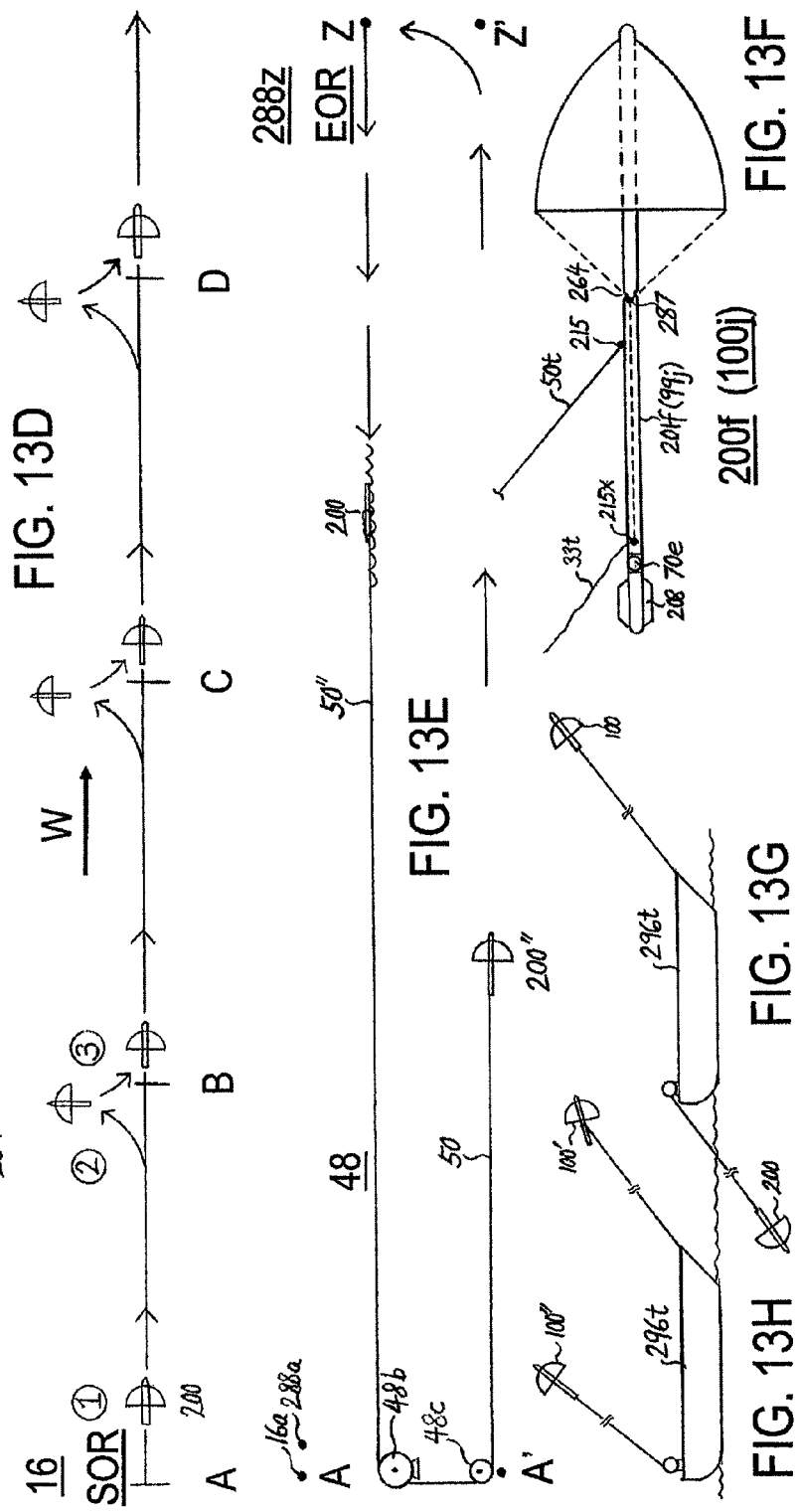

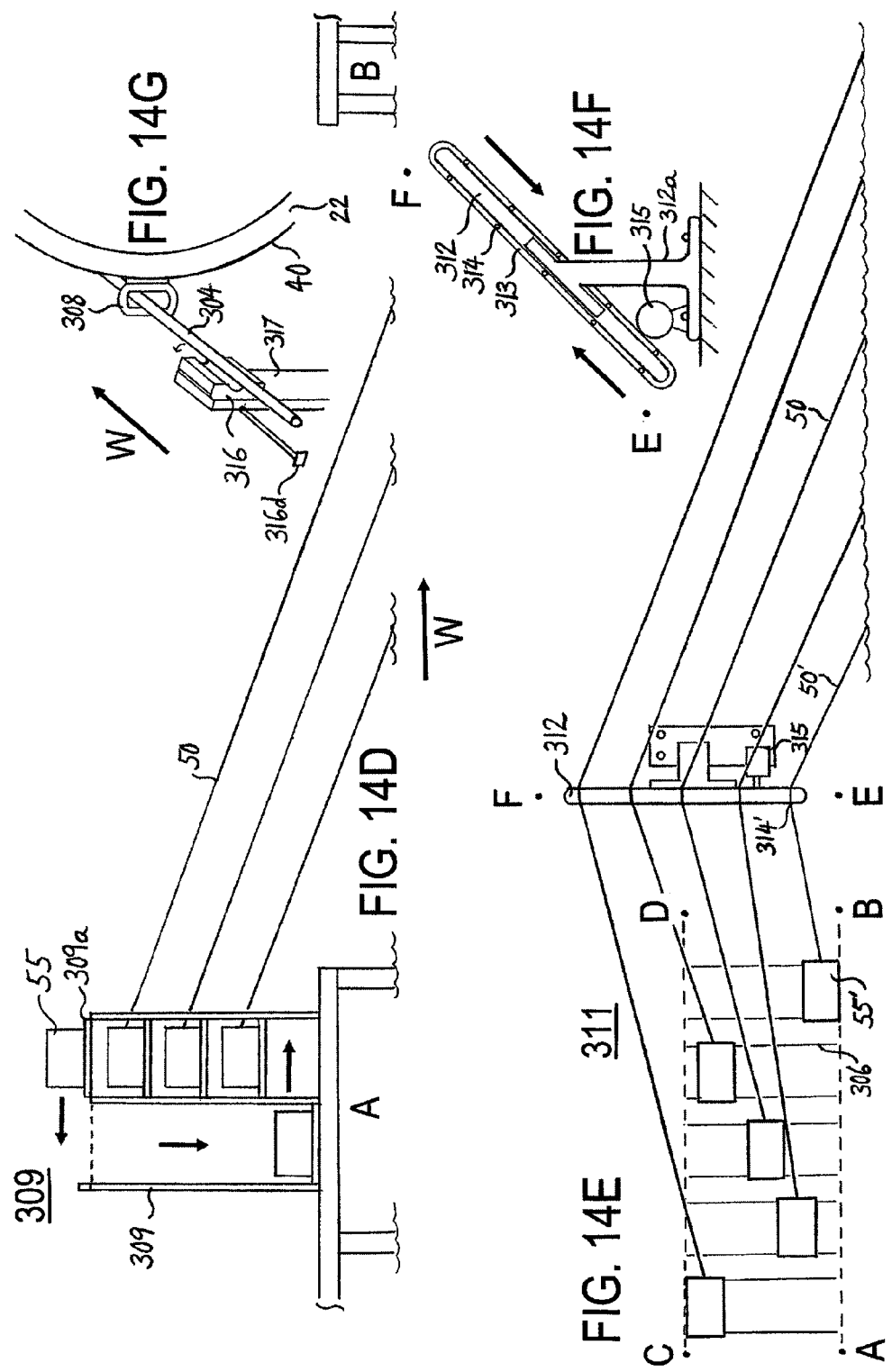

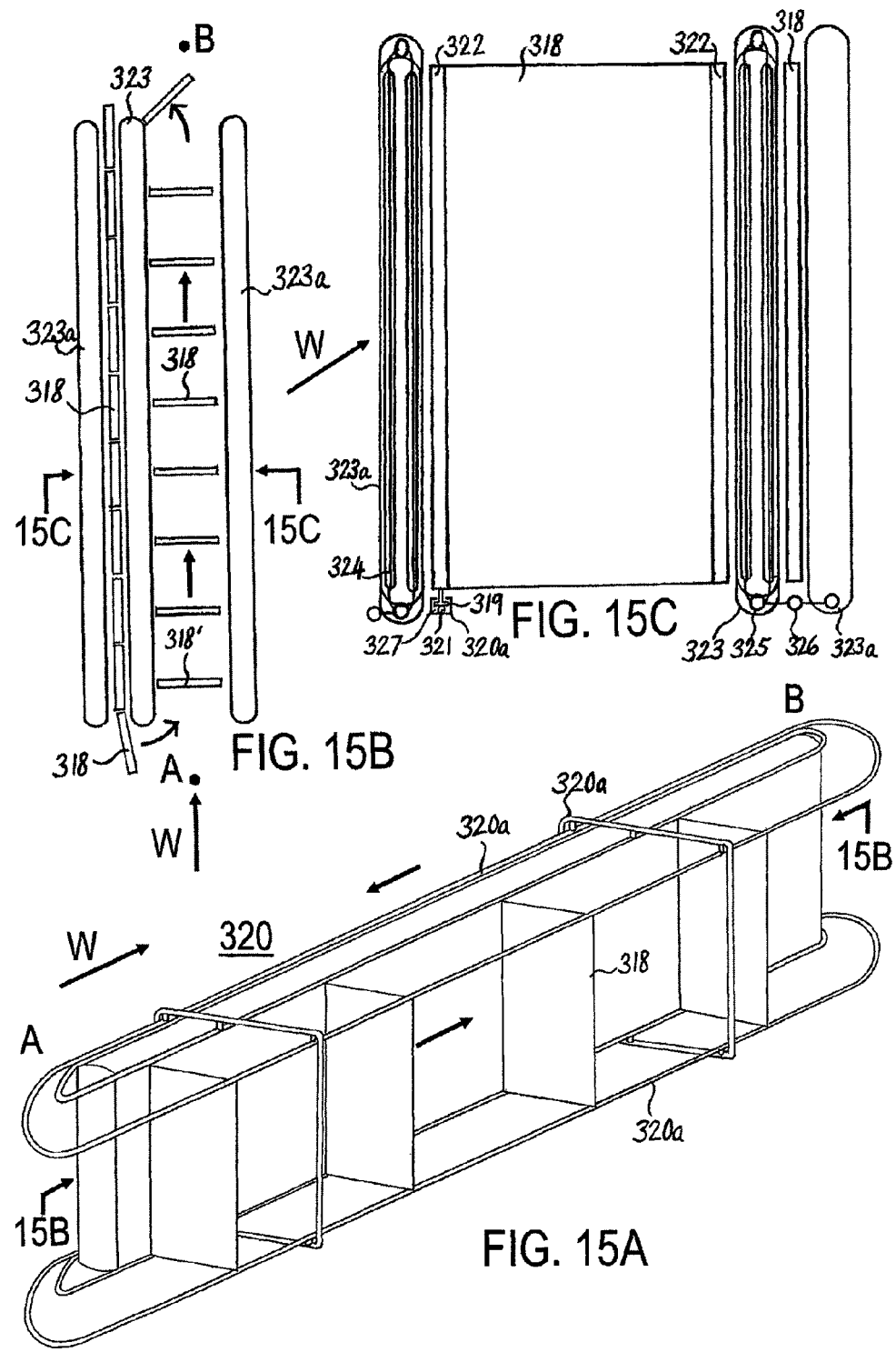

POWER GENERATING WINDBAGS AND WATERBAGS

CROSS-REFERENCE TO RELATED APPLICATIONS

This application is a continuation of U.S. application Ser. No. 14/608,511, filed Jan. 29, 2015, which is a continuation of U.S. application Ser. No. 13/870,413, filed Apr. 25, 2013, now U.S. Pat. No. 8,963,362, which claims priority to SG application no. 201302987-1, filed Apr. 19, 2013 and SG application No. 201203067-2, filed Apr. 26, 2012.

FIELD OF THE INVENTIONS

The present invention relates to the harnessing of renewable "green" energy from the mass movement of naturally occurring fluid elements comprising wind and/or water; the capture and transformation of this kinetic energy into useful mechanical energy by means of a specialized bagged power generation system configured for producing electricity comprising of: (i) wind powered generators; (ii) water powered generators. In particular wind energy comprising: high altitude wind energy; the Jet Stream; and water energy comprising: marine currents; ocean gyres; Kuroshio; the Gulf Stream. The capture, entrapment, partial encapsulation and transformation of the fluid's kinetic energy into useful mechanical energy by means of tethers attached to the power bags; and the production of electrical energy by means of a generator. Windbags for tapping wind energy and; water-bags for harnessing water energy. Airborne Flying Energy Generators (FEGs) comprising: Hybrid Aerial Vehicles HAV-100 to harness the kinetic energy of high altitude winds; deep-sea Diving Energy Generators (DEGs) comprising: Hybrid Underwater Vehicles HUV-200 to extract the kinetic energy of marine tidal-currents. Said twin components derived from a singular structural configuration comprising: a fluid containing bag integrated with a navigable vehicular body. A method, system, apparatus, equipment and techniques configured with vertical scalability and a quantum leap in the generation of renewable green energy: electricity, in comparison with existing systems at a minimized environmental and aesthetic cost. Scalability and scope of application may range from: a windbag and/or a water-bag with a fluid intake port 25 measuring from 1 cm to 1 km wide in diameter or, up to 100 km in width; ranging from small scale test sites to large scale combined offshore-marine high altitude wind-energy and deep-sea tidal-current energy extraction plants 300 for producing Giga-Watts/or TWh/year of electricity commercially.

BACKGROUND OF THE INVENTIONS

Present methods of harnessing wind energy by means of: kites, wind mills, wind turbines, kytoons, airfoils, etc.; use of sails on boat, ship or sledge for traction is known; as is the capture of water energy by means of: water mills, water wheels, turbines; balloons mounted on the sea-bed, floatation based devices, etc.; in converting the kinetic energy of wind and the potential-kinetic energy of water into mechanical energy to do useful work: mills to grind flour, pump water, etc. including aero-electric power and hydro-electric power generation. However, some devices like: wind mills, wind turbines, water wheels may be deficient and self-limiting due to (i) the minimized surface area for capture of the kinetic energy of the fluid medium as evidenced by the limited size and number of turbine blades, rotors, propellers, spokes; sails, etc. that may be affixed to an apparatus; (ii) the extremely short, momentary, contact time between the drive surface and the moving fluid medium providing the kinetic energy lasting a few seconds; and (iii) harnessing the kinetic energy in an ad-hoc randomized manner. Conservative estimates points to an efficiency figure of about 3-5 percent of the kinetic energy of wind or potential-kinetic energy of water being extracted. Harnessing the energies of mother-nature in quantities huge enough for global consumption may require different approaches and solutions than conventional methods, systems and apparatus presently available. In particular high altitude wind energy, the Roaring 40's, the Furious 50's, the Shrieking/or Screaming 60's, the Jet Stream (exceeds 92 km/h; up to 398 km/hr); and deep-sea water energy comprising: marine currents; ocean gyres; the Gulf Stream (top flow rate of 6.52 mph); Antarctic Circumpolar Current (4 km/h); Kuroshio Current (6.375 mph). The ACC transported a volume of 135 Sv (135 million m3/s) at Drake Passage; and 147 Sv south of Tasmania, at which point it is the largest volume of water moved on our planet. 1 Sverdrup (Sv) is the total volume of water from all the rivers on earth flowing into the oceans. Present invention discloses methods which maximizes (i) contact surface areas/volume; (ii) contact time between the drive surface/volume and moving fluid medium 10, 20; (iii) systematic arrangement of the bagged electrical power 14 generation system (FIG. 13A; FIG. 14A-14F); which may serve to improve efficiency and productivity in harnessing the kinetic energy of wind 10 and water 20 to between 10-20 percent.

The linear kinetic energy 11 of fluids comprising wind 10 and/or water 20 movements may be captured by means of a multitude of windbags 30 and/or water-bags 40 and transformed into electricity. The forward moving force/or kinetic energy 11 of the wind 10 and/or water 20 is captured and trapped by the bags; carrying the bags, propelling them along over a fixed distance in a linear path (example: 10 km distance on a 15 km length of tether 50 line wound on spool 52), maximizing surface contact area (example: 10 meters square per bag×1,000 bags); and prolonged contact time (example: 30 to 60 minutes). The moving bags 30, 40 pulling an attached tether line 50 (kinetic energy 11) exerted a tensional force which turned the tether spool 52/or line reel drums 52. This rotational movement (mechanical energy 12) is transmitted via a transmission gear-box 53; and used to power a driven appliance 54 comprising: a pump/or, compressor to produce potential energy 13/or, a generator to produce electrical energy 14. A multitude of such propelled bags 30, 40 and tethers 50 (drive unit 51) comprising thousands/or hundreds of thousands in number may be timed and arranged to take turns to drive the generators 54 (driven unit 55) to produce Gwh/year or Twh/year of electricity 14.

In present invention this wind 10 and/or water 20 energy may be harnessed in a systematic manner by means of a bagged power generation system; windbags 30 and/or water-bags 40 (including hybrid variants) cum attached tether-lines 50 comprising the drive unit 51. The revolving bobbins/or tether spools 52/or line-reel-drums 52; gear boxes 53 cum generators 54 comprises the driven unit 55. A winding motor 49 may be used to operate the reel-drums 52 to reel in and retract back the tether lines 50 and windbags 30 or water-bag 40. The drive unit 51 captured the naturally occurring kinetic energy and via the tether 50 imparts this tensile force to the driven unit 55; which converts it into electricity. The bags 30, 40 may be configured to be collapsible and inflatable. Towards the end of the power run/or end-of-run (EOR) point 288, the power bags 30, 40 may be depowered; deformed, collapsed, retracted, retrieved and pulled back (free load) to start-of-run (SOR) point 16; "ground zero"; where it may be reformed and redeployed.

SUMMARY

Present invention discloses a method, system, equipment, apparatus, techniques and ecosystem for generating electrical power, comprising of: a power-bag mounted on a mobile navigable vehicle body pulling a tether (drive unit 51) attached to an electricity generation module (driven unit 55). Such a dynamic method of power generation utilizes a vehicle mounted bag to capture and entrap motive fluid comprising wind and/or water; the moving fluid medium propelling the trapping bag and vehicle body along in the linear direction of its flow; with the tether powering the generation module to produce electricity for the duration of the entire journey. In the wind-borne form this apparatus may be configured as a Hybrid Aerial Vehicle (HAV-100); while in the waterborne form the apparatus may be customized as a Hybrid Underwater Vehicle (HUV-200). Equipment, apparatus and an ecosystem for operating the hybrid vehicle may be mounted on and borne by the vehicle body, including: flight control surfaces, tether lines, bridle lines, retract lines, winches, navigator-capsule, motorized turbo-fans, propellers, side-thrusters, batteries, engines, compressed air-tanks, fuel tanks, balloons, etc. Enabling capabilities includes: different methods of depowering the HAV-100 and HUV-200; safety features; station hopping; adding of new tether spools 52 to running spools 52; extending the range and power-run of the drive units 51.

To this end present invention provides a method wherein the mass movement of fluid medium comprising wind 10 and/or water 20 may be harnessed in a systematic manner by means of a bagged power generation system. The two components may comprise of: (1) a windborne; (2) a marine-waterborne component. Wind power by means of: large singular bags 30; integrated hybrid balloon-bag apparatus 60; a plurality of bags 30 spearheaded by an unmanned aerial vehicle 80; "Hybrid Bagtoons 60" comprising bags 30 integrated with bodies of LTA gas and engine driven turbo-fans 70; HAVs-100 comprising bags 30 mounted on cylindrically-shaped-inflatable (balloon) "rocket-like" body filled with a lighter-than-air gas and/or powered by engine driven turbo-fans 70; "Morphing Bag-crafts 90" which transforms into huge windbags. Water power by means of: large singular bags 40; hybrid water-bags 210 integrated with balloons 202, UUVs 230 and submarine-boats 220; a plurality of water-bags 40 spearheaded by an unmanned underwater vehicle 230; HUVs-200 comprising water-bag 40 mounted on a cylindrically-shaped "torpedo-like" body 201 filled with water, air, and/or driven by propellers 240; power bags 40 running along designated wire-line-guided routes/or paths. The bagged power generation system may be used in a broad range of terrain and environment comprising: free flowing airborne and/or waterborne apparatus; and wire-line guided routes; from surface to high altitude; from a surface platform towards a surface platform; from a fixed surface platform (upstream) towards a fixed/or mobile subsea platform (downstream); from a fixed/or mobile submerged subsea platform (upstream) to a fixed/or mobile subsea platform (downstream); subsea to subsea/or surface production platforms. The HAVs-100 and HUVs-200 travelling in a horizontal or inclined path; cutting through different strata(s): from surface to high altitude; from surface to deep-sea bottom—going where the wind blows; going where the water flows! The structural configuration for the wire-guided bags may comprise: horizontally disposed; and vertically inclined. Such that the dynamic forces in motion may be harvested more effectively; because even though wind and water may move in a linear, uni-directional manner most of the time; their movement may be inclined. Spaced at regular intervals, multiple bags may be put in power run phase along the guide-lines/or guide-wires at any given point in time. Parallel lines of bags may be arranged horizontally; such that layers upon layers of such lines of bags may also be configured vertically, one horizontal layer arranged on top of another layer. Wherein lines upon lines, tiers upon tiers comprising a multitude of such running power bags may be arranged in proximity, configured to generate a continuous supply of electrical power. Maximizing bagged fluid volume and contact time for the capture, entrapment, partial encapsulation and extraction of the kinetic energy of marine current 20. Such a superior structural configuration maximizes and optimizes productivity and efficiency of the marine hydro-energy-farm in harnessing the sustainable "green" energies of mother-nature effectively and systematically. The airborne platform for wire line guided bags 30, HAV-100 may comprise of highly specialized equipment such as HAV-45; and the Unmanned Aircraft System (UAS) infrastructure.

When we see an empty plastic bag being blown away by a strong gust of wind, we'd say: "the bag flew in the air." In appearance, visual illusion and mental perception, we may equate the bag as being capable of aerial flight. But in actual fact the bag does not fly; in the real sense of the word "flying" because it is not capable of generating aerodynamic lift. But due to its light weight and large empty cavity, the bag captures and entraps moving air; and is easily carried along, swept away by the moving air current we called "wind." The working principal of an air-bag/or windbag 30 lies in entrapping, capturing and partially encapsulating wind; and got carried along in the direction of the current flow. The airborne windbags system of power generation is more complicated and entails more expensive customized equipment comprising of the UAS infrastructure such as: Hybrid Aerial Vehicles HAV-100, "Morphing Bag-crafts 90," etc. than the parallel seaborne water-bags system of power generation. Due to the fact that water is 829 times denser than air, water based generation systems may float in the fluid medium by means of encapsulated air; attached floatation devices; weighted down by means of sinkers, weights; secured to subsea piles; mooring points affixed onto the sea bed using suction cups. Equipment used may comprise reconfigured vessels used in the oil and gas exploration and production industry such as: fixed platforms, mobile jack-up rigs; semi-submersible rigs, support ships, floating production storage offloading (FPSO) vessels, etc.

Disclosed herein is a motion-centric method; and dynamic system of generating power by means of specially configured motion based vehicles/motile apparatus integrated with bags and tethers; navigable vehicles traversing a fluid medium on a linear trajectory or path of travel (from SOR point 16 to EOR point 288); said multitude of fluid propelled navigable vehicles travelling in proximity may be remotely manipulated to avoid collision/or to maintain a journey free from interference from like vehicles; said navigational means comprises turbo-fans 70; 70*d*; propellers 240; thrusters 70*e*; explosive charge nozzles 242*r*; compressed air nozzles 242*a*; control surfaces comprising fins 85; 205; 206; tail fins 84; 208; ailerons 69*a*; 69*b*. Computerized self-navigation capability along an assigned trajectory may also be incorporated into the guidance system of the unmanned vehicles. The main thrust of present invention comprises of:

a HAV-100; a HUV-200; essential components comprising a: bag; vehicle body; tether; surface based generation system. A wind-bag and/or a water-bag used to capture and entrap a moving current (kinetic energy) of fluid comprising wind and/or water. Said bag may be mounted on a long cylindrically-shaped "rocket-like" vehicle body which provides a means of carriage for the bag and a variety of equipment for: operating the bag; navigating the bagged vehicle on an assigned linear flight path/or diving route. A tether line for transmitting the motive forces/or kinetic energy of the fluid propelled vehicle to a ground and/or surface based electricity generation system. The motion-centric vehicle moving along with the linear flow of the fluid current; extracting their energies as they travelled from the SOR point 16 to the EOR point 288; generating power continuously and consistently for the duration of the whole journey. The full force of the fluid's velocity may be imparted onto the open fluid intake port and into the bag cavity 19. The desired amount of drag force may be set into the generator system-manually by hand; computerized auto controls or varied accordingly to maintain optimal operating conditions. Power generating bags attached to the vehicle bodies may be deployed and retracted while traversing in said fluid medium as and when desired/or commanded; as the vehicle navigated along a designated trajectory. HAV-100 may be configured with a cylindrically shaped, "missile-like" light weight inflatable balloon body filled with LTA gas providing aerial buoyancy required to attain high attitude; while the seaborne HUV-200 may be configured with a cylindrically shaped "torpedo-like" vehicle body filled with air, ballast water and weight required to dive deep underwater.

BRIEF DESCRIPTION OF THE DRAWINGS

Preferred embodiments of the present invention will now be described with reference to the accompanying drawings wherein:—

FIG. 1A shows details of a windbag with an annular ring 22 inflated with air forming the wind intake port 25; and an embedded and enclosed line 23 to control the size of the wind intake port 25. FIG. 1B, FIG. 1C and FIG. 1D shows details of a windbag at the EOR phase undergoing retraction by means of a retract line 33; before returning to SOR point. FIG. 1E shows details of an inflation valve 24; an air release valve 24a used for deflating the annular ring 22. FIG. 1F and FIG. 1G shows details of a double ringed swivel apparatus 36 for attaching the bridle lines 21 and tether line 50 with a hole in the middle for the retract line 33 to move freely.

FIG. 2A shows details of a method of using an airborne platform 44 for deploying windbags 30 at high altitude to generate electricity and FIG. 2B illustrates a driven unit 55 of FIG. 2A.

FIG. 3A to FIG. 3L shows details of a variety of hybrid windbags 60 integrated with pockets or bodies of lighter-than-air gas providing buoyancy. FIG. 3A shows a hybrid bagtoon 60. FIG. 3B shows pieces of extension fabric on the exterior of a windbag. FIG. 3C shows a variant hybrid bagtoon 60a while FIG. 3D shows double sliding rings 61. FIG. 3E shows a variant hybrid bagtoon 60b with semi-rigid and/or rigid frame. FIG. 3F to FIG. 3H shows variant hybrid bagtoon 60c with enclosed lines 66; while FIG. 3I shows bag fabrics with curtain rings 68a through which lines 66 runs. FIG. 3J shows variant hybrid bagtoon 60d with shaped body 57 providing structural support. FIG. 3K shows bagtoon 60e with stripped LTA gas pockets. FIG. 3L shows a plurality of bags 60f stacked one behind another pulling on a single set of bridle lines.

FIG. 4A shows details of a collapsed semi-rigid bagtoon 60g integrated with a turbo-fan 70 and flight control surfaces; FIG. 4B shows the bagtoon 60g inflated with a pocket of LTA gas 58. FIG. 4C shows the X-sectional view of a variant hybrid bagtoon 60h incorporating a layer of LTA gas on the upper portion; a rudder; and a ramjet 71 at the bottom. FIG. 4D shows a rectangular shaped windbag 60i; FIG. 4E shows a cylindrically shaped windbag 60j. FIG. 4F and FIG. 4G shows details of a hybrid morphing bagtoon 60k integrated with LTA gas and engine 70a; transforming from a small bag into a large windbag. FIG. 4H shows a variant form of hybrid morphing bagtoon 60l integrated into, sandwiched between two flattened pieces of top and bottom plates 74; flight control surfaces, turbo-fans 70b, 70c; winches 59 and bridle lines 66.

FIG. 5A to FIG. 5D shows details of multiple windbags 30 towed by an UAV 80. FIG. 5B shows a UAV 80; FIG. 5C and FIG. 5D shows variants of the UAV 80.

FIG. 6A to FIG. 6I shows details of a "morphing bag-craft 90"; transformation and morphing from a thin elliptical vehicle into a wide mouthed windbag 90z. FIG. 6A and FIG. 6B shows the plan view and front view of a "Morphing bag-craft 90." FIG. 6C to FIG. 6I shows the different stages of morphing.

FIG. 7A shows details of a "wind-craft 100" a huge windbag 30 mounted on a rocket-shaped inflatable structure 99; while FIG. 7D shows a variant "wind-craft 100b" mounted with multiple units of windbags 30 integrated with a turbo-fan 70d powered by an engine.

FIG. 8A shows details of a submarine "Water-Craft 200" a huge water-bag 40 mounted on a torpedo-shaped body 201 integrated with UUVs 230; propeller 240; encapsulated bridge 211. FIG. 8B shows the deployment of a gigantic hybrid water-bag 40 by means of UUVs 230 and submarine-boats 220.

FIG. 9B shows a Hybrid Morphing Vehicle 90c. FIG. 9C shows a HUV-200a. FIG. 9D shows a variant apparatus HUV-200b of FIG. 9C.

FIG. 10A shows details of a variant hybrid vehicle with segmented body which may be configured as a HUV 200c; or a HAV-100g. FIG. 10B shows a variant HUV-200d/or HAV-100h. FIG. 10C shows a variant vehicle HUV-200e or/HAV-100i of FIG. 10B.

FIG. 11A to FIG. 11D shows details of the integration of retract line 33w with tether line 50; and its use. FIG. 11E to FIG. 11H shows a variant method of using an integrated retract-tether line 33y, 33z and 50. FIG. 11I to FIG. 11J shows a variant method; FIG. 11K to FIG. 11L shows an emergency method for depowering a vehicle.

FIG. 12A shows details of a mobile generation system 55. FIG. 12B to FIG. 12C shows a morphing flywheel. FIG. 12D to FIG. 12F shows a method of adding new fresh spools of tether lines to running spools. FIG. 12G shows a method of using shifting-bladders to balance a vehicle's body. FIG. 12H to FIG. 12I shows variant ram-air-jets. FIG. 12J shows the use of inflatable ribs for the windbag or water-bag.

FIG. 13A shows details of the systematic arrangement of HAVs-100 in a HAWE extraction plant 280. FIG. 13B shows the angular inclination of the flight trajectories of HAVs-100. FIG. 13C shows a method of elevating the launch points of HAV-100. FIG. 13D shows a method of station hopping used by HUVs-200; FIG. 13E shows the retraction of vehicles. FIG. 13F shows a variant HUV-200f or HAV-100j. FIG. 13G shows a combined use of HAV-100 and HUV-200. FIG. 13H shows differing uses of a plurality of HAV-100.

FIG. 14A to FIG. 14G shows details of a riverine generation system 310. FIG. 14A shows the plan view. FIG. 14B shows the sectional view 14B-14B. FIG. 14C shows details of FIG. 14B. FIG. 14D shows an elevator lift system 309. FIG. 14E shows a variant system 311. FIG. 14F shows apparatus 312. FIG. 14G shows a magnetized lines locking-unlocking system.

FIG. 15A shows the perspective view of generation system 320. FIG. 15B shows a sectional view of FIG. 15B-15B; FIG. 15C shows a sectional view 15C-15C.

DETAILED DESCRIPTION OF THE INVENTIONS

Figure 7A:
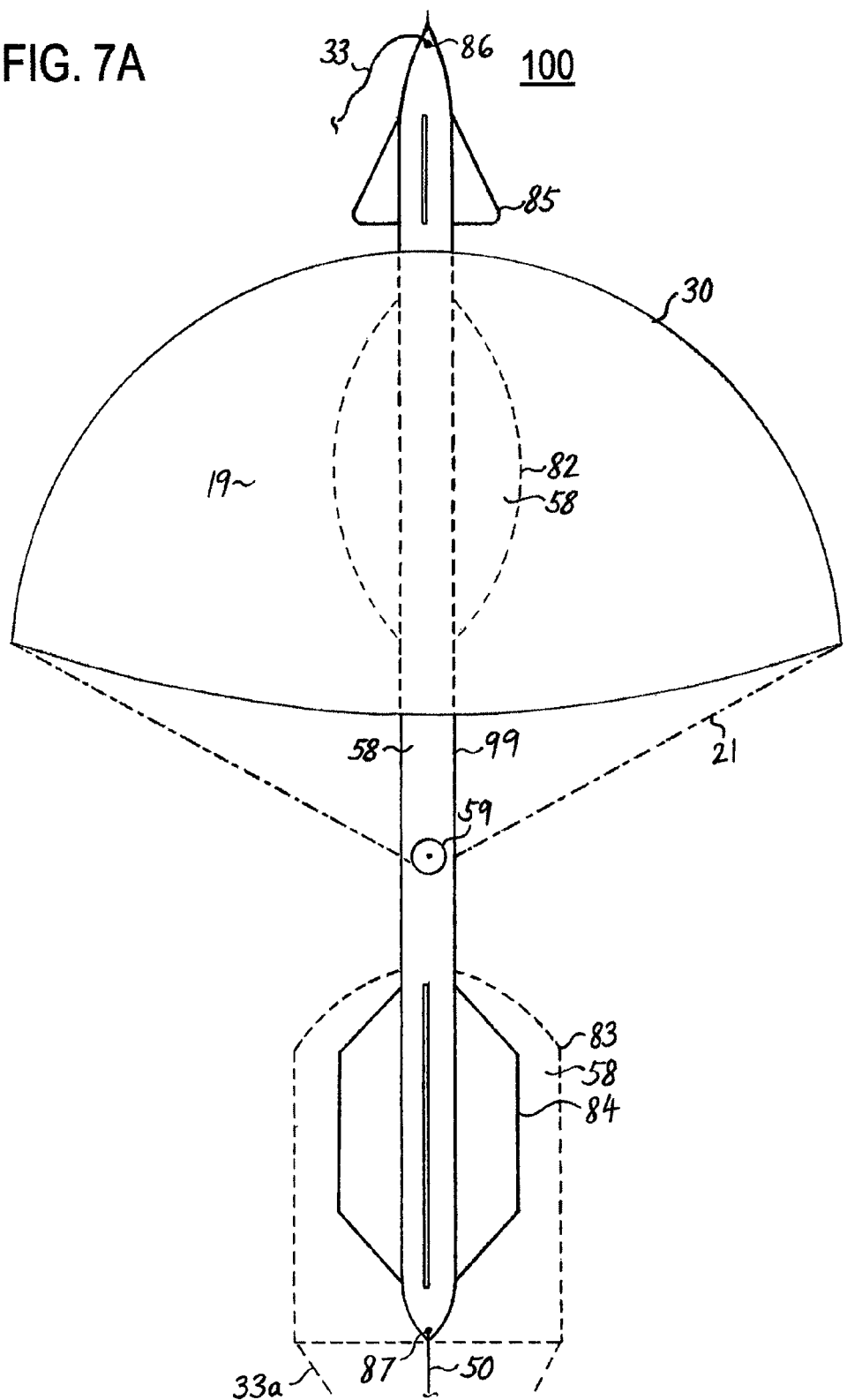

The structural configuration, concept and method of providing a plain air-bag, a windbag and/or a water-bag to trap and capture moving air current (wind) and/or water current, get carried along as it is swept away by the fluid's movement; for the generation of electricity; is herein disclosed. Using a windsock-shaped bag with a gaping "mouth" and enclosed rear-end to entrap, to capture moving wind/or water current; extracting, transforming its kinetic energy into mechanical and then electrical energy by means of a tether. In free "flight"/or flow; the windbag and/or water-bag may travel a longer distance horizontally; than rise in height/or sink in depth vertically. Due to lack of generation of aerodynamic lift, bags are incapable of actual aerial flight; in the real sense of the word "flying" as kites and planes are capable of. A windbag is only capable of actual aerial flight when integrated with airborne flying apparatus comprising: balloons/or shaped-inflatable bodies filled with lighter-than-air gases; manned and unmanned aerial vehicles; etc. Integrated with such apparatus, windbags may be used to engage, trap and capture High Altitude Wind Energy (HAWE); High Altitude Wind Power (HAWP). Unlike the spinning blades of conventional wind-turbines and under water turbines which may harm and kill animals and plants; windbags 30 and water-bags 40 traps and then spills the fluids without harming wildlife.

The working principle of a windbag/or water-bag lies in entrapping, capturing and encapsulating the surrounding fluid medium; and moving together in the direction of its current/or flow to another location downstream, gradually sapping its kinetic energy. Due to this structural configuration in terms of vertical scalability and quantum leap in generation capacity; a wind-bag is capable of delivering much higher payloads and thus capable of generating much more power than other similar apparatus: for example, a kite (of equivalent surface area). Though the bags and vehicles requires customization; most of the raw materials required including the bag fabrics, tether lines, bridle lines, guide lines, anchoring cables, etc. are readily available; thus cheaper production cost of electricity. Most of the capital outlay may be used for acquisition of farmland and construction of infrastructure. The airborne system may comprise of: customized windbags and tether (Drive Unit 51); Generation Modules housing the tethers-line reels 52, gear-box 53, generators 54 (Driven Unit 55); computerized ground control systems, control links; navigators; supporting systems, equipment; radar system, GPS; Inertial Navigation System; high rise surface platforms for launching and retrieving windbags; airborne platforms comprising specialized "Hybrid Air Vehicles" (HAV-45), "Hybrid Bagtoons 60," "Morphing Bag-Crafts 80," "Hybrid Air Vehicles" (HAVs-100) comprising of windbags 30 integrated with rocket-shaped inflatable bodies 99 filled with LTA gas and/or powered by turbo-fans 70d; multiple windbags 30 spear-headed by a UAV 80; parking aprons, control and command centre; Unmanned Aerial Tow Vehicles (UATV) 80a, balloon-lifting systems; power collection grid; etc.

Whereas, the water-bags 40 used for harnessing swift flowing water current may require a simpler arrangement as water is 829 times denser than air. The waterborne system may comprise of: customized water-bags 40; hybrid water-bags 210 integrated with balloons and UUVs 230; submarine "Hybrid Underwater Vehicles" HUVs-200 consisting of water bags 40 integrated with torpedo-shaped-underwater-vehicle body 201 powered by engines and propellers 240; multiple bags spearheaded by an unmanned underwater vehicle (UUV) 230; Generation Modules housing the tether reel drums 52, gear-box 53, generators 54; computerized surface control systems, control links; supporting systems, equipment; location indication apparatus; floating surface based platform flexibly connected to fixed anchoring posts, beams, subsea piles; sonar system, underwater cameras, sonar systems, Remotely Operated Vehicles (ROV), Unmanned Underwater Vehicles (UUV) 230, dual purpose submarine-boats 220; control and command centre; power collection grid, submarine cables, battery tankers, floating-production-storage-offloading vessels (FPSO); etc. The waterborne platform may be integrated with highly specialized equipment used by the Unmanned Underwater-Vehicle System (UUS) infrastructure. An object of present invention is to provide a method and system including facilities, equipment, apparatus and techniques for the large scale capture and extraction of kinetic energy 11 derived from the mass movement of natural fluids comprising the: (i) flow of wind 10 currents; including the high velocity winds of high altitude and the Jet Streams; (ii) flow of water 20 current of streams, rivers, sea, oceans, etc.; including deep sea water currents; ocean gyres; Gulf Stream; Kuroshio; Antarctic Circumpolar Current (ACC). All these mass movement of natural fluids (10, 20) may be harnessed to do useful work by means of present invention. As the more it moves, the more it yields.

In operation, the collapsed mass of bag fabrics 40a may be transformed from a long, limp and thin fabrics into a large semi-spherical, balloon/or windsock shaped water-bag 40 with a large circular intake port 25 and cavity 19. The quantum of power that might be generated by a water-bag 40 with an intake port measuring: for example, 100 m to 300 m wide (diameter) travelling a distance of 10 km to 30 km in high velocity marine current might be measured in the tens of megawatts; whereas, hundreds/or thousands of like water-bags configured to run concurrently round the clock might produce enough power for provisioning cities. An ultra high capacity, high payload; and environmentally friendly method, system, apparatus, equipment and techniques configured with vertical scalability and a quantum leap in generation of renewable green energy: electricity, productively and efficiently for commercial use.

Different methods may be used for deploying and launching plain power bags for generating electricity such as: (a) mobile surface based launch platforms. (b) airborne platforms for launching "free flying" windbags 30; water based launch platforms for free flowing water-bags 40; and (c) fixed surface launch platforms used in combination with airborne platforms comprising tethered stationary airships; fixed surface launch platforms used in combination with subsea platforms (submerged platform affixed by piles, suction cups, semi-submersible, jack-ups, platform tethered to the seabed, etc.). In one embodiment, land based launch platform/pad affixed to the ground; the top deck and sides of high rise towers hundreds of meters in height may be used for launching windbags. Wind will normally be strong at such a height. A windbag mounted on a launcher frame may be inflated by the wind current and ready to take-off. When the wind-bag is released in such a flying launch, it travels horizontally/inclined at an angle; opening up the bag canopy; pulling on the restraining tethers 50; which in turn, turned a reel drum 52 and generator 54 to produce electricity; deflated at the end of run; pulled in by means of tether lines to return near to the launch platform; where it is released again. The windbags may be configured in various shapes, sizes and forms comprising: spherical; oblong; square; rectangular; tapered; long wind-sock; etc. The annulus 22 of the wind-intake port 25 and air-ribs 277 may be configured to be inflatable and deflate-able. Water based launch platform may also be used at sea comprising: fixed platforms; semi-submersible; mobile surface floating base; jack-ups; ship based; to launch windbags 30 and water-bags 40. The number of lines (e.g. 2, 4) shown in the diagrams are only for illustration. Any number of tethers lines 50; bridle lines 21; and their respective attachment points may be used where applicable, as long as they serve the needs. Present invention places no limit on their quantity.

FIG. 1A illustrates details of a windbag 30 with wind filled cavity 19 and an annular ring 22 at the front attached to bridle lines 21. The inflated annulus 22 forms the periphery of wind intake port 25 enabling the windbag 30 to keep its "mouth" in an open position; and prevents the intake port 25 from collapsing for the duration of a power run. The size of the intake port 25 may also be adjusted by means of an embedded string 23 mechanism located behind the annulus 22 in order to control the quantity of wind intake; and thus, the velocity, pulling power (kinetic energy) of windbag's power run. For the larger and bigger the opening of the intake port 25, the stronger and more powerful is the pulling force of the windbag 30. Air may be pumped into the annulus 22 by means of valve 24 to inflate, maintain and keep the intake port's circular shape, and to keep it open as and when required. Bridle lines 21 may be attached to the wind intake port 25 at points 26, 27, 28, 29; and join the tether line 50 at point 31.

FIG. 1B to FIG. 1D illustrates details of a windbag 30 in power run phase (FIG. 1B) being unpowered at the end-of-run (EOR) phase (FIG. 1C) by means of a retraction line 33 attached to point 32 at the end-tip of the windbag; forming a collapsed bag (FIG. 1D) which may be retracted speedily back to ground zero/or the SOR point 16 for redeployment. FIG. 1B illustrates a fully inflated windbag 30 attached by bridle lines 21 at the wind intake port 25 travelling from left to right (refer arrow of wind 10 direction W). The bridle-lines 21 are connected to a tether line 50 at point 31 which is in turn attached to and pulls a load comprising the reel-drum 52 and generator 54 (not shown), which comprises the drag or tension force. A retracting line 33 is attached at point 32 to the apex, the end-tip of the windbag 30 internally and moves freely (no load) via appliance 36. The retract line 33 may be teed-off via line 33a to a stopper 34 affixed onto the air release valve 24a of the annulus 22 of the wind intake port 25.

FIG. 1C illustrates windbag 30 undergoing retraction and un-powering at the EOR phase, forming a semi-retracted bag. The retract line 33 and the end-tip of windbag 30 at point 32 is stopped from moving forward L-R (refer arrow W); while the tether 50, bridle-lines 21, windbag 30 and wind intake port 25 continues with its forward travel (L-R). Alternatively, the retract line 33 and the end tip point 32 of the bag 30 may also be pulled backward (R-L); while the tether 50, bridle-lines 21 and wind intake port 25 continues with its forward movement (L-R). As a result, the windbag 30 is flipped over and turned inside out. At the same time, the teed-off portion 33a of the retract line 33 pulled on the stopper 34 of the air release valve 24a, deflating the annular ring 22 of the intake port 25 as air escaped. The wind intake port 25 lost its turgid shape, and the windbag 30 became deformed as a result. FIG. 1D illustrates a collapsed windbag 30a which had been turned inside out with the bag fabric materials 30a, bridle lines 21 and tether 50 forming a crumpled mass of fabrics. The retract line 33 is pulled backward R-L in the direction of the start-of-run (SOR) point; while the slackened bridle lines 21, tether line 50 moves freely; and are reeled backward R-L at the same time. The collapsed bag 30a is retracted to the SOR point/or, ground zero 16 for redeployment.

FIG. 1E illustrates the annular ring 22 with the teed-off portion of retract line 33a, stopper 34, air release valve 24a; for partially deflating the wind intake port 25. The annular ring 22 may be configured with two air valves: air inlet valve 24 includes a check valve for inflating the annulus 22 and; an air outlet valve 24a incorporating a manual plug 34 fitted to the stem of valve 24a. Plug 34 maybe pulled and dislodged by means of the teed-off portion 33a of the retract line 33, to deflate the annulus 22. A release of 20 percent of the annulus's content might be adequate to deform the intake port 25. Capsules of carbon-dioxide ($CO_2$) 35 may be used for high altitude release by means of radio frequency (RF) signal activation, mechanical differential pressure release, etc. to maintain the inflation and turgidity of the annulus 22 to keep the wind intake port 25 open.

FIG. 1F and FIG. 1G illustrates a twin layered annular piece 36 comprising of outer tubes 36a, 36b and inner tubes 37a, 37b. The two halves of the twin layered tubes are connected by double swivel rings 38, 39; such that each half rotates freely from the other half. Apparatus 36 may be installed at point 31 and used for securing the multiple bridle lines 21 to the tether line 50. Apparatus 36 allows the bridle lines 21 (attached to tubes 36a and 37a) to rotate freely from the tether line 50 (attached to tubes 36b and 37b) by means of twin swivel joints 38, 39; and at the same time, enables the retract line 33 to pass freely through the inner layered tubes 37a, 37b. Such an apparatus 36 allows the retract line 33 to move freely without getting entangled with the bridle lines 21 and/or tether line 50. A swivel joint may also be attached at point 32 between the retract line 33 and the end tip of the windbag 30; allowing the windbag to rotate freely without twisting and/or kinking retract line 33.

FIG. 2A illustrates an embodiment wherein, an airborne platform 44 comprising balloons, blimps, airships, aerostats, Hybrid Air Vehicles (HAV) 45, etc. may be established and used as an intermediate aerial platform for launching and retracting windbags 30. The stationary aerial platform 44 may be secured to the ground by means of mooring lines 46. A plurality of two or four units of tethered HAVs 45 may be used to lift a multi-tiered airborne work platform 47 at a height of 1 to 10 km for launching and retracting plain windbags. Work platform formed by horizontal crossbar 47 may be fitted with pulley wheels 48 for use as a fulcrum for the tether lines 50 to move freely between the ground based reel-drums 52, gear box 53 cum generators 54 and the windbags 30. The windbags 30 and tether line 50 comprises the drive unit 51; the reel-drums 52, transmission gear box 53 and generators 54 comprises the driven unit 55. Bags on power run (refer wind direction W blowing from left to right, L-R) are unpowered at the EOR and retracted back (R-L) to the SOR point 16 proximate the work platform 47. The retracted bags 30 are then redeployed again (L-R).

FIG. 2B illustrates the driven unit 55 of FIG. 2A comprising the line reel-drum 52; transmission gear box 53; generator 54. A winching motor 49 may be incorporated for operating the line reel-drum 52 to reel-in and retract back the tether line 50 and windbag 30. The tether lines 50 may also be used as power cables and signal transmission lines. The HAVs 45 may also be connected by means of hoses to a ground based compression system comprising: LTA gas compressor, coolers, gas storage tanks; in order to increase or decrease helium filled gas cells to adjust its buoyancy. An airborne gas compression system may also be used for generation of variable buoyancy.

FIG. 3A to FIG. 4H illustrates windbags 30 flexibly integrated with balloons and/or motorized propulsion systems forming: a hybrid bag-balloon cum self-propelled apparatus 60 herein assigned the name: "Hybrid Bagtoon 60." While FIG. 4F to FIG. 4H illustrates variant "Hybrid Morphing Bagtoons 60k and 60l." Due to its airborne buoyancy and self-lifting capability, a hybrid bagtoon 60 is able to ascend autonomously up to high altitude with the collapsed fabric materials 30a of windbag 30; open up the wind intake port 25 of the windbag 30; capture and trap the fast moving high altitude wind 10; and move along with the wind current; pulling its tether 50 attached to reel drum 52 cum generator 54 to generate electricity. Hybrid bagtoons 60 systems may be flexibly integrated with the UAS (Unmanned Aircraft System) infrastructure used for operating and controlling UAVs.

FIG. 3A to FIG. 3L illustrates a number of plain windbags 30 variously integrated with aerodynamically shaped inflatable pockets 56 and/or bodies 57 (balloon) filled with lighter-than-air (LTA) gas 58 enabling self-levitating capability. FIG. 3A illustrates a hybrid bagtoon 60 with a pocket of helium gas 56 at the apex; to which is affixed a retract line 33 at point 32 on the internal of the bagtoon 60; moving freely through the double annular ringed apparatus 36 as disclosed in FIG. 1F and FIG. 1G. The FIG. 3B illustrates a pliable wind inflatable sleeve 41 on the external surface of the bagtoon 60 which may assist in capturing passing wind current outside the bagtoon.

FIG. 3C illustrates a variant hybrid bagtoon 60a to which is attached the retract line 33 at point 32a, on the external of the apparatus. Retract line 33 is flexibly connected to the tether line 50 by means of a double sliding ring 61. The ring 61 on the tether line 50 may be affixed permanently while the adjacent ring through which the retract line 33 passes allows it to move and slide freely along-side tether line 50. FIG. 3D illustrates the double sliding rings 61 affixed to the tether line 50; while flexibly holding the mobile retract line 33 in position. The bridle lines 21 are attached to the tether 50 at point 31 to apparatus 36. Apparatus 62 comprising an integrated camera, altimeter and GPS may also be attached to the tether line 50 at point 63 and 64 to monitor the bagtoon 60a. FIG. 3E illustrates a conically shaped, variant hybrid bagtoon 60b incorporating semi-rigid or rigid frame 65. The light weight frame 65 may be sewn, embedded or enclosed inside double layered fabric 67 surrounding the bag's 30 periphery (refer FIG. 3H) providing form, shape and support to the bag's structure.

FIG. 3F and FIG. 3G illustrates a variant hybrid bagtoon 60c which may incorporate lines 66 embedded or enclosed in pieces of pliable plastic tubes 68 double its diameter; and the short pieces of plastic tubes 68 concealed inside of double layered fabrics 67 ringing the windbag's periphery, horizontally and vertically; as illustrated in the cross-sectional view of FIG. 3H. Lines 66 may be connected to retract line 33. Such an arrangement ensures ease of movement of the lines 66; such that they may be tightened or loosened with minimum application of force; in order to deploy or retract the hybrid bagtoon 60c as and when required by means of retract line 33. The bridle lines 21 and the tether lines 50 are slackened while the retract line 33 may be pulled, tightening the lines 66 to reduce the circumference and wind intake port 25 of the bagtoon 60c; forming a mass of collapsed fabric materials 30a as illustrated in FIG. 3G; which shows the retracted bagtoon 60c with the fabric materials 30a of windbag 30 clinging to the football shaped balloon 56 filled with LTA gas 58. Retract line 33 may be pulled and used to reel in whole apparatus. FIG. 3I illustrates a variant of FIG. 3H wherein bag fabric materials 30a may be attached with curtain rings 68a having a hole in the middle through which line 66 runs. Such pieces of curtain rings bearing a hollow ring 68a may be sewn onto bag fabric material 30a. The hollow curtain rings 68a may be made of plastics, polymers, fiber glass, metals, etc. which helps and ease the sliding of line 66. At the bottom portion, this may be similar to curtain hem lines; while like arrangements may be integrated into the bag fabric materials 30a vertically and or horizontally.

FIG. 3J illustrates another variant hybrid bagtoon 60d which is integrated with a shaped inflatable body 57 filled with LTA gas 58. Inflatable body 57 may be aerodynamically shaped for ease of aerial traverse and at the same time, provides a structural platform to enable mounting of winches 59 to operate lines 66 to deploy or retract the windbag 30. The inflatable body 57 also provides a mounting structure for bridle lines 21 affixed to annular ring 22 of the wind intake port 25, tether line 50, apparatus 62 comprising camera, altimeter, GPS; navigation lights, etc. FIG. 3K illustrates a hybrid bagtoon 60e incorporating a compartment 56 of lighter-than-air gas 58 at the apex or end-tip; and stripped pockets 56a of LTA gas on the top surface; keeping the bagtoon 60e in an upright position. FIG. 3L illustrates a variant hybrid bagtoon 60f in which a plurality of windbags 30 may be attached to and use the same bridle lines; thus imparting tensional force from multiple bags onto a single set of bridle lines 21 and the tether line 50. The inner bag 30 may be attached to bridle lines 22 at points 26, 27, 28, 29. The outer bag 30x may be attached to the same bridle lines 22 at points 26x, 27x, 28x, 29x. Externally located retract line 33 may be attached to inner bag 30 at point 32a; and passes through the outer bag 30x at point 32b by means of a hollow ring. When the retract line is pulled, the plurality of bags 30 and 30x turned around 180 degrees; the bag materials collapsed; bag 30 and 30x are pushed into close proximity. Note: this arrangement may also be used for the water-bags 40 system.

FIG. 4A and FIG. 4B illustrates a semi-rigid shaped hybrid bagtoon 60g integrated with a turbo-fan 70 on the top surface 77 and flight control surfaces 69, 69a enabling the hybrid bagtoon 60g to generate aerodynamic lift and forward movement. Engine 70 may be tilted up or down to adjust its angle. Bags 56 of LTA gas 58 may be integrated into hybrid bagtoon 60g internally (fore) providing additional airborne buoyancy and lift. FIG. 4A illustrates a deflated bag 60g; while FIG. 4B illustrates an inflated bag in power run with its annular ring 22 inflated and the wind intake port 25 fully open. The bag materials 30a may comprise of light weight semi-rigid plastics or polymers. FIG. 4C illustrates a variant hybrid version 60h of bagtoon 60g with a body 57 of LTA gas 58 on the top portion of the bagtoon 30 providing lift; while the weight of a ramjet 71 located at the bottom kept the self-balancing bagtoon in position. Wind powered ramjet 71 may be used to supply compressed air or electricity to operate on board equipment. The bag is shown in fully open frontal position; and may be collapsed with the upper and lower halves brought together. A jointed folding seam 72 may be incorporated into the construction. The two portions forming the jointed folding seam 72 may be detached; and folded seams of fabric materials kept in between seam 72 may be extended to increase the width of the bagtoon 60h (FIG. 4F and FIG. 4G). FIG. 4D and FIG. 4E illustrates variant forms of hybrid bagtoons; in the shape of a rectangular bagtoon 60i; and a long cylindrical bagtoon 60j. The terms ramjet 71, 71a, 71b and ram-air-jet 71, 71a, 71b are defined as a ram-air-turbine 71, 71a, 71b.

FIG. 4F and FIG. 4G illustrates a variant hybrid morphing bagtoon 60k which changes its body size from a small, compact and crumpled mass of fabric (strapped by means of winches and lines 66 onto supporting bar 73 and cylindrical balloon 57) into a cylindrical body (FIG. 4F); then morphing into a huge cavity (FIG. 4G). Powered by a turbo-fan 70a equipped with flight control surfaces, the hybrid morphing bagtoon 60k may be capable of ascending to a high altitude by means of a body of LTA gas 58 and turbo-fan 70a; deploy its windbag 30 by means of winches 59; which releases the folded up fabrics by means of slackening lines 66 enclosed in the periphery of the windbag 30 as illustrated in FIG. 4G; and morphs into a bagtoon with a cavity 19 many times its original size. Enabling capture of a large volume of high speed wind in order to harness its kinetic energy. Winches 59 and turbo-fan 70a may be mounted on a supporting bar 73. Turbo-fan 70a may be adjusted to change the direction or control the flight of the whole bagtoon 60k. Optionally, an Unmanned Aerial Tow Vehicle (UATV) 80a may be used to tow bagtoon 60k up to the target height prior to deployment.

FIG. 4H illustrates a variant hybrid morphing bagtoon 60l with the bag fabric materials 30a compactly folded in between two light-weight plates 74 of the apparatus; propelled by twin turbo-fans 70b, 70c providing aerodynamic lift; the air inducted flows through small ports 78 onto the top surface 77. Morphing bagtoon 60l includes flight control surfaces 69, 69a. The turbo-fans 70b, 70c may be swiveled by means of its pivoting configuration and turntable 75 to provide directional propulsion. At the target height, the apparatus may be deployed by means of winches 59 which slackened the lines 66; opening the wind intake port of the windbag 30; aspirating the high speed wind; opening up the fabrics 30a to maximum; to capture a large volume of wind. Flight control surfaces 69a may be retracted and kept between the plates 74 when not in use. Optionally, morphing bagtoon 60l may be tethered to LTA balloons to ascend speedily.

Thus, plain windbags 30 may be flexibly integrated with turbo-fan 70 and shaped inflatable pockets 56 and bodies 57 (balloons) filled with lighter-than-air gases 58 and used to achieve self-sustainable buoyancy and self-propulsion capability; and to bring the windbags 30 from ground level up to a high altitude before the hybrid-bags, hybrid bagtoons, powered bagtoons, hybrid morphing bagtoons, etc. may be deployed to harness high altitude wind energy to generate sustainable and renewable power. Use of LTA gases in the bagtoons may comprise of: helium and hydrogen. Helium gas may be recycled and kept in storage for reuse; while hydrogen gas may be expendable wherein, it may be partially or totally released during operation whenever required.

FIG. 5A to FIG. 5D illustrates another embodiment of harnessing high altitude wind power by means of a multitude of cone-shaped windbags 30 connected in series pulling a single tether 50; spearheaded by an Unmanned Aerial Vehicle (UAV) 80; herein called airborne apparatus 76. The windbags 30 may be attached to the tether 50 at point 31. Bag 30 is not attached to, but slides through tether 50 at point 32. The retract line 33 is affixed to the bag 30 at point 32. UAV 80 provides the necessary buoyancy, lift and directional controls required to bring the windbags 30 up to high altitude; and to retract the bags. FIG. 5A illustrates this method of using multiple windbags 30 combined with an aerial machine 80 to generate electricity 14. Note: The seaborne apparatus (222) as illustrated by FIG. 5A may also be used for the water-bags 40 system spearheaded by an UUV 230. FIG. 5B illustrates a manta-ray shaped UAV 80 with an engine powered turbo-fan 70c in the centre. Flight control surfaces may comprise of: rudder 69, fore fins and winglets 69a, aft fins and winglets 69b. The UAV 80 controls the operation of the entire airborne apparatus 76; taking orders from navigators located at ground zero 16. At the EOR phase, the tether line 50, reel-drums 52 cum generators 54 were un-clutched and freed; while the UAV 80 does an about-turn; flying a U-turn (Right-Left) to return to SOR point or ground zero 16. The windbags 30 followed suit, collapsing into mass(es) of fabrics as the tether 50 is pulled against (Right-Left) the wind 10 direction marked W (Left-Right). The windbags may also be retracted by means of retract line 33 attached to the windbags at point 32.

FIG. 5C illustrates one version of a UAV 80 with a vertical axis turbo-fan 70c mounted on the top surface 77 of the craft. The turbo-fan 70c inducts air from the top surface providing slight lift to the UAV 80; while the inducted air is discharged through the periphery of the motorized turbo-fan 70c by means of a plurality of small holes 78. This discharged air flows at high speed over the top surface 77 of the UAV 80; while airspeed at the bottom surface remains the same; thus providing aerodynamic lift to lift the craft vertically upward. The turbine-fan 70c may also be adjusted and inclined at an angular direction for providing fore, aft, port and starboard propulsion. FIG. 5D illustrates a variant UAV 80 with the turbo-fan 70d kept inside the vehicle's body. The air inducted by the fan 70d is compressed and directed to exit by means of a plurality of small ports 79 mounted on the upper 77 or lower surface of the UAV 80 for provision of aerodynamic lift. Optionally, UAV 80 may comprise of a HAV with bodies 57 of LTA gas 58; or, airplanes manned by pilots. UAV 80 may also comprise of a hybrid aerial vehicle (HAV) with 90-95 percent of its body weight supported by bodies 57 of LTA gas 58 comprising helium gas. While the engine provides propulsion for lifting the remaining 5-10 percent of the HAV's weight, lightweight windbags 30, tether line 50, etc.

FIG. 6A to FIG. 6I illustrates a tethered manta-ray shaped Unmanned Aerial Morphing Vehicle (UAMV) 90; herein assigned the name: "Morphing Bag-craft 90" which may be transformed from an elliptically shaped vehicle 90 into a huge windbag 90z; with a gigantic cavity 19; enabling capture and entrapment of a volume of wind many times its original body capacity. FIG. 6A illustrates the plan view of morphing bag-craft 90 with flight control surfaces comprising: vertically disposed rudder 69, horizontally disposed fins and winglets 69a, 69b located fore, aft, port and starboard. FIG. 6B illustrates the elliptically shaped front view; a ramjet 71 may be affixed below the bottom surface 90b of the morphing bag-craft 90; which may be configured in two portions comprising of: an upper portion 90a and a lower portion 90b. Fabric materials 30a forming the windbag 30 may be folded and stored inside the cavity formed between the upper and lower portions 90a and 90b. The fabric materials 30a may be deployed and retracted by winches 59 (not shown) and enclosed lines 66 at an operational height of 1 m to 30 km above earth's surface. Morphing Bag-craft 90 may be flown up to the desired altitude under its own power/or by means of electric power supplied via cable-tether 50; morphing into a windbag 90z; aspirating high velocity wind 10; undergoing power run; to generate electricity by means of the attached bridle lines 21 and tether 50. Balloons filled with LTA gas may be externally attached to provide additional lift. The terms ramjet 71, 71a, 71b and ram-air-jet 71, 71a, 71b are defined as a ram-air-turbine 71, 71a, 71b.

FIG. 6C to FIG. 6I illustrates the gradual morphing and transformation of the thin elliptically shaped craft 90 into a gigantic semi-spherical windbag 90z. FIG. 6C illustrates the front view wherein the annular ring 22 at the front of the morphing bag-craft 90 may be inflated; forming the wind intake port 25. FIG. 6D illustrates the side view with further enlarged internal cavity 19. The wind intake port 25 may be further enlarged as illustrated in FIG. 6E and FIG. 6F; the fabric materials 30a connecting the top and bottom portions of the vehicle may be further extended; while the morphing bag-craft 90 remains joined at the rear tail portion at point 81.

In FIG. 6G, the rear tail portion joining point 81 may be dislodged from each other thus physically separating the top portion 90a and bottom portion 90b of the vehicle. This mechanism may be likened to the jaws of the anaconda boa constrictor in which the joints of the jaw bones may be flexibly detached to enable the snake to swallow a prey several times the (radial) body size of the creature itself. Additional windbag fabric materials 30a may be unfurled and lines 66 extended by winches 59 (not shown) providing extra volume for capture of more high velocity wind. Whereas in FIG. 6H, the annulus 22 of the wind intake port 25 may be maximized. All fabric materials 30a and lines 66 abroad the vehicle 90 may be maxed out and released as illustrated in FIG. 6I forming a fully morphed bag-craft 90z with a wind filled volume and cavity 19 many times the original volume of the morphing bag-craft 90 as illustrated in FIG. 6A and FIG. 6B.

FIG. 7A to FIG. 7F illustrates a "Wind-craft 100" comprising of a windbag 30 mounted on a rocket-shaped inflatable body 99 propelled by turbo-fan 70d; the Hybrid Aerial Vehicle (HAV) 100 is herein assigned the name: "Wind-craft 100." Deployed wind-craft 100 resembles a large airborne umbrella; a drawn cross-bow/or an aerial mushroom shaped canopy. FIG. 7A illustrates a wind-craft 100 in which the inflatable body 99 may be wholly filled with; and fully dependent upon LTA gas 58 for aerial lift and buoyancy. Additional buoyancy may be provided by means of detachable bags 82 of LTA gas 58 attached to the fore of structure 99; a large booster body 83 attached to the aft section; or a turbo-fan 70d. These auxiliary apparatus 82, 83 may be detached and released at target height; and reeled back to ground zero 16. Aircraft flight control surfaces comprising adjustable rudder-fins 84 located aft, fins and winglets 85, ailerons, at the fore may be used for flight management. Retract line 33 may be attached at point 86; tether 50 at point 87; windbag 30 bridle lines 21 may be operably connected to winches 59 mounted on the body 99 of wind-craft 100.

Apart from the cylindrically shaped inflatable body 99; other forms of variant aerodynamic and/or streamlined structural bodies may also be adapted for providing structural support comprising: the body shape of cruise missiles, airplanes, airships, space-shuttles, space-crafts, etc. Winches 59 may be installed on the structural framework provided by the inflated body of rocket-shaped balloon 99 and used for operating the wind intake port 25 of the windbag 30 as in FIG. 3J. Other equipment may also be mounted on and carried by the structural body 99 such as: flight control surfaces; cameras, GPS, sensors, electronic RF broadcast equipment to alert and warn other airborne systems (e.g. airplanes, balloons, gliders) to keep away; proximity-collision warning systems, computerized control equipment; etc. Retract line 33 may be used to retract the apparatus at the EOR phase. The retract line 33 may be pulled backward while the tether line 50 may be slackened and freed at the reel-drum mechanism 52 (zero tensile force). The apparatus made a U-turn/or an about-turn to return to SOR point/or ground zero 16.

Figure 7C:
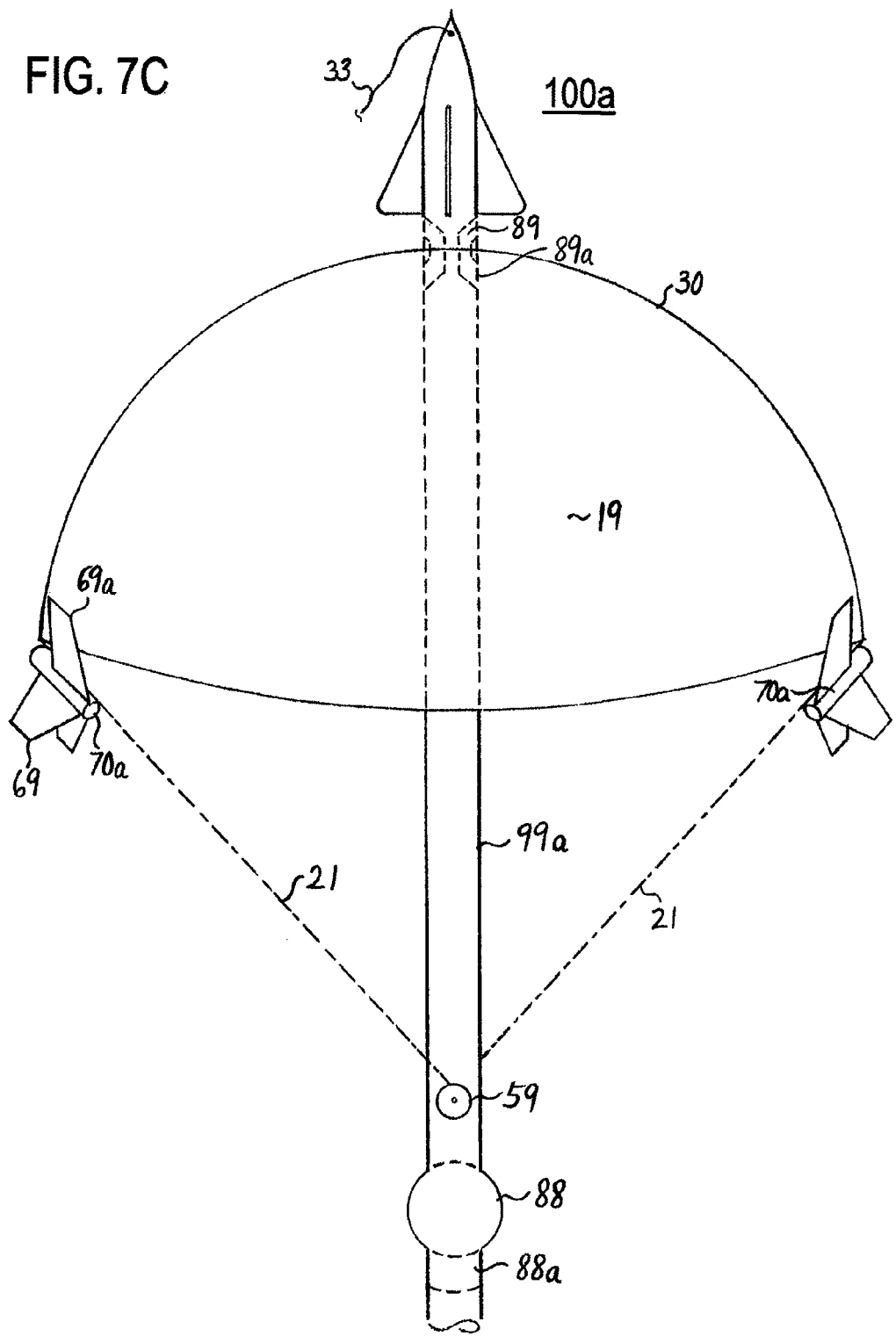
FIG. 7C shows a variant wind-craft 100a integrated with engines 70a, cockpit capsule 88 and wind escape ports 89.
Figure 7E:
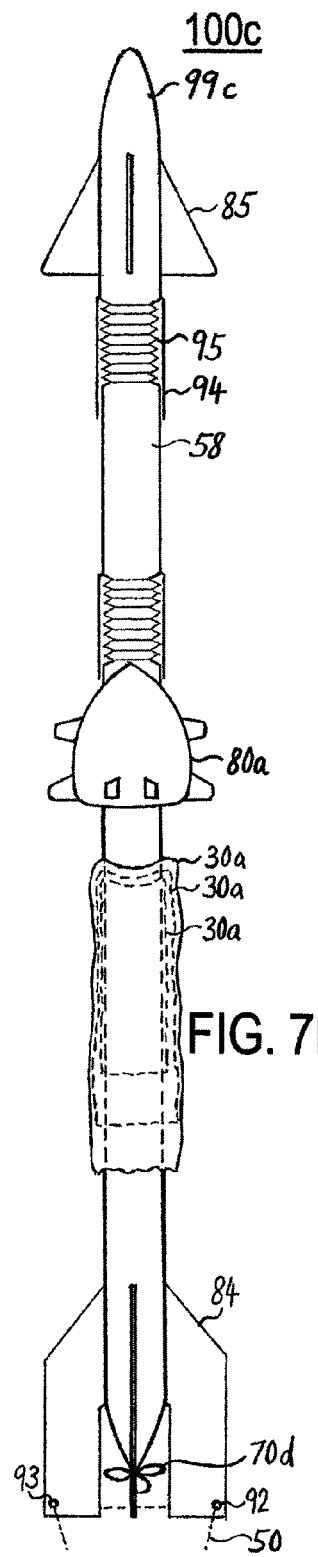
FIG. 7E shows multiple units of collapsed sliding windbags packed together on a variant rocket balloon 100c.
Figure 7B:
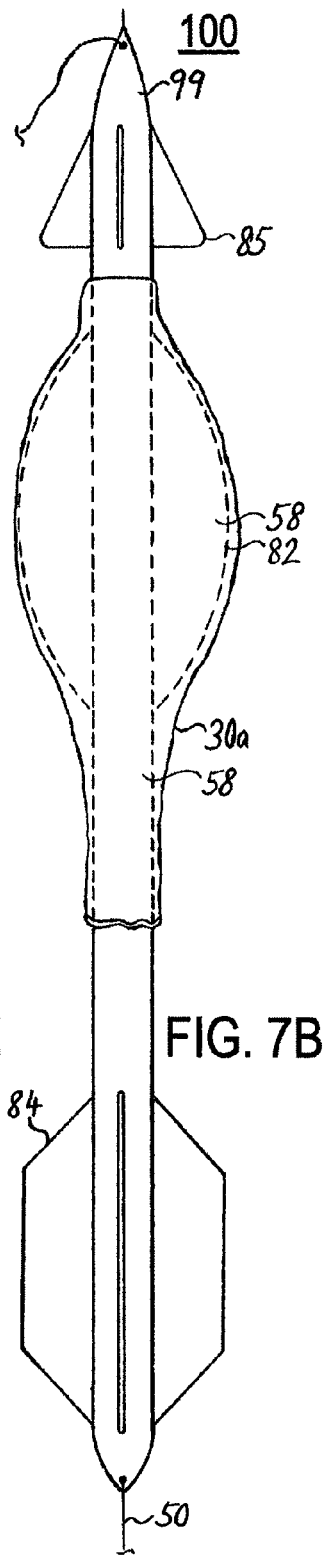
FIG. 7B shows a retracted and collapsed windbag 30a attached to the rocket balloon 99.

FIG. 7B illustrates a collapsed bag 30a attached to the rocket-shaped inflatable body 99. FIG. 7C illustrates additional features which might be incorporated into the inflatable rocket-shaped body 99a of variant wind-craft 100a comprising: a cockpit capsule 88 and storage area 88a for manned flights of the wind-craft 100a; wind escape ports 89 which might be used at the EOR to unpower the wind-craft 100a; use of motorized engines with flight control surfaces 70a to deploy and retract back the windbag 30; winches 59 for releasing and retracting bridle lines 21. Port covers 89a of the wind escape ports 89 may be operated by means of electro-pneumatic mechanism. Wind-craft 100a may be configured with a wind inlet port 25 measuring 500 meters; 1 kilometer; or 10 km in diameter. System 100 may be configured with an LTA gas compression cum release system to enable the wind-craft 100 to control and vary airborne lift and vehicle buoyancy autonomously.

Figure 7F:
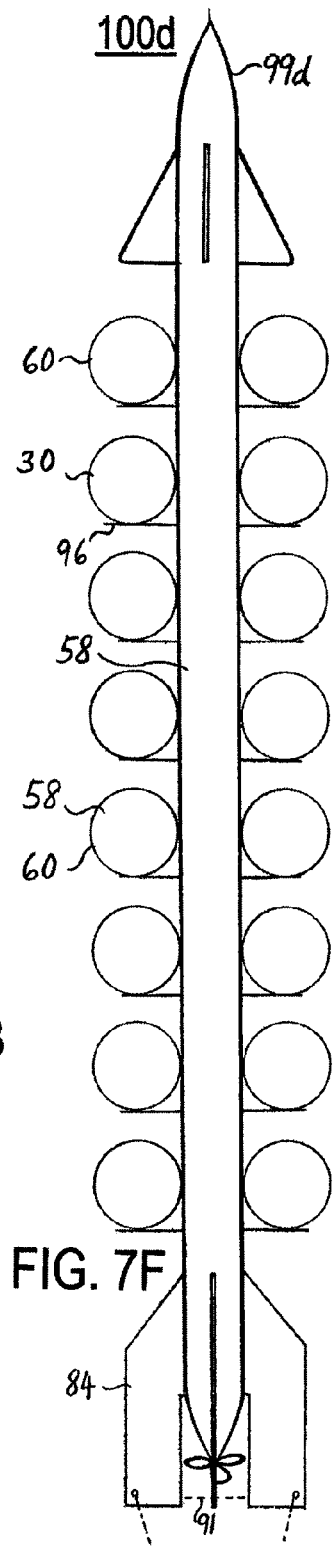
FIG. 7F shows a variant "wind-craft 100d" used as a mother-ship for conveying hybrid windbags 60 into high altitude.

FIG. 7D illustrates a variant embodiment of FIG. 7A in which multiple windbags 30 may be mounted on the rocket-shaped inflatable body 99b of wind-craft 100b. A turbo-fan 70d driven by engine may be integrated to provide propulsion. The turbo-fan 70d may be guarded by mesh 91; and attached to twin tethers 50 at point 92, 93; or twin bridle lines 21 joined to a single tether line 50. Multiple windbags 30 enables capture and trapping of a larger volume of high velocity wind thus enhancing efficiency and productivity of the apparatus in generating electricity. FIG. 7E illustrates a variant embodiment 100c wherein, a plurality of collapsed bags 30 may be gathered together on the rocket-shaped inflatable body 99c. The bags may be slid up and down the length of the inflatable body 99c; which may also incorporate expansion bellows 95 used to accommodate a higher internal pressure due to the reduced external atmospheric pressure at high altitude. The bellows 95 with external cover 94 expands to lengthen the body 99c at high altitude; returning to normal at sea level. Unmanned Aerial Tow Vehicles (UATV) 80a may be flexibly attached to the inflatable body 99c providing additional lift to propel the apparatus 100c up to high altitude; then, detach and fly back to ground zero 16 by itself. FIG. 7F illustrates a mother ship wind-craft 100d used as an airborne conveyance to transport "baby" hybrid bagtoons 60 and windbags 30 filled with LTA gas 58; up to high altitude; release the piggy-backing bagtoons 60 one at a time until all the windbags 30 had been set free from the vehicle; which is then retracted back to ground zero 16. The structural body 99d may be modified with brackets 96 to hold securely a plurality of bagtoons 60. Shaped inflatable bodies in the form of aircrafts, airships, balloons, etc. may also be used as mother-ships.

For the purpose of simplicity and reference, most of the description in this specification may use the term "windbags." However, it must be noted that any/or all descriptions applicable to windbags may also be applied to a parallel system for "water-bags." As both wind and water are fluids; they exhibit numerous similar basic properties and behaviour. Slight adaptations and modifications might be required to re-configure windbags 30 for use as water-bags 40 for deployment in the denser water medium/marine environment.

FIG. 3L illustrates a plurality of water-bags 40 pulling one single set of bridle lines 21 attached to a common tether 50. The inner bag 40 may be attached to bridle lines 22 at points 26, 27, 28, 29. The outer bag 40x may be attached to the same bridle lines 22 at points 26x, 27x, 28x, 29x. Externally located retract line 33 may be attached to inner bag 40 at point 32a; and passes through the outer bag 40x at point 32b by means of a hollow ring. When the retract line is pulled, the plurality of bags 40 and 40x turned around 180 degrees; the bag materials collapsed; bag 40 and 40x is pushed into close proximity. FIG. 5A illustrates an embodiment of present invention wherein, a plurality of plain water-bags may be spearheaded by an UUV 230 pulling the tether 50. UUV 230 controls the entire system 222. During the power run phase, the UUV 230 remains in neutral free floating position as it is carried along by the water current.

FIG. 8A illustrates the side view of a "Water-Craft 200" comprising of a water-bag 40 mounted on a self propelled torpedo-shaped body 201 filled with water and air; the submarine Hybrid Underwater Vehicle (HUV) 200 is herein assigned the name: "Water-craft 200." wind-craft 200 comprises of a long, slender hydro-dynamically shaped body 201 which forms a structural substrate upon which numerous components may be affixed, such as: water-bag 40; encapsulated navigation bridge 211; air bladders 202 which forms floatation airbags 202a upon inflation; sinkers and weights 221, air cylinders 203, hose 204; retract line 33; bridle lines 21, winches 59; swim control surfaces and hydroplanes comprising: bow planes 205 at the fore, stern planes 207 located aft; rudders 206; stabilizer 208, trim-tab 209; tether 50 attached to the stabilizer 208 at point 215; and propellers 240. Water-bag 40 may be folded and retracted, deployed by means of submarine-boats 220 and Unmanned Underwater Vehicles (UUV) 230. Shaped body 201 may be divided into compartments which may be filled with a mixture of air; water; or "mud" the heavier-than-water fluids used in drilling operations of oil and gas wells. Deployed, the submerged wind-craft 200 resembles a large cuttlefish, jellyfish or a waterborne umbrella. The torpedo-shaped body 201 may comprise of such materials as: metals; composite materials, carbon-fiber composites; fiberglass; Kevlar; nylon; inflatable; PVC, HDPE, etc. Externally, sinkers and diving weights 221 may be flexibly attached to the body to enable water-crafts 200 to dive deep underwater; while cylinders of compressed air 203 may be used to inflate airbags 202 via hoses 204 enabling wind-crafts 200 to surface at speed. This method may also be used at the EOR phase to un-power the wind-craft 200 by giving the craft an upright body position; before turning it around for its return trip to ground zero 16. Submarine-boats 220 and UUVs 230 may be used to open up and close the annulus 22 and water intake port 25; and to tow the wind-craft 200 into required positions during the SOR and EOR phases. Equipped with propeller 240 driven by engines; and hydroplanes, the wind-craft 200 may be configured as an unmanned, autonomous underwater vehicle capable of operating independently by itself via commands from ground zero/or from submarine-boats 220; or it may be also be manned by navigators in an encapsulated bridge 211.

The submerged capabilities of wind-craft 200 includes: fast diving speed wherein air in the body 201 floatation compartments may be displaced and flooded with water from a pump; enabling the craft to dive at speed. Fast surfacing capability wherein compressed air stored in cylinders 203 may be released to displace flooded water compartments in the body 201 instantly, enabling the craft to surface at speed. On the surface, wind-craft 200 may float above the water and travel like a boat or ship using propeller 240; pulled by tug-boats 220; or reeled in by means of the tether line 50. The wind-craft 200 may use its propellers 240 to maneuver and move in the direction of ground zero 16; seek out its tether line 50 (with float) with the help of submarine-boats 220; latch on to the tether line 50; and it may be winched and reeled back by means of motorized winch 49.

Figure 8C:
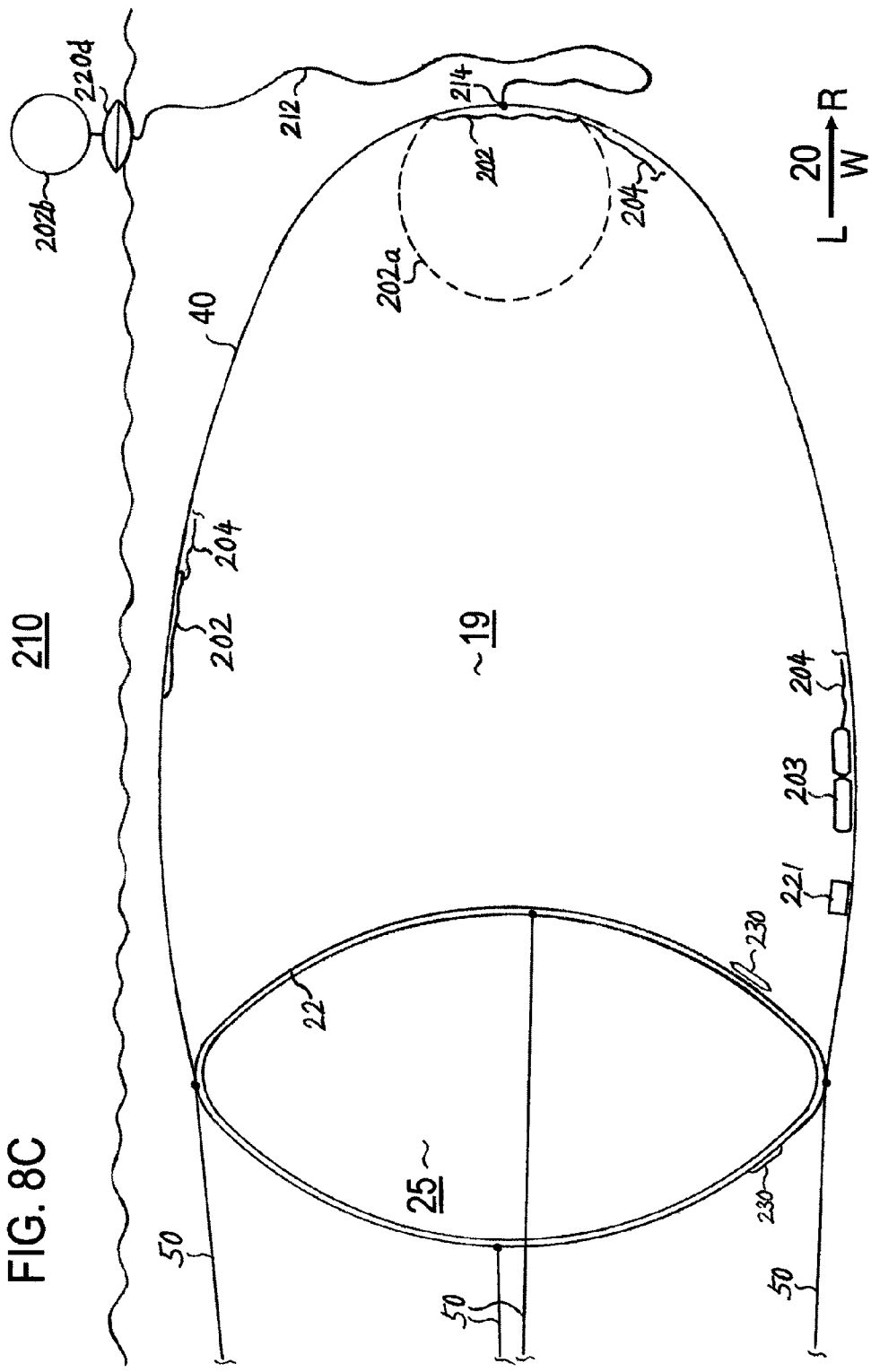
FIG. 8C shows the hybrid water-bag 40 of FIG. 8B at the EOR phase; airbag 202 may be inflated to stop the water-bag's forward movement; float it upright; retract to ground zero.

FIG. 8B and FIG. 8C illustrates a huge water bag 40 integrated with supporting equipment and systems; is herein assigned the name: "Hybrid Water-Bag 210." FIG. 8B illustrates the deployment of the water intake port 25 of a single piece, free floating hybrid water-bag 210 by means of mechanized apparatus 220 and 230 while submerged underwater. Submarine-boats 220 may be used on the surface while UUVs 230 may be used underwater to pull the water-bag 210 by means of tow lines 212 attached to points 216, 217, 218 and 219. The water-bag 40 with the diameter of the water intake port 25 measuring from 1 m to 10 km wide; required mechanized means to effect proper deployment; and to avoid the fabric materials 40a of the water-bag 40, bridle lines 21 and tethers 50 from entangling. The vessels 220a, 220b, 230a, 230b, moved in opposing directions to open up the water intake port 25; while vessel 220c filled up the annulus 22 with water and/or compressed air by means of towing cum hose line 212 at point 213. Referring to FIG. 8C, another vessel 220d pulled at point 214 of the end tip of hybrid water-bag 210. Filled with pressurized water and air the inflated turgid annular ring 22 ensures that the water intake port 25 stays open for the duration of the power run. UUVs 230a and 230b may be flexibly attached to mooring points at the sides of hybrid water-bag 210. Diving depth control devices may be attached to tether lines and used to control the (preset) depth of waterborne travel. Sonar emitting devices may be used to indicate the location of the hybrid water-bag 210.

FIG. 8C illustrates a fully deployed Hybrid Water-Bag 210 moving from left to right; nearing the end-of-run (EOR) phase. Submarine-boat 220d accompanying the hybrid water-bag 210 may pump compressed air into deflated air bladder 202 by means of towing cum hose line 212 connected to water-bag 210 at point 214 forming a balloon 202a. At the same time, the tensile force on the tether lines 50 is slackened by freeing the tether reel-drums 52. The inflated air bladder 202*a* exerts its buoyancy causing the end tip (point 214) of hybrid water-bag 210 to surface; and the water intake port 25 to sweep downward; in effect, tipping over, up-ending the whole apparatus 210. Submarine-boat 220*d* then pulled the towing cum hose line 212 to move the hybrid water-bag 210 from right to left, against the flow of the current; thus spilling and releasing most of the water trapped in the cavity 19 of the water-bag 210. The hybrid water-bag 210 is then retracted back to ground zero 16. Compressed air cylinders 203 may also be used to provide the air bladder 202 with floatation air via hose 204; and to keep the annular ring 22 inflated. Hose 204 may be concealed in the fabrics of water-bag 40. The 4 tethers 50 may be connected to 4 individual generators of 1 Gwh capacity each.

Submarine-boats 220 may be configured with dual surface and underwater capabilities to support deployment of the marine-waterborne component of present invention. Vessels 220 may be designed for submerged operations by means of robotic arms and other appliances mounted externally; but may not be configured for deep sea diving operations. In case submarine-boat 220*d* is pulled down by the wind-craft 200 or Hybrid Water-bag 210 due to a steep-gradient downward flowing current, a LTA balloon 202*b* may be inflated to provide buoyancy to prevent the vessel from being dragged down all the way; and the towing cum hose line 212 severed instantly. UUVs 230 are designed for deep sea diving; and may be attached to the wind-craft 200 or hybrid water-bags 210.

Figure 9A:
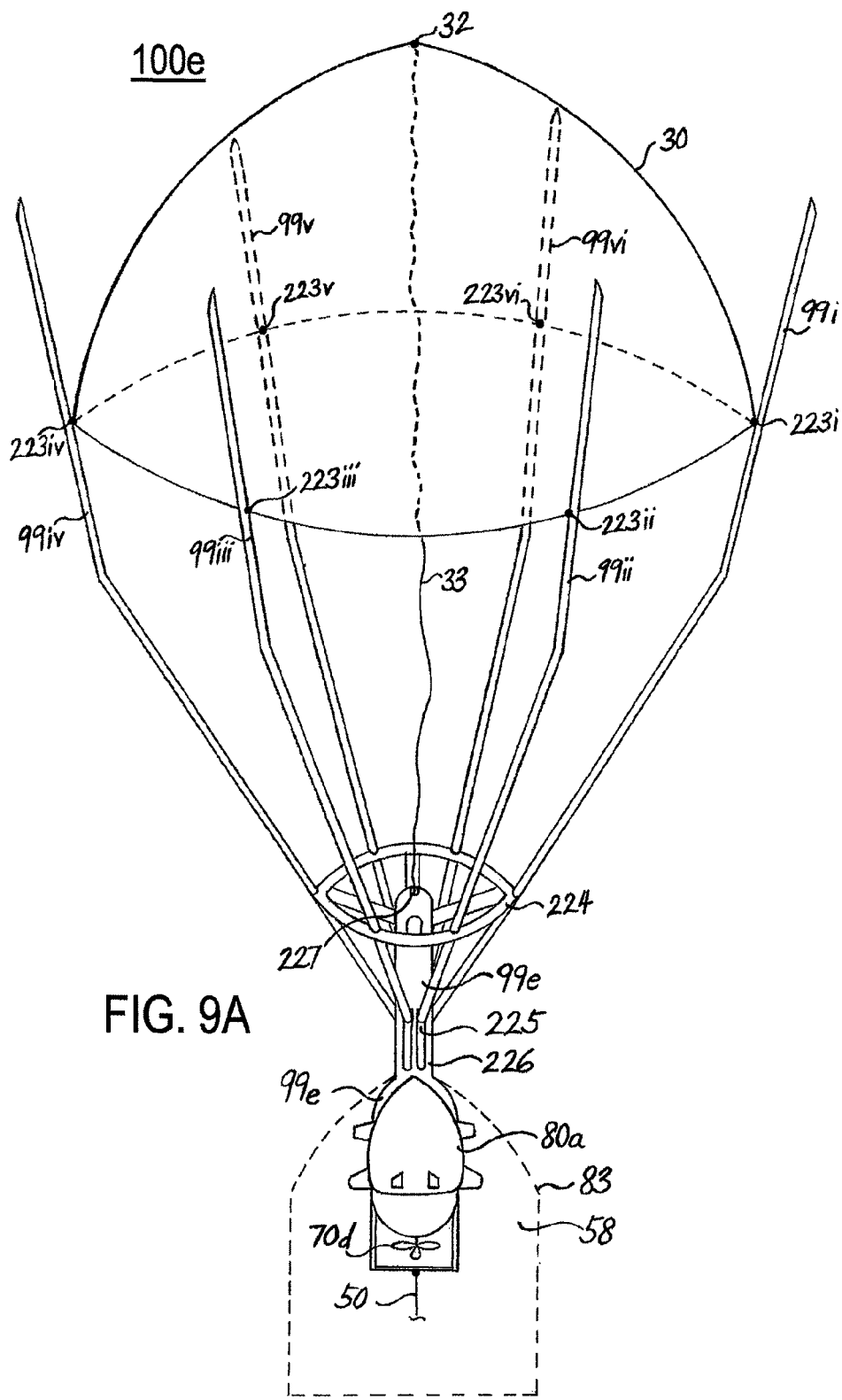
FIG. 9A shows details of a morphing HAV-100e.

FIG. 9A illustrates a morphing Hybrid Aerial Vehicle HAV-100*e* shaped in the form of a "treasured-lotus-lantern" when fully deployed (in open position); with the windbag 30 forming a canopy in the middle supported by a plurality of long slender pillars on the periphery. To close the apparatus bag 30 may be reeled in by means of retract line 33; and winch 59; while the plurality of split-pillars: 99*i*; 99*ii*; 99*iii*; 99*iv*; 99*v*; and 99*vi*; may be brought together to form a single rocket-shaped body 99*e*; with the windbag materials 30*a* held by the body of HAV-100*e* in between the plurality of split-pillars 99*i* to 99*vi*. Bag 30 is securely attached to the pillars at points 223*i* to 223*vi*. The pillars may be operated by means of a ringed pneumatics or hydraulics mechanism 224 to open and close; sliding up and down in slots 225 of the middle ring hub 226. The vehicular body 99*e* with the plurality of split-pillars 99*i* to 99*vi* may be filled with LTA gas providing lift. Additional aerial lift may be provided by means of detachable bodies 83 of LTA gas 58; turbo-fan 70*d*; and flexibly attached UATV 80*a*. Retract line 33 attached to bag 30 at point 32 is winched in or released by an internal winch 59 via orifice-port 227.

FIG. 9B illustrates a Hybrid Morphing Vehicle 90*c* wherein, a windbag 30 is integrated into, with an aircraft shaped inflatable body 90*c* filled with LTA gas 58. A motorized side-thruster 70*e* on the aft stabilizer 69 may be used to adjust vehicular position and orientation. A windbag 30 may be attached below the wings of the inflatable body 90*c*; extending from the wings towards the aft of the body. Prior to deployment, the windbag 30 may be folded up and stored inside the cavity of the body; then unfurled at the designated altitude and location; forming a huge windbag 30 with a shallow cavity 19 beneath the vehicle body 90*c*. The body 90*c* may be attached by means of bridle lines 21 at points 228*a*, 228*b*, 228*c*, 228*d* to join the tether line 50 at point 31. Embedded lines 23 behind the annulus 22 may be used to close and open the wind-intake-port 25. During the EOR phase at point 288; the side-thruster 70*e* may be used to flip the vehicle 90*c* sideways; and tether line 50 slackened; thus spilling the fluid content of the windbag 30 as it is aligned in a horizontal-perpendicular position relative to the wind direction. Depowered, the windbag 30 may be retracted into the body of vehicle 90*c* by means of lines 23 and lines 66 operated by internally located winch 59. Vehicle 90*c* is then up-righted and retracted back to the SOR point 16.

Optionally vehicle 90*c* may also be flipped over or flipped backward using retract-line 33*v*. One end of retract line 33*v* may be attached to the tether 50 at point 229*v*; while the other end passes through orifice-port 227 located atop aft stabilizer 69; and attached to a winch 59*v* (mounted inside vehicle body 90*c*). Winch 59*v* may be used to wind back or to release retract line 33*v* by means of orifice-port 227. Operation of retract line 33*v* may be used to flip over the whole apparatus 90*c* from front to back, belly-up; or from back to front, upright. One compressed air outlet nozzle 242*a* may be mounted on the top bow section; another on the bottom stern section. Activation of these two apparatus 242*a* in tandem with the freeing of tether 50; may also be used to flip over the vehicle 90*c*; while winch 59*v* reeled in retract line 33*v*. Compressed air may be obtained from ram-air-jets 71 mounted on vehicle 90*c*. Refer to description of FIG. 11A to FIG. 11L for more details of this method. A variant vehicle 90*c* might be configured with an elongated vehicle body 90*c* to cater for windbag 30 with a deeper cavity 19.

FIG. 9C illustrates a variant Hybrid Underwater Vehicle HUV-200*a* which resembles the shape of a squid, jelly-fish or cuttlefish when fully deployed. The fabric water-bag 40 forming the canopy may be mounted on and integrated with a rigid skeletal framework of long outer ribs 231. This outer ribs assembly 231 is held in place, supported, connected to and moved by means of a flexibly connected assembly of shorter inner ribs or struts 232. The inner ribs assembly 232 in turn rests in a ringed hub 224; located at the aft-portion of vehicle body 201*a*; and propelled by means of a motorized pneumatic or hydraulic jacking mechanism 244 built into the aft structure of the short vehicle's body 201*a*. The extension and retraction of the motorized jack 244 moved the assembly of inner ribs 232 and the outer ribs 231 assembly on the periphery (annular ring 22) of the water-intake-port 25 to which it is flexibly attached at joints 233; 234; 235; 236; 237; 238; 239; 241. Thus jacking mechanism 244 operates to open and close the outer ribs 231 assembly upon which the water-bag 40 is mounted; and the water intake port 25. Lines 66 may be integrated into the fabrics 40*a* and operated by means of internally mounted winches 59 as the HUV-200*a* opens or closes. Bridle lines 21 may be attached to points 233; 235; 237; 239; of the annular ring 22 of the water-intake-port 25; merging at point 31 with the tether line 50. HUV-200*a* may also include: compressed air discharge port 242*a*; sonar module 245*s*; and side-thrusters 70*e* mounted on a section of swivel joint 243, which is configured to rotate 360 degrees around the vehicle body of the HAV-100 and/or HUV-200. Side-thrusters 70*e* may also be mounted on the bow; stern; or any other desirable location of the vehicle body for navigational control of the vehicle's position; or to depower the vehicle by flipping it over from front to back.

FIG. 9D illustrates a variant version of FIG. 9C; comprising of a HUV-200*b* with a normal long vehicle body 201*b* with swim control surfaces 205, 206, 207, 208 and motorized propeller 240; for mounting more equipment and enhanced navigational capabilities that a short vehicular body might not be able to fully provide. The motorized hydraulic jack mechanism 244 may be concealed inside the body 201*b*; while the ringed hub 224 may be mounted aft encircling the external of the body 201*b*, sliding fore and aft on the elongated vehicle body 201*b*. The motorized hydraulic jack 244 may be activated by means of wire-lines and/or wireless signals such as radio frequency waves; sonar waves; etc. Bridle lines 21 attached to points 233; 234; 235; 236; 237; 238; 239; 241; of the annular ring 22 of the water-intake-port 25 may be operated by means of motorized winch 59*a*; while the tether line 50 may be affixed to point 215 of the vehicle body 201*b*. In another embodiment, fabric materials may be substituted with semi-rigid and/or wholly rigid pieces of extendable, collapsible and retractable "leaf." Wherein, the leaves may be extended when required to capture the moving fluids, the pieces of materials overlapping each other to form a hollow canopy/container; or they may be collapsed and retracted when required during the depowering phase. Due to its weight, rigid and/or semi-rigid canopy may be more suitable for deployment in the marine tidal-currents component than the airborne component. HUV-200*b* may also include: solid propellant discharge port 242*r*; compressed air discharge port 242*a*; side-thrusters 70*e* mounted on swivel section 243 for navigational control; sonar/acoustic module 245*s*; radio-frequency module 245*r*; or radar module 245*r*. A plain HUV and/or HAV without navigational capabilities may also be used; but without the high level of safety and security that a fully equipped vehicle provides. Lines entanglement, collision and damage of vehicles; damage to public properties, safety, health and environment concerns are issues that needs to be considered. An arrangement of rigid or semi-rigid skeletal ribs 231, 232 similar to FIG. 9D may be configured to work on the vehicle body 99*f* of a HAV-100*f*. It may also be noted that larger windbags may be utilized for lower attitude due to the low wind speed; while smaller windbags may be configured for higher attitudes with much faster wind speed.

FIG. 10A illustrates a hybrid underwater vehicle HUV-200*c* wherein the body may comprise of a segmented configuration. HUV-200*c* may also be configured as a HAV-100*g*. Such a method may be useful for assembling a vehicle with a length of 1 to 3 km; and a fluid-intake-port 25 of up to 1 km in width. Each body segment (201*c*-*i* to 201*c*-*v*) may measure 500 m long; and attached together securely section by section; with the final aft section 201*c*-*v*/or 99*g*-*v* being flexibly connected such that in an emergency, it may be ejected and detached with ease, hydroplanes 206/or wings 69*a* deployed; navigated to bring the occupant(s) in module 88 to a safe landing/or surfacing location. Fully deployed HUV-200*c* or HAV-100*g* resembles a squid, octopus or cuttlefish. The shape of the vehicle may not have any discernible impact on the performance of a HAV-100*g*. However, due to the fact that water is 829 times heavier than air, the large volume of water contained in a deep water-bag 40 (compared to a shallow water-bag) imparts a tremendous amount of momentum or inertial force to the moving HUV-200*c*. In one form, ten units of generation system 55 may be coupled via ten tether lines 50 to a single unit of HUV-200*c*. The segmented vehicle body may be filled with fuel; buoyant material or ballast comprising: LTA gas; water, air, or a mixture of both; and well-distributed to achieve a balanced equilibrium. Compressed air stored in segments 203 of vehicle body made of fiberglass or composite materials may be transferred via actuator valves and lines to ballast tanks mounted fore and aft. Other equipment may comprise: ballast pumps; pipes; dynamic computerized control for balancing of the whole vehicle body.

FIG. 10B illustrates a single windbag 30 or water-bag 40 integrated with a vehicle body 201*d*; forming a HUV-200*d* with a huge bag attached to one side of the vehicle. HUV-200*d* may be configured as HAV-100*h* with vehicle body 99*h*. The bag may be attached at point 246, 247, 248 by bridle lines 21 to an integrated winch 59*a* built into the vehicle body 201*d* or 99*h*; encircling its circumference. Lines 66 on the bag for retraction are controlled by another winch 59*a*. Other equipment may include: navigation control surfaces such as hydroplanes and stabilizers 205, 206, 208, 209; propellers 240; sonar 245*s*; side-thrusters 70*e* for vehicle 200*d*. And rudder-fins; winglets 84, 85; turbo-fans 70*d*; side-thrusters 70*e*; radar 245*r*; for vehicle 100*h*; etc. FIG. 10C illustrates a variant of FIG. 10B wherein, a multitude of water-bags 40 may be integrated with a vehicle body 201*e*; forming a HUV-200*e*; resembling a hibiscus flower in appearance. HUV-200*e* may also be configured as HAV-100*i* with vehicle body 99*i*. The plurality of bags may be attached at point 251, 252, 253, 254, 255, 256, by means of bridle lines 21 to a winch 59*a*.

The natural force of moving fluid may be used to enable the opening and the closing of the windbag's and/or water-bag's fluid intake port 25; wherein, a HAV-100 upon reaching target altitude may already be in an inclined body position; in line, and aligned with the flow of wind current (e.g. blowing from left to right). Compared to the high velocity of the wind, the HAV-100 moved at a much slower velocity; pulling a tether 50; attached to a load 55, which forms the drag force. When the windbag 30 is deployed at the SOR phase at point 16—the fluid intake port 25 is opened up; and the high velocity wind flowed into the inner surface of windbag 30, into the enclosed cavity 19, exerting its forward and outward pushing force; which in effect, assisted in distending and opening up the windbag 30. The kinetic energy of the wind (left to right) is transmitted to the windbag 30 of HAV-100 which exerted a tensile force on the tether 50 (comprising the Drive Unit 51); which in turn powered the (Driven Unit 55) comprising line-reel-drum 52, gear box 53 and electrical generator 54. Braking mechanism 355 may also be incorporated into the line-reel-drums 52. Since the load (drag force) on the tether 50 causes the HAV-100 to move at a slower velocity than the surrounding wind current; the fresh oncoming wind is constantly pushing and exerting its (kinetic energy) motive force against the windbag 30 to move it forward (from left to right). This gave the Drive Unit 51 comprising HAV-100 and tether 50 the forward propulsion required to power Driven Unit 55. The annular ring 22 and air-ribs 277 may be configured to work like a bicycle tire keeping its designated shape; small, measuring 1 to 2 cm in diameter; inflated by highly pressurized air to keep the fluid intake port 25 and windbag 30 in a fully open position.

Upon reaching the EOR phase at point 288; the line reel drum 52 may be disengaged and freed from the generator 54 by means of the gear box 53 (shifted into neutral gear); the tether 50 moved freely; and HAV-100 moved together with the velocity of the surrounding wind. The engine driven turbo-fan 70*d* and side-thruster 70*e* of HAV-100 may be used to propel it into a vertical or near-vertical position; thus, relative to the horizontal movement of the wind; the body position of the whole HAV-100 lies at a right angle, perpendicular; or nearly right angle position. Optionally retract line 33 may be stopped and retracted (from right to left); and the annular ring 22 and air-ribs 277 depressurized. Such a maneuver causes the HAV-100 to move into a position with its vehicle body perpendicular to the flow of wind current. Thus the wind current moving horizontally (from left to right) pushes the external surface of windbag 30 against the vehicle body 99 of the HAV-100; causing the windbag 30 to deform and collapse as intended. The HAV-100 may then be further maneuvered by means of the turbo-fan 70*e* and/or retract line 33 (making a U-turn); from the perpendicular body position into head on position, with the windbag 30 and the bow (fore/forward) of the vehicle body 99 heading into the wind; moving (from right to left) back to the SOR point 16. The above sequence of maneuver flipped/or turned the HAV-100 around by 180 degrees; effectively depowering the HAV-100 as intended; for its return journey back to SOR point 16. This method may also be applied to the waterborne component of present invention: for Water-bags 210; HUV-200; etc.

FIG. 11A to FIG. 11D illustrates a variant embodiment (refer FIG. 9B) of present invention in which the arrangement and operation of retract line 33*w* may be executed differently from the disclosures of FIG. 7 to FIG. 8. In this embodiment, retract line 33*w* may be integrated into; to form part of the tether line 50. One end of line 33*w* may be attached to a bow (fore) mounted winch 59*w* passing through an orifice-port 227*w* located at the bow (fore) of vehicle body 99 and/or 201; with the other end attached to the tether line 50 at point 229*w*. Length of line 50' between point 229*w* and 215 is fixed. Winch 59*w* operates to extend and/or shorten line 33*w* as illustrated in FIG. 11A. At the EOR point 288, the vehicle HAV-100; HUV-200 may be depowered; wherein the tether line 50 may be freed from load 54 by means of freeing line reel drums 52 and gear box 53 (shifted to neutral gear); and the vehicle flowed freely with the wind current/or water current; with zero drag/or tensile force on tether line 50. Annular ring 22 and air-ribs 277 may be depressurized; bag collapsed and is pushed against the vehicle body by the fluid flow. At the same time, the motor 70*d* (240); side thruster 70*e* and control surfaces 84; 85; (205; 206; 208) operated to turn around/or flip over the vehicular body as illustrated in FIG. 11B and FIG. 11C; firstly 90 degrees, 135 degrees until 180 degrees; such that the bow/and stern of the vehicle exchanges position; with the bow facing the oncoming wind. Bow mounted winch 59*w* operates to wind in the retract line 33*w* speedily until point 229*w* on the tether line 50 reaches point 227*w* on the bow of the vehicle as illustrated in FIG. 11D. For balancing purposes, fore mounted winch 59*w* may be sited at another location of vehicle body 99; while line 33*w* passes through the orifice-port 227*w* which may be equipped with ball bearings; roller bearings; roller sleeves; etc. to ease the movement of line 33*w*. The depowered HAV-100 and/or HUV-200 may then be pulled back to SOR 16 point by means of motorized winch 49; the tether line 50; and line reel drum 52 with minimum energy.

In case both the stern (aft) mounted turbo-fan 70*d* (240); and the side-thrusters 70*e* failed to operate; the HAV-100 and HUV-200 may still be depowered and turned around by the activation of emergency equipment such as stored energy propellants comprising: compressed air; solid state explosive materials used in fire-works, missiles or rockets. Highly pressurized compressed air stored in cylinders 203 may be ejected by means of air discharge nozzles 242*a*. A pair of bow (starboard) and stern (port) mounted nozzles may be arranged to discharge in opposing directions. Cylinders of burning rocket propellants may be activated with its exhaust exiting by means of gas discharge nozzles 242*r*. The reaction force of the discharge may be used to turn or flip the HAV-100 and/or HUV-200 around by 180 degrees; and retract line 33*w* wound in speedily by winch 59*w* before the vehicle embark on its return journey back to the SOR point 16.

FIG. 11E to FIG. 11H illustrates a variant method of depowering HAV-100 and/or HUV-200 by means of a stern (aft) mounted winch 59*y*. The retract line may comprise of two portions: 33*y* and 33*z*. One end of retract line 33*y* may be attached to a stern mounted winch 59*y* passing through an orifice-port 215*y* located aft of vehicle body 99 and/or 201; with the other end attached to the tether line 50 at point 229*y*. The continuation of line 33*y* from anchor point 229*y*, marked as line portion 33*z* may be affixed to a fixed point 227*y* located on the fore (bow) of the vehicle. Winch 59*y* operates to extend and/or shorten retract line portion 33*y*. Length of line portion 33*z* is fixed. At the EOR point 288, the tether line 50 may be freed from load 54 by means of line reel drums 52 and gear box 53 (on neutral gear); while the motor 70*d* (240); side thruster 70*e* and control surfaces 84; 85; (205; 206; 208) are operated to turn around/or flip over the vehicular body as illustrated in FIG. 11F to FIG. 11H; firstly 45 degrees, then 90 degrees until 180 degrees; such that the bow/and stern of the vehicle exchanges position; with the bow facing the oncoming wind. Stern mounted winch 59*y* operates to unwind the retract line 33*y* speedily until the line is extended beyond twice the length of the vehicle; and the load of the whole vehicle is borne by tether line 50; point 229*y*; line portion 33*z* and attachment point 227*y* on the bow of the vehicle as shown in FIG. 11H.

FIG. 11I to FIG. 11J illustrates yet another variant method of depowering the vehicles as disclosed in FIG. 11A to FIG. 11H; by means of dual moving lines 33*y* and 33*z*, sliding through a specially configured winch 59*z* located mid-riff of the vehicle body 99 and/or 201. Bi-directional winch 59*z* operates to slide through retract line portions 33*y* and 33*z*; no line is kept in a reel drum. This is unlike other winches described above which wound in the lines; stored them in reel drums; releasing them as and when required. Retract line 33 may comprise of a single, closed loop line joined to tether line 50 at point 229*z*; one part in contact with winch 59*z*. For description purpose line 33 may be split into two portions: 33*y* and 33*z*. Line 33*y* denotes the portion between winch 59*z* and point 229*z*, where it joined tether line 50, passing through orifice-port 215*z* located aft of vehicle body 99 (201). Continuation of line 33*y* from point 229*z* onwards, denoted as line portion 33*z*; extends between point 229*z* and winch 59*z*, passing through orifice-port 227*z* located fore of the vehicle body. Powered by winch 59*z* both line portions 33*y* and 33*z* moves freely, sliding through orifice-ports 215*z* and 227*z* at the same time; one line coming in, the other line going out. During power run phase, line portion 33*z* is slightly more than 3 times the length of line portion 33*y*; while during retract phrase, the reverse is true. At the EOR point 288, tether line 50 may be freed from load 54 by shifting gear box 53 to neutral gear; while the motor 70*d* (240); side thruster 70*e* and control surfaces 84; 85; (205; 206; 208) operates to turn around/or flip over the vehicular body; firstly 90 degrees, until 180 degrees; such that the bow and stern of the vehicle exchanges position; with the bow facing the oncoming wind. Mid-riff mounted winch 59*z* operates to pull in the retract line portion 33*z* speedily through orifice-port 227*z*; and this portion passing through winch 59*z* is immediately released and passed out through orifice-port 215*z*; until the load of the whole vehicle is borne by tether line 50; point 229*z*; line portion 33*z* and attachment point 227*z* on the bow of the vehicle as illustrated in FIG. 11J. The total length of the retract line 33 (33*y*; 33*z*) remains the same throughout the whole process. This process is reversed at the SOR point 16 when the vehicle body is aligned with the stern facing the oncoming wind; readied for take-off; prior to powering up (opening bag 30; 40).

However the above configuration still lacks an independent retract line 33 which might have been used to stop and turn around a travelling vehicle in case of the total failure of: turbo-fan 70d (240); side-thrusters 70e; stored energy propellant discharged via nozzles 242a; 242r; or, retract lines 33w, 33y, 33z. Such serious deficiencies may be overcome with alternative methods for instantly depowering a HAV-100 or HUV-200 as illustrated in FIG. 11K to FIG. 11L. An emergency mechanism may be activated by means of independent retract line 33x. Emergency retract line 33x passes through orifice-port 215x located aft of the vehicle body 99 (201) before reaching the winch controller 249. Wherein, winch 59x controlling bridle lines 21 may be switched to neutral mode, disengaged and freed from its gear mechanism; thus freeing and releasing the bridle lines 21. The kinetic energy (force) of the fluid current acting on the bag canopy extending the bridle lines 21 to two to three times its normal length; effectively flipping the bag canopy 30a or 40a towards the fore; over the bow; turning it inside out as illustrated in FIG. 11K; FIG. 1C; FIG. 1D; depowering the HAV-100 or HUV-200 instantly; at the same time, inflated annular ring 22 and air-ribs 277 are depressurized by means of 3-way valve 265 causing the bag 30 or 40 to deform and crumple. A variant method may be used in which tether line 50 may be configured passing through orifice-port 215x located aft of the vehicle body 99 (201); attached to a tension-sensor mechanism 258. Upon detection of excessive tension exerted by tether line 50; sensor 258 activates, sending an emergency signal via signal line 258a to winch controller 249; winch 59x disengages its gear mechanism, freeing it; depowering the vehicle instantly. Optionally the above mechanisms may be backed up or replaced by a radio-frequency receiver 257r or sonar receiver 257s to capture remote emergency command signals for depowering the vehicle by means of winch controller 249 as illustrated in FIG. 11L. If all of the above actions failed, optionally the bridle lines 21 may be cut, sheared, severed, burnt or destroyed by means of internal emergency mechanisms 259 comprising: automated cutters, shears; electrically heated burning wires; a charge of combustible gunpowder; etc. Such emergency measures flip the windbag 30 or water-bag 40 over the bow of the vehicle body; spilling all of the captured fluids; instantly depowering HAV-100; HUV-200. Use of such fail-safe design configurations enhances safety of the apparatus. Wherein tiers upon tiers, layers upon layers of safety features configured into the airborne flying energy generators and/or seaborne diving energy generators right from the design stage comprising: engineering control measures and solutions—safety devices; emergency equipment; state-of-the-art surveillance, monitoring and control systems; administrative control measures—operating procedures, instructions, manuals; emergency response procedures, etc. may be used to ensure the: safety and security; health and environment; reliability and integrity; productivity and quality; aspects of the wind and water energy extraction cum power generation plants 300 of present invention.

FIG. 12A illustrates a detachable configuration of a mobile generation system 55; in which the individual components and parts mounted on wheels 263 may be brought together and connected; or, disconnected and split up when required. Such a structure allows flexibility in swapping components for utility purpose and repair of faulty equipment; and includes a shape-morphing flywheel 250 for load balancing purposes. Externally, the components may be connected by means of quick-acting bolts 261 and nuts 262; internally by means of male coupling 332m to female coupling 332f of shaft 332 as illustrated in between winch 49 to spool 52; spool 52" to spool 52. A similar method may also be used between spool 52 and gear box 53.

FIG. 12B to FIG. 12C illustrates a shape morphing flywheel 250; in which said flywheel 250 changes shape as its rotational speed and centrifugal force changes; enabling flywheel 250 greater efficiency in storing and transforming the kinetic energy of power generation system 55. Flywheel 250 may comprise of an elastic and pliable outer skin 250a containing a thick viscous slurry material 250b. At rest flywheel 250 is stout and fat (FIG. 12A). As rotation speed increases, its circumference increases with a corresponding reduction in its girth (FIG. 12B); due to the effects of centrifugal forces its content 250b migrated towards the periphery of the flywheel (FIG. 12C). Reverting to its normal shape as the flywheel slows down and stopped moving.

FIG. 12D to FIG. 12F illustrates details of a tether drum switching system 330 for prolonging the operational range of drive units 51; wherein the flight range of HAV-100; diving range of HUV-200; may be extended by adding new spools 52"/or tether drums 52" (containing full lengths of tether line 50") to running units of tether drums 52 (with depleted lengths of coiled tether line 50d) of the driven units 55. FIG. 12D illustrates a new drum 52" connected to an operating drum 52 by means of line 50"; coupling 331 (331m and 331f); a depleted length of tether line 50d wound on drum 52. FIG. 12E illustrates details of a side view of drum 52 showing: flange 52a with a line release slot 336s aligned vertically upwards at 90 degrees; a depleted coil of tether line 50d; drum brake 335; bi-di winch 59z; line braking apparatus 335a. Customized tether spool 52/or drum 52 is a cylindrical device with a rim, a ridge or a flange 52a at both ends; with an axle spindle, a pin or a shaft 332 in the middle on which material (tether line 50) is wound. FIG. 12F illustrates details of a customized male coupling 331m residing in the shaft-bearing sleeve 332-333. Fresh, new drums 52" of tether lines 50" may be joined to live operating tether drums 52 before said drums 52 are completely depleted/or exhausted of usable lengths of tether line 50d. Coupling 331 of full drums 52" and drums 52 may also be hitched up prior to the start of run (SOR) of drive unit 51 by means of male portion 331m and female portion 331f" flexibly connected to each other to form coupling 331. This may be achieved by means of specialized equipment and arrangement comprising of: a male coupling portion 331m residing in the central axis of the hollow end 332f of rotating shaft 332 configured with a hollow centre 332f and recessed slot 332s as illustrated in FIG. 12D and FIG. 12F. Shaft 332 is encased in a customized bearing sleeve 333 with a flip-able top flap 333a facing vertically upwards at 90 degrees; which may be flipped open to reveal a recessed slot 333s. End of tether line 50 joined to male coupling 331m may be slotted into the hollow end portion 332f of shaft 332; via aligned recessed slots 332s; 333s; (lifted flap 333a); and 336s on the drum flange 52a. Wherein said male coupling end 331m protrudes out from the hollow end 332f of the shaft 332 cum bearing-sleeve assembly 333. Slots 332s; 336s are pre-aligned with each other during assembly; and may be aligned with slot 333s by rotating shaft 332 and drum flange 52a; such that when prominently visible slot 336s faces vertically upward at 90 degrees; all the three slots are in alignment; through which the male coupling 331m attached to line 50 may be inserted or removed. Flap 333a may then be closed back and secured in place. Flexible coupling 331 may be configured with swivel means in which the male coupling 331m and/or female coupling 331f" may include rotatable joints fitted with ball-bearings; roller-bearings; enabling male coupling 331m and end of line 50 to rotate freely in line with the rotation of drum 52. The joint of male coupling 331m and end of line 50 may be encased in a protective sheath 334. Towards the end of the line reel 50 (EOR; its coiled length 50d depleted), the drive unit 51 may be depowered; and the driven unit 55 freed (gear box 53 on neutral gear); while a flexibly connected bi-directional winch 59z and a line braking apparatus 335a affixed next to drum 52 as illustrated in FIG. 12E; may be used to expedite drum 52 change over; and control the release of line 50 between drum 52 and the drive unit 51. The running length of line 50 may be controllably released by means of: braking apparatus 335a which slowed down the release of line 50 to drive unit 51; while winch 59z rapidly removed the depleted spool of coiled line 50d from drum 52; thus retaining a suitable length of slack line 50' in between winch 59z and brake 335a. At the last few windings of the coiled line 50d on shaft 332; variable speed winch 59z is slowed down; turned off and on intermittently to continue removing line 50; assisted by drum brake 335 which may be used to slow and to stop drum 52 rotation as needed; at the last winding (final coil) of the coiled tether 50d on shaft 332; the slots 332s, 333s and 336s may all be aligned facing vertically upward at 90 degrees; visibly indicated by slot 336s on flange 52a. Wherein, coupling 331 may then be completely lifted free from the running reel-drum 52 via aligned slot 332s; slot 333s; lift-able flap 333a; and line-release slot 336s on drum 52. Combined tether line 50-50" had now been totally switched over to drum 52". The female portion 332f of shaft 332 of drum 52 is now free of coupling 331m; and ready for coupling up with male portion 332m" of shaft 332" of drum 52". Motorized drum 52" and drum 52 mounted on wheels 263 may be aligned; moved into proximity; their shafts 332" and 332 mated and coupled up; locked together operating as a combined unit 52-52" as illustrated in FIG. 12D. Bi-di winch 59z and brake apparatus 335a borne by flexibly adjustable frame 337 mounted on trolley wheels may then be disengaged from line 50; allowing lines 50; 50'; 50" to move freely. And the drive unit 51 swung back to resume the power run; gear box 53 engaged to generator 54 of the driven unit 55. Tether spool 52 may be safely enclosed in a transparent plastic guard 338 supported by frame 339.

FIG. 12G illustrates a method of flexibly shifting the center of gravity of vehicle body 99 or 201 enabling improved balancing of HAV-100 or HUV-200. The bladder 260 mechanisms may be split into different portions located on different parts of the vehicle body. The lifting and/or ballast fluid constituents comprising: lighter-than-air gases; air; water; or drilling mud; may be shifted between the bladders 260 by means of push-release mechanisms comprising: fluid pumps; pressurized air, or LTA gas; supply-release ports comprising electronically switched 3-way valves 265, 4-way valves 265; supply-release lines 267; and light weight fiber-glass storage tanks 203; etc. controlled by onboard computer system 266. Bladders 260 maybe split by partition 268.

FIG. 12H to FIG. 12I illustrates differing arrangement of ram-air-jets using high speed wind flow for generating electric power; and compressed air (stored-potential-energy); for use onboard the vehicle for powering: electronic systems; navigation lights; winches 59, 59a, 59x, 59y, 59z; nozzles 242a; and for compressing helium gas abroad into cylinders 203 during descent of HAV-100; release to ascend; etc. Energy generated abroad during power run (SOR-EOR); and on the return trip (EOR-SOR) may be stored. While HAV-100 uses ram-air-jets; HUV-200 may use ram-water-jet. FIG. 12H illustrates bi-directional ramjets 71 mounted on the external of vehicle body 99 (201) jutting outward; and variant ramjets 71a mounted in recessed parts of the vehicle body. The inlet port lies within the high pressure zone 269 created by the bag canopy 30/or 40; while the outlet port lies in the low pressure zone 271 outside the bag; the pressure differential created between the two zones 269-271 by the bag canopy is made use of to operate ramjets 71a. FIG. 12I illustrates a small bag 270 which may be used as a canopy to trap and channel fluid through recessed ramjets 71a. Bag 270 may be attached to vehicle body 99 (201) at points 272; while its outer edges may be flipped fore or aft by means of lines 273f and 273a. The desired direction (flipped towards fore or aft) depending on the direction of vehicle travel. Externally, lines 273f (fore) and 273a (aft) may be routed through fixed orifice-ports: 274a; 274b; 274c; 274d; attached to controller-actuator 275 internally via orifice ports: 274e; 274f. Pneumatic actuator 275 may comprise of a body 275 and a sliding piston rod divided into two portions: fore segment 275f and aft segment 275a operated by compressed air to swing the bag 270 in the desired direction. If piston rod portion 275f is pushed to the fore as illustrated, lines 273 and 273f are extended; while piston rod portion 275a recedes into the body 275, lines 273a are retracted; and bag 270 flips aft. The opposite occurs when the sequence is reversed. A variant version shown uses sliding hood 276 to channel fluid flow through ramjets 71a; while ramjets 71b may also be aligned diagonally with fluid flowing into the inlet port on one side, exiting the outlet port mounted on the opposite side of the vehicle body. The terms ramjet 71, 71a, 71b and ram-air-jet 71, 71a, 71b are defined as a ram-air-turbine 71, 71a, 71b.

FIG. 12J illustrates the rear view (aft to fore) of a HAV-100 or HUV-200 with inflatable air-ribs 277; annular ring 22; and lines 278 all integrated into the bag-canopy 30 or 40 giving it shape and form. Inflatable annular ring 22 may be integrated with air-ribs 277 to keep the fluid intake-port 25 and bag-canopy 30 or 40 in wide open position. The plurality of air-ribs 277 may be inter-connected by means of a pneumatic ring-hub 277r mounted on vehicle body 201 (99). Lines 278 channel fluid (air or water) between compressed air tank 203 and the air-ribs 277; ring-hub 277r and annular ring 22; via connection joints 278a; directed by local controller 279 which receives its commands from the onboard computer system 266. By means of 3-way valve 265, controller 279 actuated the: supply of compressed air for inflation of air-ribs 277; ring-hub 277r and annular ring 22; and their deflation via venting-off. Controller 279; 3-way valve 265; and tank 203 may be mounted on vehicle body 99 (201). Optionally, a variant form of air-ribs 277a may be flexibly configured stretching from the annulus 22 to the vehicle's body 201 (99); forming a dual layered inner-outer jacket; surrounding the bridle lines 21 which moves freely, running through the inbuilt space configured into the middle portion of the inner-jacket of the air-ribs 277a (refer FIG. 3H). Inflated, air-ribs 277a keeps a fixed distance between the annulus 22 and the vehicle's body 201 (99); providing an outward pushing force (stress) upon which the bridle lines 21 pulled taunt (tension; strain); compresses against. The plurality of air-ribs 277a mounted on a ring-hub 277r' may be affixed next to winch 59a of vehicle body 201 (99). Or, bridle lines 21 and air-ribs 277a may also be configured in proximity, next to each other; associated by means of a plurality of sliding rings 61 (refer FIG. 3D) to support each other externally. This helps to reduce wobbling of the bag canopy due to wind buffeting. The terms ramjet 71, 71a, 71b and ram-air-jet 71, 71a, 71b are defined as a ram-air-turbine 71, 71a, 71b.

FIG. 13A illustrates a systematic arrangement in the deployment of a fleet of HAVs-100 in a High Altitude Wind Energy extraction plant/or farm 280. Stations A-B denotes the power run phase; point B-C denotes the depowering phase; point C1-D1; C2-D2 denotes the retract phase; point D1-A; D2-A denotes the idling/waiting phase; C3-D3 denotes parking area for repair of faulty equipment. Station A (point 16) denotes the start-of-run (SOR) phase; while Station B (point 288) denotes the end-of-run (EOR) phase of a drive unit 51 comprising HAV-100 and tether 50 along line A-B; with respect to the position of ground based system (driven unit 55.) Stations A-B indicates the power run phase of the fleet of HAVs-100; the stage where the kinetic energy of wind captured by HAVs-100 and transmitted via tether 50; is productively converted into electrical energy by means of power generation system 55 comprising of: spool/ or line reel drum 52; automatic variable speed gear-box 53; generator 54. A motorized winch 49 may be flexibly attached to line reel drum/or spool 52 to retract back the HAV-100 via tether 50.

Components of system 55 may be mounted on wheels 263 travelling on rails 281/or on fixed path 283. Mobile power generation system 55 may move progressively from Station A (16) to Station B (288) over a distance of 6 km. At the same time, the flight of HAV-100 may be controlled/navigated such that tether 50 may be shifted from right leaning at Station A; to center; then to left leaning at Station B. At Station A the tether 50 length is at its shortest; while at Station B, length of tether 50 is at its longest; nearly fully extended. Between points B-C the HAV-100 is depowered. Flexibly connected tether drum 52 may be uncoupled from the gear-box 53 and generator 54; and a motorized winch 49 may be flexibly affixed to drum 52; moved to line retraction cum waiting lanes 282a; 282b between points C1-D1; C2-D2; depending on angular inclination of tether lines 50. The depowered HAVs-100 are retracted back; and moved to point D awaiting deployment. Winch 49 may be uncoupled and sent back to point C; faulty depowered HAVs-100 requiring repair may be parked in repair lane 282c between points C3-D3. Gear-box 53 and generator 54 may be moved back to Station A (16) via lane 283 between Stations B-A; where it is flexibly connected with a fresh drum 52 to form driven unit 55. System 55 and system 51 (comprising tether 50 and HAV-100) are now ready for power run. Optionally lanes 282a; 282b; 282c between points C-D may be configured upwind, lying on the same side as lane 283; leaving the downwind area clear for operating the flying energy generators HAV-100. Stations A-B may be flexibly configured such that they may be shifted according to shifting wind directions. At points D, D1 and D2, depowered HAV-100 may be tethered hovering at a height and down-wind distance of between 100 m to 1 km; leaning to the right side at a variable angular inclination indicated by delta 1; delta 2; delta 3; as shown in FIG. 13B; in accordance with instructions from the Air Traffic Controller/or Command and Control Center. Each and every HAV-100 may be assigned a specific flight path; and monitored at all times by means of computerized autopilots and human navigators; any deviation is corrected instantly. After launch and during power run the HAV-100 may be navigated higher as it got carried further away by the wind; reaching a height and down-wind distance of between 1 to 100 km; the sole limitation being the available length of tether lines 50. A plurality of HAV-100 comprising hundreds; or thousands in number may be arranged/or deployed in different phases of flight at any given point of time at the HAWE extraction plant 280.

FIG. 13B illustrates the angular inclination of the flight trajectory of HAV-100: delta 1; delta 2; delta 3; relative to the horizontal ground surface. Such an arrangement avoids line entanglement; prevents vehicle collisions; protects against loss of equipment and properties. Fixed location units comprising: dedicated stand-alone drive unit 51 cum driven unit 55 may also be used; a plurality of such units may be distributed evenly over the farm area to harness and extract HAWE. The method and system of plant 280 may also be used for deploying HUV-200.

FIG. 13C illustrates a method of using a flexible arrangement of motorized poles 284; winch 59b with lines 285; equipped with roller wheels 48a providing an elevated fulcrum enabling tether lines 50 and HAVs-100 to attain high launching points. The pneumatically powered telescopic poles 284 mounted on mobile trolley wheels 263 may be secured to fixed posts at site; while flexible lines 285 with rollers 48a at its apex may be secured to winches 59b mounted on high platforms or towers 286. Tether lines 50 slides through rollers 48a between HAV-100 and driven unit 55; helping to avoid line entanglement; vehicle collision; prevent interference of HAV-100 with each other.

FIG. 13D and FIG. 13E illustrates a method of station hopping which may be used by apparatus of present invention wherein: HUV-200; Hybrid Water-bag 210; etc. may be deployed continually between a plurality of stations (A to Z) without being retracted back to Station A (SOR point 16a); as disclosed in FIG. 2A. When HUV-200 reaches Station B (EOR point 288b); the HUV-200 may be depowered temporarily; tether line 50 from Station A changed over to a new tether line 50' from Station B; put into power run again (point 16b) until it reaches Station C (point 288c); where the preceding procedure is repeated; and the apparatus continues its journey (point 16c) to Station D; and so forth; until it reaches the final EOR phase (point 288z) at the last station marked as Station Z. At Station Z, the apparatus may be finally depowered before being retracted back to Station A (point 288a). A detailed description of the method may be outlined wherein: at Station A (point 16a) a HUV-200 may be deployed in power-run (step 1); moving to Station B located 10 kilometers downstream of Station A. At Station B (point 288b); HUV-200 is depowered (step 2) as the tether line 50 neared the end of its run-length (EOR phase). Tether line 50 from Station A is switched over to a new tether line 50' attached to spool 52' from Station B (step 3). The second tether line 50' from Station B is connected to HUV-200; while the first tether line 50 from Station A is disconnected from HUV-200, attached to a float and retracted back to Station A by means of spool 52 and winch 49. From Station B (point 16b) the HUV-200 is re-deployed again for another power-run to Station C (point 288c) located 10 km downstream; where above procedure is repeated until HUV-200 reaches Station Z. Such a tether line 50 change out maneuver may be executed by the crew of submarine-boats 230, personal submersible vehicles (PSV) 230a or UUVs 220; by manual means or by means of robotic arms and specialized appliances mounted on the vehicles.

FIG. 13E illustrates an embodiment of present invention wherein, a plurality of depowered HUVs-200 lined up in single-file may be retracted back from Station Z to Station A by means of a dedicated HUV-200" working as a submersible tug-vessel; not for generating electrical power, but for the purpose of pulling other HUVs-200 from Station Z; back to Station A. When HUV-200" from Station A (point A') reaches Station Z (point Z'); the plurality of retracted HUVs-200 from Station Z (point 288z) would have arrived at Station A (point 288a). Tether line 50" from HUV-200" attached to the plurality of retracted HUVs-200 passes through a series of roller-wheels 48b; 48c to enable this pulley 48 system based retraction process; freeing the core energy generating components comprising: drive units 51; and driven units 55; for production purposes. HUV-200" may also use the station hopping method from Station A to Station Z. Such a station hopping method may also be used as a means of inter-station transport; wherein surface vessels comprising: mother-ships 289; factory-ships 296f; tankers 296t; etc. bearing cargo, crew, materials, etc. may be moved by means of dedicated HUV-200" solely for the purpose of providing underwater traction/propulsion. Such optimization of resources conserves energy; expedite turnaround time to improve productivity and efficiency of the hydro-energy-farm.

The above station-hopping method may also be applied to the windborne component of present invention wherein; HAVs-100 may also be continually deployed between a plurality of work stations comprising HAV-45 (of airborne platform 44) without being retracted back to Station A (SOR point 16a) at the EOR phase 288b; before being redeployed again from Station A. Specially configured aircrafts and trained flight crew would be required for executing such a delicate task. Optionally depowered HAV-100 may dock temporarily at flexibly configured mobile bays beneath the platform 47 of the airborne work stations 45 (FIG. 2A) for switching of tethers 50 before resuming their journey to the next station. However, it must be acknowledged that airborne switching of tethers 50 for the windborne component HAV-100 would be a much more difficult, delicate and dexterous task than the waterborne component. In a variant embodiment, HUV-200" working as a submersible tug-vessel may be used to pull back a retracted HAV-100 from high altitude to a low altitude, from Station B (point 288b located 10 km away) to Station A (point 288a). Conversely, a HAV-100" may also be used to pull back/or retract HUVs-200 to Station A. Such a symbiotic relationship and cross-utilization of resources between the marine windborne and waterborne components of present invention may be envisioned in a combined offshore marine HAWE-extraction-plant and deep-sea tidal-current-energy-extraction-farm 300 of FIG. 13I.

In another embodiment, HUV-200" or a Hybrid Water-bag 210" may be used directly for traction purposes. Working as a submersible tug-vessel, the vehicle may be attached directly to ships; bulk carriers; marine vessels; submarines; and used to provide propulsion by means of extracting the kinetic energy of deep sea tidal-current flow. Following the mariner's routes during the age of discovery (15th-17th century); seafaring vessels may make use of a HUV-200" with the well-charted ocean currents of the Gulfstream (6.5 mph). From Europe to the Americas the Gulfstream may be useful; but vessels crossing the Atlantic Ocean from North America to Europe may harness the combined powers of both the Gulfstream (6.52 mph) and Jet-stream currents (100-400 km/h wind speed from west to east). Such a combined use of a HAV-100" and a HUV-200" in directly harnessing the natural green energies of both wind and water currents for propelling a marine vessel might well be a world's first. Likewise, a HAV-100" may be used to provide propulsion and lift for airships transporting goods and/or passengers speedily; with a limitation—direction of travel being dependent upon wind direction. HAV-100 and/or HUV-200 deployed from abroad marine vessels may be used to generate all the essential electricity (stored into a grid storage system) required for utilities. Such a method saves fuel; produce zero emission of CO2, a man-made green house gas (GHG) which contributed significantly to the problem of global warming and extreme climate change causing the decimation of colonies of marine life-forms which are extremely sensitive to environmental and ecological changes. And in time to come as the problem escalates in severity and frequency, maybe, the unavoidable widespread death of aquatic, marine, terrestrial and aerial life-forms including humans; due to man-made aggravation of natural disasters comprising: heat waves, extreme cold; rising sea level; loss of arable land mass for food production cum human habitat; famine; increase in frequency, intensity and severity of freak weather like hurricanes, cyclones, twisters, storms, flooding; droughts, wildfires; etc. Use of renewable energies as a substitute for carbonaceous fuel alone may prove inadequate to save humans and our planet earth; unless coupled with a comprehensive program including: conservation of resources; reining in of excessive consumption; implementation of stringent voluntary global population controls/capping under international agreements or moratorium; etc. to save all life-forms on earth. For earth is no different from a large gold-fish bowl. One or two fishes may live happily in it for a long time; but if the number of inhabitants is increased multi-fold; in a short while they would all die of: starvation and/or be poisoned by their own waste products.

Though HAVs-100 and/or HUVs-200 as disclosed above may be used for providing propulsion for marine vessels and airborne vehicles; a variant method as illustrated in FIG. 13F may also be used wherein, retract line 33t may be directly connected to and controls the plurality of bridle lines 21 via external orifice-ports 215x; 264; and internal orifice-port cum joint 287 where all the bridle lines 21 converges. Due to the buoyancy of the HAV-100; and the weight of the HUV-200, the tether line 50 is pulled taunt and maintains a static position; while the tension force and length of retract line 33t and bridle lines 21 may be varied to power and depower the vehicle. Such that when retract line 33t and bridle lines 21 are pulled taunt, the windbag 30 and/or water-bag 40 took shape and form, flips from fore to aft as the fluid medium filled up the cavity 19 and the vehicle goes into power up phase. Whereas, when retract line 33t and bridle lines 21 are freed, the bag deforms, flips from aft to fore as the fluid medium is released and flows free; and the vehicle depowered (refer FIG. 11K). Or, referring to FIG. 7A; FIG. 8A; pulled by a winch, a fore-mounted retract line 33 working in tandem with the tether line 50 may be used to flip the whole vehicle from bow to stern; and from stern to bow. Optionally, tether line 50t may be mounted midriff of the vehicle improving its maneuverability; versatility; and enhanced directional control by side-thrusters 70e; control surfaces 205; 206; 208; 85; 69a; 69b; etc. Seafaring vessels may use a combination of such vehicles for generating electricity; for propulsion; and as a navigational aid. Mounted with cameras; radar; sonar; sensors; etc., HAV-100 and HUV-200 may also be used as airborne and seaborne surveillance aids for detecting shipping hazards such as: underwater reefs; ice-bergs; proximity of vessels; pirate boats; and distress signals; etc.

FIG. 13G illustrates a method of using both a HAV-100 and a HUV-200 on a ship 296t (conveying the electrolytes of flow batteries and lead-acid batteries) for generating electricity and propulsion at the same time. Wherein, HAV-100 may be used to provide propulsion (lift); while HUV-200 hitched to driven unit 55 may be used to generate power (drag). A proportion of the traction forces provided by HAV-100 may be converted into drag force created by the HUV-200 and into electricity; while all of the drag force generated by the HUV-200 is converted into electricity. The effects would be maximized should the two fluid mediums flow in opposing directions. FIG. 13H illustrates a variant method of FIG. 13G using twin HAVs-100 abroad supertanker 296*t* for harnessing high altitude wind power; wherein HAV-100' located fore may be used for propulsion; while HAV-100" located aft may be used to generate power. Even if used side by side, a plurality of vehicles may be navigated at different flight trajectories, directions and angles to avoid interference. Similarly, twin HUVs-200 may also be used to extract deep sea tidal-current energy for different purposes. Enabled by means of navigational controls a multitude of vehicles may be deployed at any one point in time from a single vessel or station to extract energies from a range of terrain comprising: high altitude wind; low altitude wind; surface currents; deep sea currents.

Figure 13I:
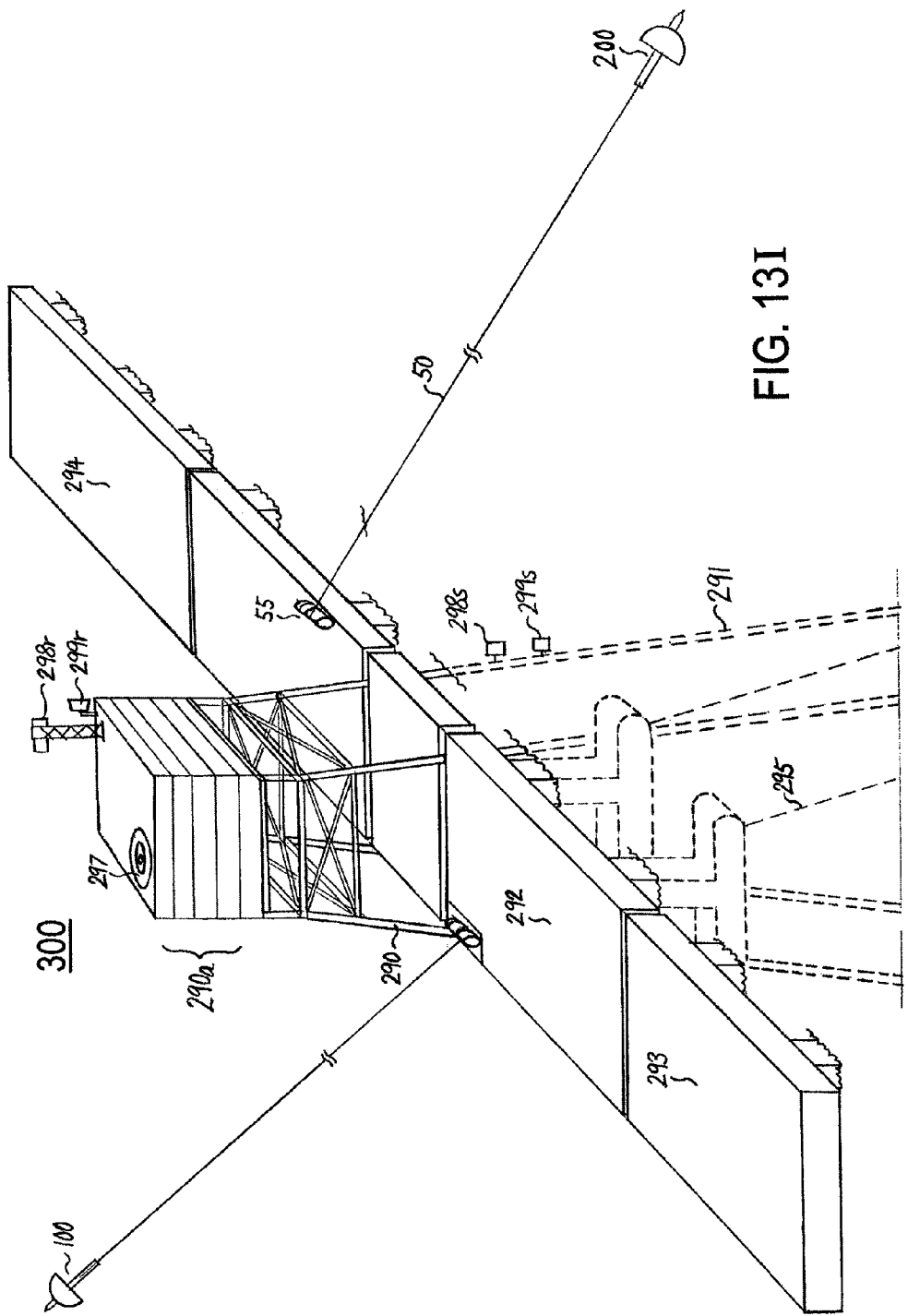
FIG. 13I shows a combined: offshore-marine HAWE extraction plant and deep-sea tidal-current energy extraction farm 300.

FIG. 13I illustrates a perspective view and method for deployment of a combined airborne and seaborne platform: High-Altitude-Wind-Energy and Tidal-Current-Energy Extraction Plant 300; in an offshore-marine environment to harness the kinetic energies of high altitude wind and deep-sea ocean currents by means of both "Flying Energy Generators" and deep-sea "Diving Energy Generators" comprising: HAVs-100 and HUVs-200 based on a single structural configuration. Fixed platforms 290 securely anchored to the sea bed by means of jacket legs 291; may be integrated with flatbed semi-submersible platforms 292; flatbed platforms 293; inflatable floating bodies 294; each the size of football fields anchored by means of sub-sea cables 295; supported by mother-ships 289; tankers 296*t*; factory-ships 296*f*. The multi-leveled topside structures 290*a* houses the: control and command centre; office; crew quarters; heli-deck 297; radar system 298*r*; radio frequency transmission system 299*r* (command signals); etc. Sonar detection system 298*s* and sonar transmission system 299*s* may be mounted on jacket legs 291. Workshop; store; equipment; etc. may be housed on platforms 292. Clusters of such floating wind and water energy extraction plant 300 may be specifically configured for producing Giga-watts of renewable energies. Computerized control systems such as DCS may be used to operate plant 300; with a computerized control system 266 abroad each HAV-100; HUV-200. Use of passive and active radar; radio-frequency; echolocation systems comprising: sonar/or acoustic system integrated into the HAVs-100; windbags 30; HUVs-200; hybrid water-bags 210; water-bags 40; etc. and installation of a system of fixed transponders at strategic localities enables plant 300 to operate safely.

Critical equipment used at the energy extraction plant 300 may consist of: transceivers, transducers, transponders, receivers and emitters of radar system, sonar system, radio-frequency system, GPS, etc. for the location-positioning fix of individual apparatus. The location-position of the dynamic, mobile, motion vehicles of the entire energy extraction plant may be collated and integrated with computerized programs comprising: predictive-feed-forward analysis algorithms and digital dynamic matrix control logic; to form a point in time Collision Prevention & Warning System for the whole farm. This information may be graphically displayed by means of 3-dimensional computerized display modules for an instantaneous Total Vehicular Traffic Management System. Preventive and evasive actions may be undertaken to avoid any collision of plant vehicles; audio-visual activated warnings; alarms; voice; messages; etc. similar to the radar warning system. Other equipment includes customized submarine boats 220 and Personal Submersible Vehicles (PSVs) 220*a* capable of operating on the surface and under water; enabling marine-technicians to travel and dive in the vehicle to perform necessary underwater tasks on the HUVs-200; Hybrid Water-bags 210; etc. PSVs 220*a* may be configured with robotic arms; manual arm sleeves (withstand high pressure) for human arms to slot into to perform underwater tasks outside the PSV's cabin at depths of about 100-200 meters. Other forms of customized aids such as water scooters, etc. for divers to traverse under water speedily may be acquired for utility purposes. Submarine-boats 220 may be configured with lead beams flexibly attached (eject-able) to the bottom of the vessel's hulls. Portions of the vessels may be covered with transparent high pressure flexi-plastics—bridge, work-crew stations; while other parts may be flooded with ballast water during diving operations.

Figure 14A:
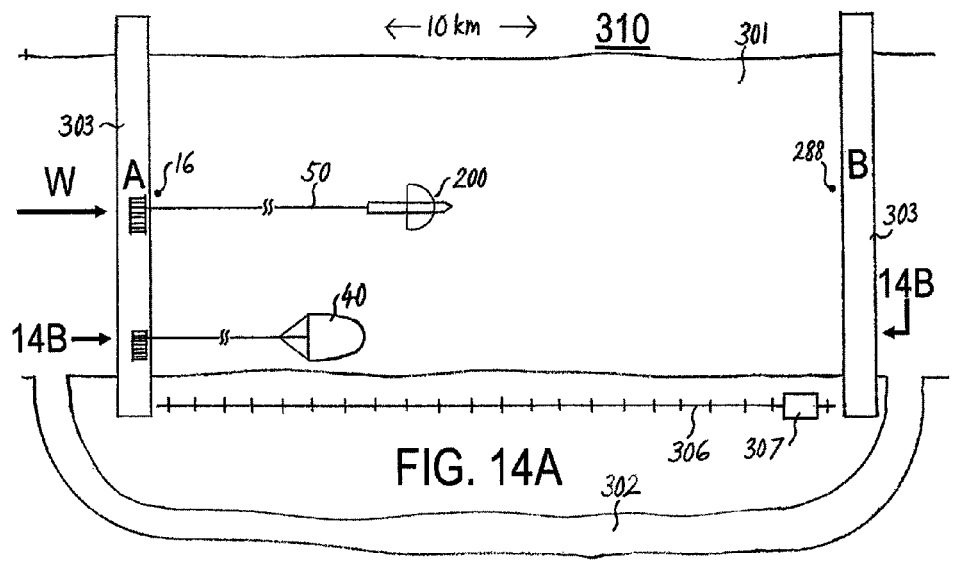
Figure 14B:
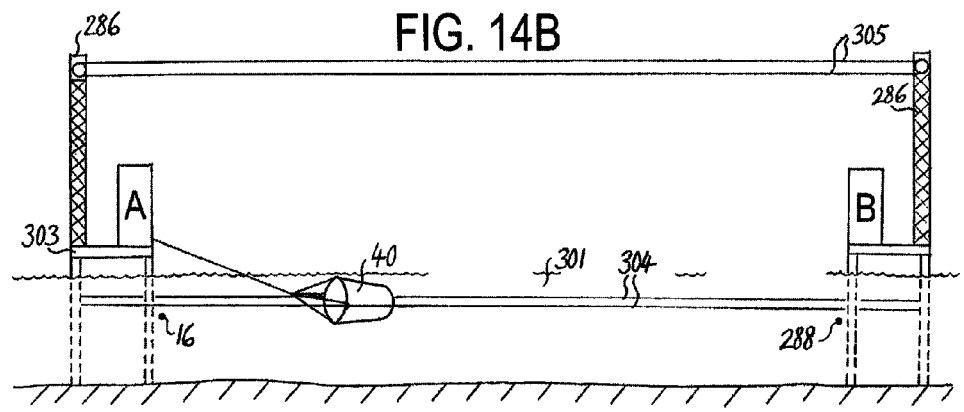
Figure 14C:
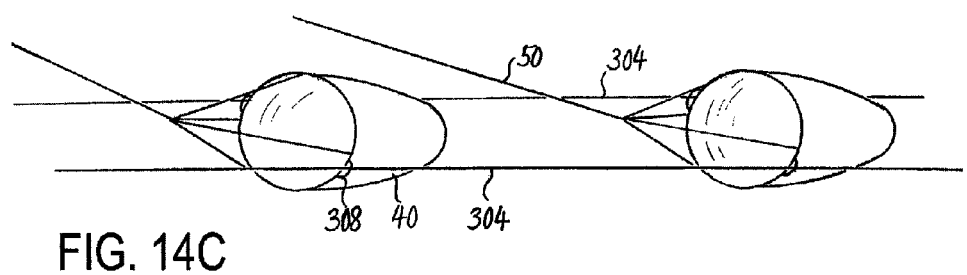

FIG. 14A to FIG. 14G illustrates a method of deploying a riverine hydro-energy extraction plant 310. FIG. 14A illustrates a plan view; FIG. 14B a sectional side view 14B-14B; FIG. 14C enlarged details of guide-lines 304 and bag 40. The waterway 301 may be modified and adapted to suit the purpose with a diversion channel 302 on one side; construction of structures like work-bridges 303 at Station A (SOR point 16) and Station B (EOR point 288); underwater runner-guide-lines system 304; aerial cable lines system 305 for retracting tether lines 50, water-bags 40; hybrid water-bags 210; rails 306 and rail-cars 307 for transporting retracted HUVs-200 from Station B to Station A; said distance being fixed. Power bags 40; 210; HUVs-200 may be deployed running freely between Station A and B. However due to the congested environment, runner-guide-lines 304 may be used to enable high density deployment of power bags 40; 210 and/or HUVs-200; such that multiple bags 40; 210 may be put into power run at the same time on a single group of runner-guide-lines 304 with all groups in operation; each group having 2 or more lines 304. The bags 40; 210 may be flexibly attached to lines 304 by means of a plurality of holding rings 308 which may be locked close/or opened as and when required. Multiple driven units 55 of the power generation system may be mounted on a rotary vertical lifting system 309 with a plurality of lifting pads 309*a* as illustrated in FIG. 14D. Wherein a fresh driven unit 55 at ground level may be hooked up to a drive unit 51 at water level at Station A to begin the SOR phase (point 16); and as the drive unit 51 moved downstream, the driven unit 55 is moved vertically upward by lifting pad 309*a*; until it reaches the top of lift 309. This is timed to coincide with the EOR phase (point 288) as the drive unit 51 reaches Station B; where it is depowered; retrieved and returned to Station A for re-use. In one form drive unit 51 may be retracted back from Station B to Station A by means of an overhead cable line system 305. Optionally, tether lines 50 may be disconnected from the water-bags 40; 210 or HUVs-200; hooked onto aerial wire-line 305 and retracted back to Station A; water-bags 40; 210 or HUV-200 returned by rail-car 307 to Station A. The depowered driven unit 55 is moved backward; then vertically downward by lifting pad 309*a* to ground level to be redeployed again.

FIG. 14E and FIG. 14F illustrates a variant method of executing the task of FIG. 14D. FIG. 14E shows a perspective view of a tether line 50 management system 311 consisting of an arrangement of driven units 55; drive unit 51 (water-bag 40 hidden underwater) with the tether line 50 passing through a line control apparatus 312. FIG. 14F shows the detailed front view of apparatus 312. The system comprises of: an inclined arm 312 with its mounting body 312*a* affixed securely to the ground/or substrate; with a rotary chain 313 mounted on its periphery driven by hydraulic motor 315. Chain 313 contains a plurality of grooves/slots 314 through which a plurality of tether lines 50 passes. Said tether lines 50 connected at one end to the driven units 55; the other end flexibly connected to the drive units 51 comprising: water-bags 40; hybrid water-bags 210; HUV-200. The plurality of driven units 55 may be lined up one after another on the ground. Optionally, driven units 55 may also be mounted on short lengths of rails 306 enabling them to be shunted between points A-B and C-D. During the SOR phase 16 (Station A), drive unit 51' is stationary, tether line 50' coupled to driven unit 55' is inserted into a slot 314' located at the lowest point E; the driven unit 55' may be located nearest to the line formed by points A-B. As the water-bag 40 moved downstream, chain 313 is moved up the inclined gradient of apparatus 312; and driven unit 55' is moved from points A-B towards points C-D. Until slot 314' reaches the apex (point F); which corresponds to the EOR point 288 (Station B) of water-bag 40; driven unit 55' reaches the line formed by points C-D. Water-bag 40 is disconnected from tether 50'. Line 50' retraction phase starts as the slot 314' on the chain 313 moves from point F down the apparatus 312 towards point E. Mid-point between point F and point E; as the slot 314' moves from point F to the mid-point, tether line 50' retraction is completed; and line 50' is removed from slot 314'. From the mid-point to point E, the driven unit 55' and a fresh drive unit 51" comprising: the retracted line 50' and new water-bag 40"; is prepared and readied for redeployment. System 309 and 311 avoids and prevents line 50 entanglement; while enabling systematic operation of multiple power generation units 51 cum 55 to extract riverine hydro-energy using a single group of runner-guide-lines 304.

FIG. 14G illustrates details of a magnetized clamping mechanism 316; a plurality of which when used in tandem with each other enables guide cables or wire lines 304 to be held in place securely; yet freeing sections of the line 304 to allow passage of the holding rings 308 attached to water-bags 40; adjacent clamps being magnetized and demagnetized as and when required. Magnetic clamps 316 may be mounted on holders 317 securely affixed to a substrate. Detection by device 316d of the proximity of ring 308 to clamp 316 may be used as an activation mechanism to trigger the magnetization or demagnetization of clamp 316. Multiple groups of runner-guide-lines 304 may be configured horizontally, one next to the other. Provided the waterway is of adequate depth, multiple groups of guide lines 304 may also be arranged vertically, one on top of another. Such a configuration enables a high density population of drive units 51 to be deployed at the same time in a congested stretch of waterway; maximizing productivity and efficiency of the hydro-energy extraction plant/or farm 310. A similar arrangement may also be configured for the seaborne deployment with the establishment of a fixed Station A (SOR point 16) and Station B (EOR point 288). A multitude of water-bags 40; hybrid water-bags 210; HUVs-200; may be deployed wherein rows upon rows may be configured to operate side by side horizontally; layers upon layers stacked one on top of another vertically. The groups of runner-guide-lines may also be inclined at an angle between Station A and Station B.

FIG. 15A to FIG. 15C illustrates a direct extraction method of harnessing the kinetic energy of underwater tidal current by means of apparatus 320. FIG. 15A illustrates a perspective view of the rigid structural framework 320a for mounting a plurality of leaf-blades 318. FIG. 15B illustrates the plan view of section 15B-15B. FIG. 15C illustrates the frontal view of section 15C-15C. Apparatus 320 is optimally aligned with the directional fluid flow/or current indicated by "W" from point A to point B. Leaf-blade 318 may be mounted in the structural frame-work of railings 320a containing inbuilt grooves 327. The leaf-blades 318 may be moved by means of sliding lugs or flat sliding skate shoes 319 atop a layer of ball bearings or roller wheels 321 residing in grooves 327. Guide rails, guide lines, securing lines and other ancillary equipment may be used together with leaf-blades 318 and frame work 320a to guide, control and facilitate the operation of leaf-blades 318. Optimally, leaf blade 318 may be aligned at right angle, perpendicular to the current flow "W" to maximize extraction of its kinetic energy. At frontal point marked "A" the leaf blade 318' is propelled by the water current towards point "B" at the rear of the unit 320; where it made a 180 degrees turn left; before returning to point "A" moving against the current flow "W" using its wedge-thin side with the least resistance to slice through the water. During this round trip from point "A" to "B" and then, from point "B" back to point "A" again; the moving leaf-blade 318' (rotor) fitted with a plurality of electro-magnet bars or strips 322 at its sides; passes close by the fixed stator pillars 323; 323a (stator) on both sides mounted with a plurality of wire coils 324 internally. Such a round pass generates an electric current in the stator 323 coils 324; as the kinetic energy imparted by the water current onto the moving leaf-blade 318' (mechanical energy) is directly transformed and converted into electrical energy; channeled into the unit collection cable 325; then into external collection cable 326; which is connected to the grid. Optionally, the whole piece of leaf-blade 318 may be made of magnetic materials; impregnated with magnets; or, thin strips of magnets may be integrated into the solid/or semi-solid; rigid/or semi-rigid; materials used to make pliable leaf-blades 318. Electro-magnets 322 may comprise of superconducting magnets; and may be specially adapted for use in the underwater environment. All electrical components used in this direct electricity production method may be encased in a layer of waterproof laminating materials to protect the electrical elements and to prevent direct contact with the external water medium. Apparatus 320 may be aligned in rows and stacked one on top of another. Individual units of stator pillars 323a (without frame work 320a or leaf-blades 318) may be placed in between standard power generating units 320 to optimize generation capacity. Such that rows upon rows; units upon units of apparatus 320 may be stacked on top of one another; spread over hectares upon hectares of the seabed; and used to extract the energies of tidal-currents efficiently and productively.

Though it is preferable that electricity generated by means of present invention be fed directly into local power grids wherever and whenever possible; however the availability of suitable localities for generation of renewable energy may not coincide with areas of high population densities, like cities; where huge amounts of power may be consumed. There is a high probability for renewable energy extraction plants envisaged to be sited in remote camps in sparsely populated areas, away from stringent urban regulations, etc. in the: forests, mountains, deserts; seas, oceans, Arctic and Antarctic regions, etc. Thus the need for the extracted energy to be converted into another form of storable energy, shipped and re-converted back into a suitable form of energy such as electricity to feed mankind's insatiable needs.

Figure 15D:
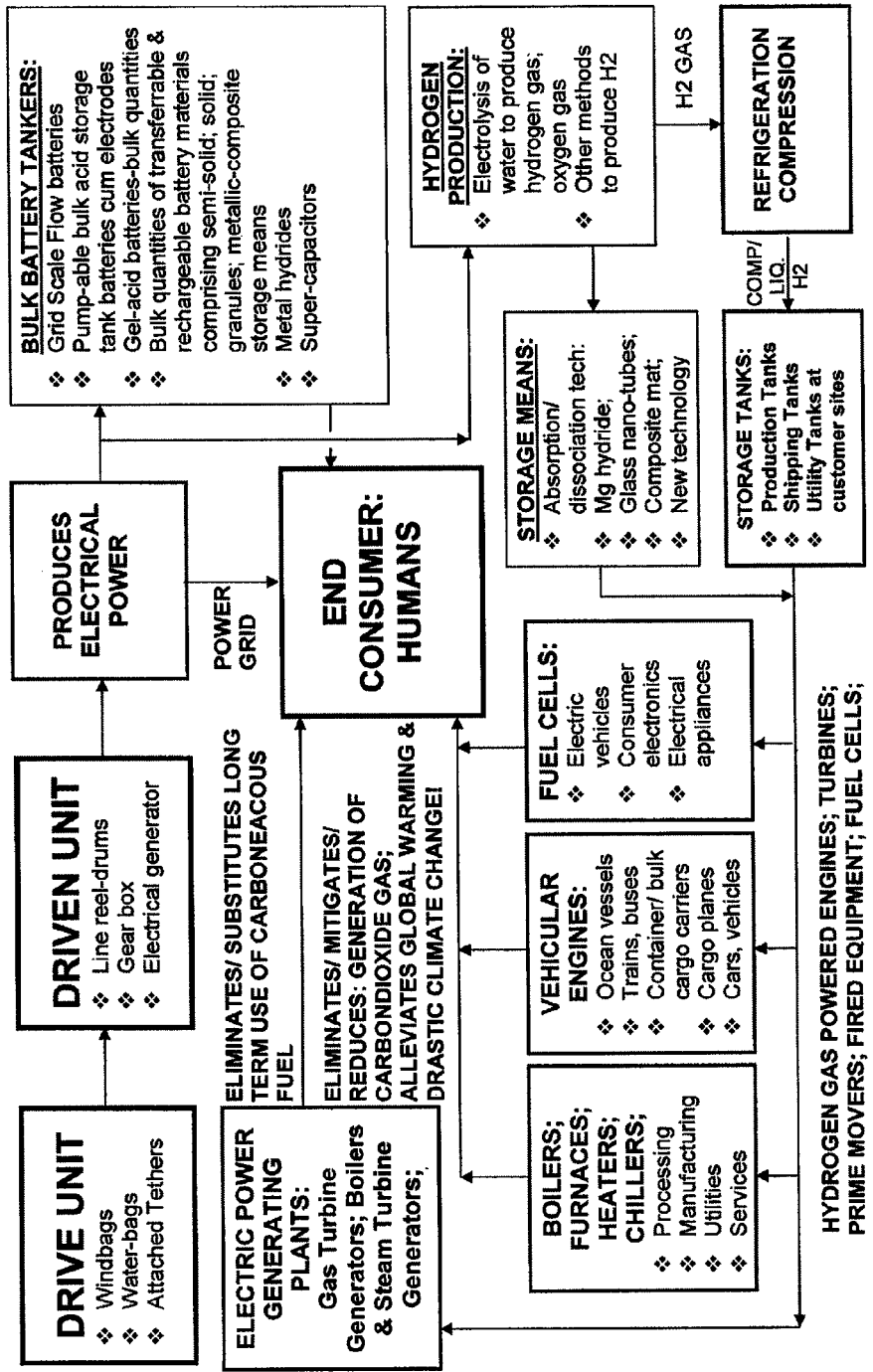
FIG. 15D shows the flow diagram of a hydrogen-electrified economy.

FIG. 15D illustrates a schematic flow diagram of a method of transformation, storage, conveyance and utility purposes of the electrical energy generated at remote sites by means of present invention. The system may comprise of a cyclical manner, wherein: wind and/or water movement may be trapped, captured, harnessed and extracted by means of motion-centric vehicles to produces useful energy; conversion into a storable form of energy for transport; then re-converted into a clean form of energy, electricity to do useful work: provide utilities & services; industrial; commercial; consumer needs; etc. Wherein electricity generated may be stored electrochemically in a plurality of bulk carrier mediums for conveyance to cities for use by means of containerized vessels and supertankers powered by HAVs-100; HUVs-200; such as: electrolytes of flow batteries; pump-able acid tank storage means; gel-acid; granulated forms; containerized hybrid metal-hydride-composite material storage means; etc. Extracted energy may also be transformed and stored by means of various methods and systems available including: compressed air energy storage method; pumped hydro; electrolysis of water for hydrogen gas; etc. Optionally electricity generated by means of present invention may be used to transform and convert carbon-dioxide gas captured from the atmosphere into oxygen gas and solid carbon; which may be compacted and buried in landfills forming carbon sinks. Fixed generation sites may comprise of: land based operation bases for wind energy plants; marine based platforms for both wind and tidal current energy plants. Fixed leg platforms and facilities may be used in tandem with mobile floating production rigs and flatbed vessels 292, 293, 294 anchored to suction cups secured to the seabed. Mobile production platforms may comprise of: football field sized flatbed floating platforms; FPSO; including hydrogen production ships; H2 tankers; (battery) acid storage tanks, battery tankers; electrolyte storage tanks, flow battery tankers; electricity charging/discharging terminals; pumping stations; supply and support vessels; etc. anchored to subsea piles. Whenever and wherever practicable all activities, equipment, vessels, etc of present invention shall be powered by means of zero-carbon energies generated by the bagged power generation system. All activities would be carried out in compliance with relevant government regulations; international protocol; IPCC requirements; in consultation with NGOs; environment groups, etc. expediting change-over of our present carbonaceous; hydrocarbon based economy to a clean hydrogen-electrified economy powered by renewable energies.

Mission—Vision Statement: To reduce; eliminate Global Warming; to save our spaceship—Planet Earth from the dangerous effects of Global Climate Change! For in the fate of mother Earth; and in our own hands, lies our common destiny—for all things living on this planet and their future generations—plants; animals; humans. It is our common duty and responsibility to do our part: innovators, entrepreneurs, financers, governments and NGOs, etc. To Save The World, Our World! "Look high, look far. Our aim the skies, our goal the stars!" To an inventor the sky's the limit.

Finally, it is to be understood that various alterations, modifications and/or additions may be introduced into the constructions and arrangements of parts previously described without departing from the spirit or ambit of the invention.

I claim:

1. A system for generation of electrical power comprising:
    a drive unit (51) having a body (199, 201) and tethers (50) attached to the body and means (80a, 82, 83, 300, 220, 220a) for supporting the drive unit (51);
    at least one water-bag (40) having a circumference that includes integrated hydro-dynamically shaped inflatable bodies (199, 201) filled with water that form waterborne hybrid underwater vehicles (10, 200) that pull the tethers (50), the water-bag includes means (21) for connecting the circumference of the water-bag to the drive unit body (201);
    a driven unit (55) including a tether spool (52); gear box (53); generator (54); winding motor (49); and means for supporting the driven unit (55), wherein the winding motor (49) is operable to reel in and retract back the tethers (50) and water-bag (40) and the drive unit (51) is adapted to turn the tether spool (52) to create rotational movement that is transmitted via the gear box (53) and used to power the generator (54);
    means for powering up and depowering the drive unit (51) comprising winches (59w, 59y, 59z) having two retactable line portions (33y, 33z) for winching the retractable line portions to operably turn the drive unit body; and
    an air-rib system comprising inflatable tubes (277, 277a, 22) filled with pressurized water for providing shape to the water-bag (40);
    wherein kinetic energy of the water current is captured within the water-bag (40) and is transmitted to the driven unit (55) to generate electricity.

2. A system of claim 1 wherein the means for powering up or depowering the drive units further comprises a bow mounted winch (59w) which operably extends or shortens the retract line (33w) for powering-up and depowering of drive unit.

3. The system of claim 1 wherein the means for powering up or depowering the drive units further comprises a stern mounted winch (59y) which operably extends or shortens retract line (33y); for powering-up and depowering of drive unit (51).

4. The system of claim 1 wherein the means for powering up or depowering the drive unit further comprises means selected from the group comprising a bow mounted winch (59w); a stern mounted winch (59y); and a midriff mounted bi-directional winch (59z).

5. The system of claim 1 further comprising at least one emergency equipment for depowering said at least one drive unit (51) selected from the group comprising compressed air discharged via nozzles (242a); burning rocket propellants discharged via nozzles (242r); bridle lines (21) freed by means of signal sent via independent retract line (33x) to winch controller (249); tether line (50) activated tension-sensor (258) to winch controller (249); remote signals sent to controller (249) by means of radio-frequency receiver (257r), sonar receiver (257s); internally mounted automated cutters (259), shears (259), electrically heated burning wires (259), charge of gunpowder (259) for destroying lines (21).

* * * * *